US010272427B2

(12) United States Patent
Prakash et al.

(10) Patent No.: US 10,272,427 B2
(45) Date of Patent: Apr. 30, 2019

(54) PUNCH CARD PROGRAMMABLE MICROFLUIDICS

(71) Applicant: THE BOARD OF TRUSTEES OF THE LELAND STANFORD JUNIOR UNIVERSITY, Palo Alto, CA (US)

(72) Inventors: Manu Prakash, San Francisco, CA (US); George Korir, Stanford, CA (US)

(73) Assignee: THE BOARD OF TRUSTEES OF THE LELAND STANFORD JUNIOR UNIVERSITY, Palo Alto, CA (US)

( * ) Notice: Subject to any disclaimer, the term of this patent is extended or adjusted under 35 U.S.C. 154(b) by 323 days.

(21) Appl. No.: 14/426,473

(22) PCT Filed: Sep. 6, 2013

(86) PCT No.: PCT/US2013/058543
§ 371 (c)(1),
(2) Date: Mar. 6, 2015

(87) PCT Pub. No.: WO2014/039844
PCT Pub. Date: Mar. 13, 2014

(65) Prior Publication Data
US 2015/0238959 A1 Aug. 27, 2015

Related U.S. Application Data

(60) Provisional application No. 61/697,798, filed on Sep. 6, 2012.

(51) Int. Cl.
*B01L 9/00* (2006.01)
*G06K 21/02* (2006.01)
(Continued)

(52) U.S. Cl.
CPC ..... *B01L 3/502715* (2013.01); *B01L 3/50273* (2013.01); *B01L 3/502738* (2013.01);
(Continued)

(58) Field of Classification Search
None
See application file for complete search history.

(56) References Cited

U.S. PATENT DOCUMENTS 3,691,286 A * 9/1972 Komatsu ............. G10F 1/06
84/101
4,466,328 A * 8/1984 Kitamura ............ G10F 1/06
84/98
(Continued)

OTHER PUBLICATIONS

ISA/US, "International Search Report and Written Opinion for the corresponding PCT application US2013/058543", dated Feb. 11, 2014, pp. 1-6.

Primary Examiner — Christopher Adam Hixson
Assistant Examiner — Michelle Adams
(74) Attorney, Agent, or Firm — Beusse Wolter Sanks & Maire PLLC; Eugene Molinelli

(57) ABSTRACT

Techniques are provided for a completely programmable fluidic manipulation without requiring any external control elements or electricity. A chip includes multiple microfluidic channels separated from an outside of the chip by an outer flexible substrate. An apparatus includes a plurality of actuators rotatably connected to a support structure with a recess for receiving the chip. Each actuator includes a plurality of teeth protruding outward, and is positioned so that at least in some angle of rotation a tooth of the actuator extends sufficiently into the recess to compress a microfluidic channel in a chip disposed in the recess. An optional punch card guide is included for guiding a card to contact the actuators. A system or kit includes a punch card on which is formed a plurality of punch features, each configured to engage a tooth of an actuator. Different microfluidic protocols are executed by simply changing the punch card.

17 Claims, 39 Drawing Sheets

(51) Int. Cl.
  *B01L 3/00*  (2006.01)
  *G05B 19/14*  (2006.01)

(52) U.S. Cl.
  CPC .............. *B01L 9/527* (2013.01); *G05B 19/14* (2013.01); *B01L 2300/0816* (2013.01); *B01L 2300/0864* (2013.01); *B01L 2300/0867* (2013.01); *B01L 2300/12* (2013.01); *B01L 2300/123* (2013.01); *B01L 2400/0481* (2013.01); *B01L 2400/0655* (2013.01); *G06K 21/02* (2013.01); *Y10T 436/2575* (2015.01)

(56)     References Cited

U.S. PATENT DOCUMENTS

| | | |
|---|---|---|
| 2003/0026719 A1 | 2/2003 | Hahn et al. |
| 2003/0196695 A1 | 10/2003 | O'Connor et al. |
| 2004/0131502 A1 | 7/2004 | Cox et al. |
| 2005/0244950 A1 | 11/2005 | Harris et al. |
| 2010/0093019 A1 | 4/2010 | Ditcham et al. |
| 2012/0015428 A1 | 1/2012 | Seale et al. |

\* cited by examiner

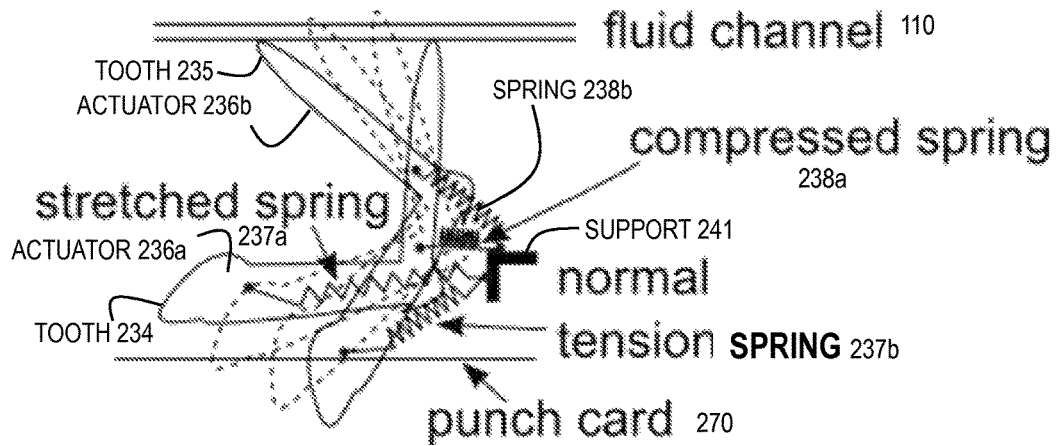
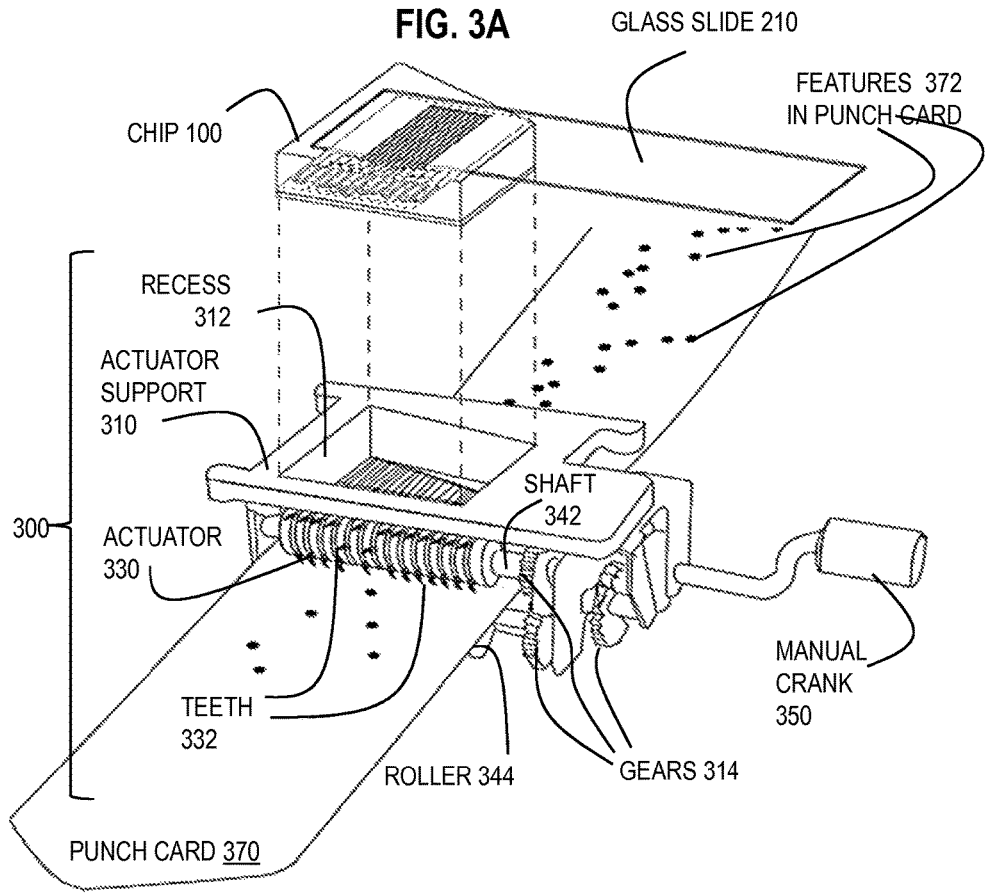

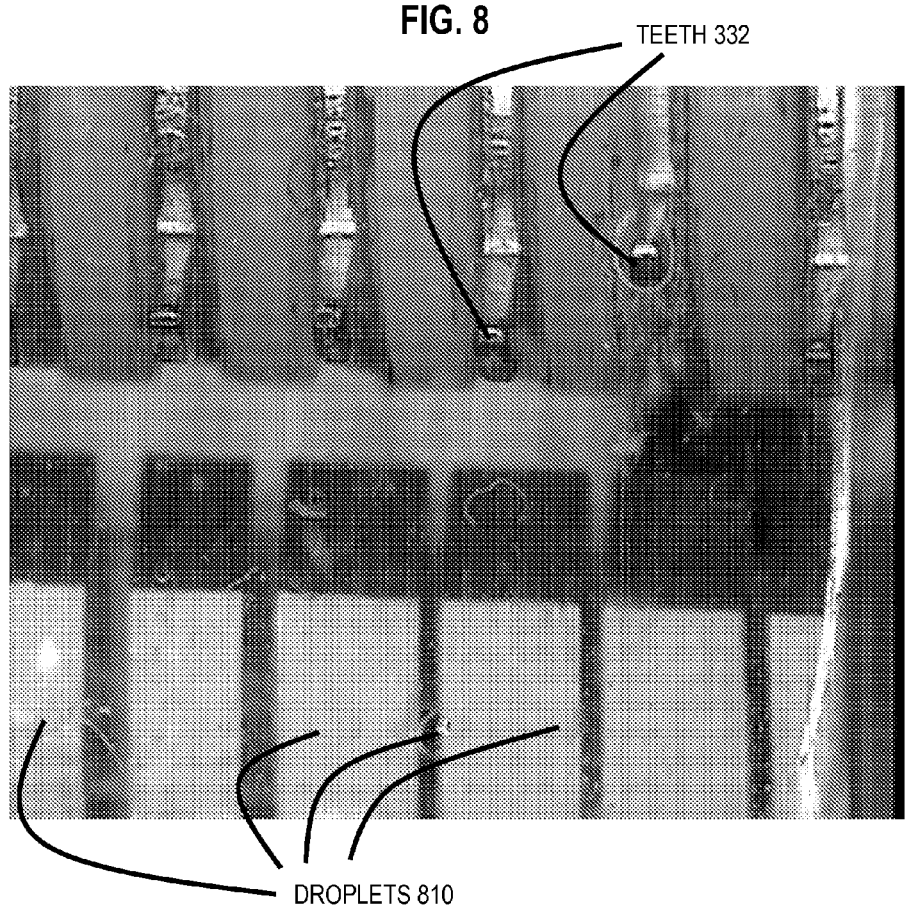

FIG. 10A
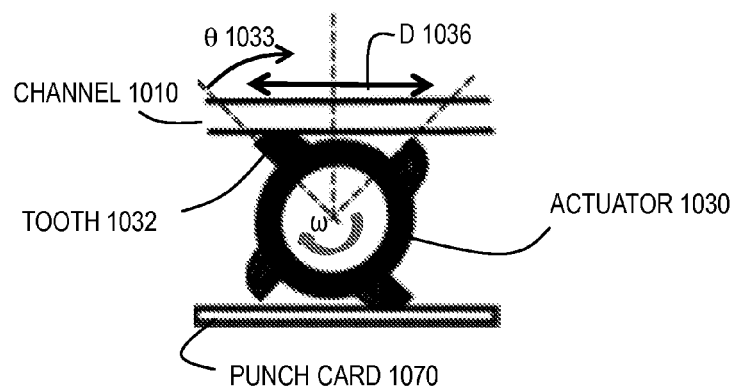
FIG. 10B    FIG. 10D    FIG. 10F    FIG. 10H
     FIG. 10C    FIG. 10E    FIG. 10G
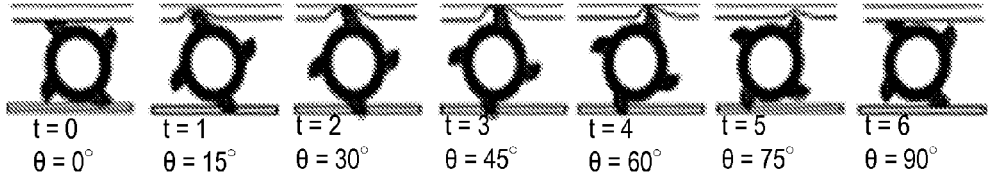
t = 0    t = 1    t = 2    t = 3    t = 4    t = 5    t = 6
θ = 0°    θ = 15°    θ = 30°    θ = 45°    θ = 60°    θ = 75°    θ = 90°
FIG. 10I    FIG. 10K    FIG. 10M    FIG. 10O
     FIG. 10J    FIG. 10L    FIG. 10N

FIG. 22C
FIG. 22D
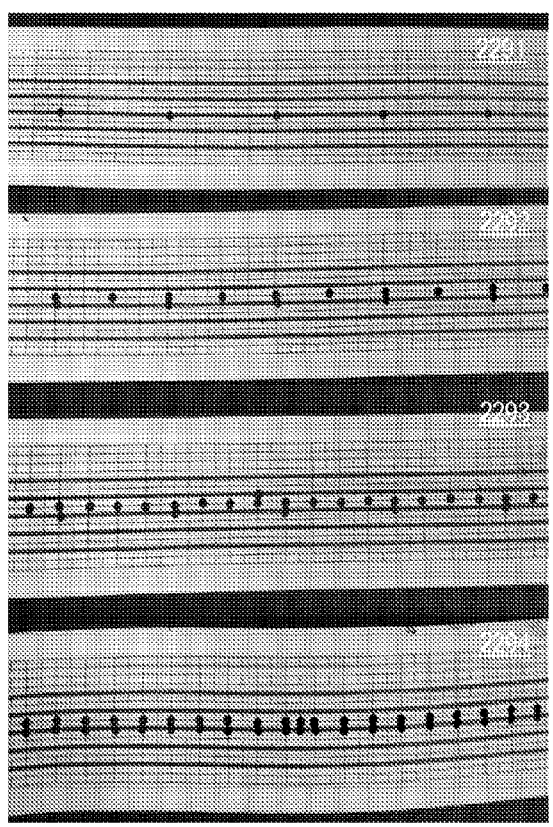
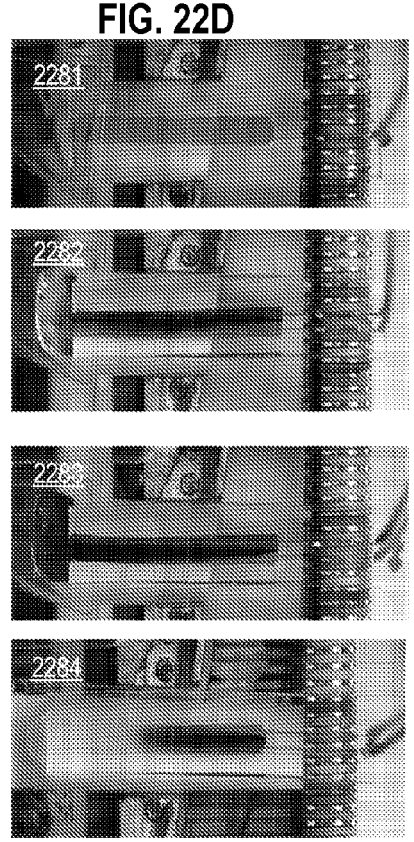

FIG. 24A
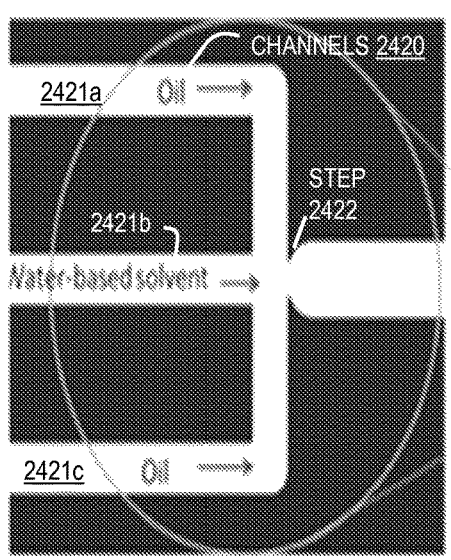
FIG. 24B
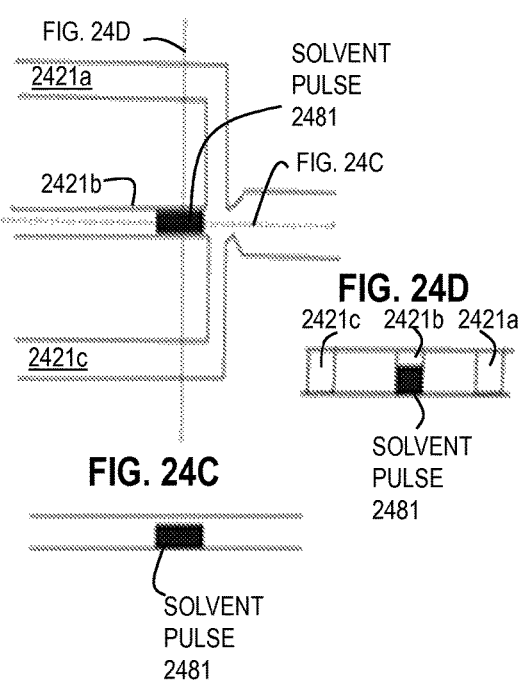
FIG. 24C
FIG. 24D

View Prior to Engagement
Sample/Reagent Insertion

FIG. 25M
Orthogonal View Prior to Engagement
FIG. 25N
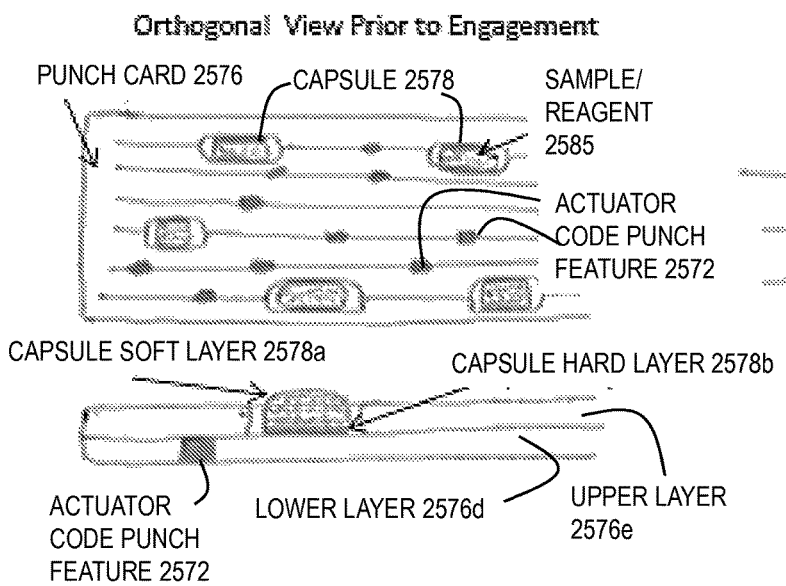
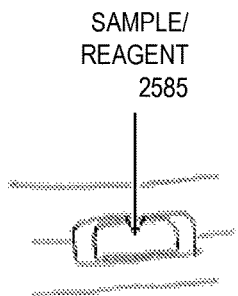
FIG. 25O
FIG. 25P
FIG. 25Q
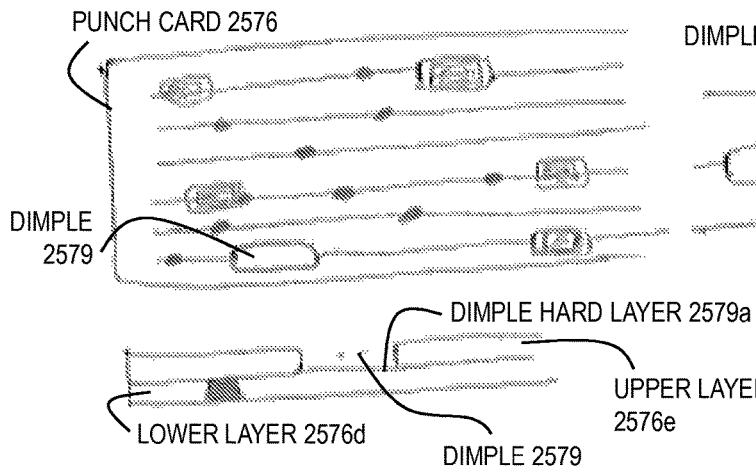
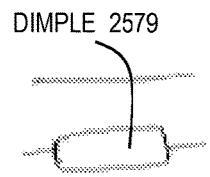
FIG. 25R

PUNCH CARD PROGRAMMABLE MICROFLUIDICS

CROSS-REFERENCE TO RELATED APPLICATIONS

This application is a 371 national stage application of PCT Application No. PCT/US2013/058543, filed Sep. 6, 2013, and claims the benefit of U.S. Provisional Application No. 61/697,798, filed on Sep. 6, 2012; the entire contents of which are hereby incorporated by reference as if fully set forth herein.

BACKGROUND OF THE INVENTION

Microfluidic devices are used extensively for the capture, detection, classification, or quantification of molecules, molecular complexes, viruses, cells and particulates in environmental or biological samples. These devices include one or more microchannels of sub-millimeter (mm, 1 mm=$10^{-3}$ meters) cross section formed in a chip of an inert material, which direct flow of one or more fluids from one or more corresponding reservoirs to interact with each other in a reaction chamber or at a detector or both.

Microfluidics technology has recently emerged as a powerful means to manipulate fluids at a microscale and fully integrate many components and steps for complex yet very precise biochemical analyses. Some of the promising applications include the development of inexpensive diagnostic devices that can be deployed in low-resource settings especially to meet global health challenges such as the lack of facilities and personnel to carry out medical diagnostics. Current microfluidic devices fall into either droplet-based (multiphase) or continuous-flow (single phase) systems. To successfully manipulate these fluids, a number of control strategies have been proposed which often require use of pumps and valves, either integrated on chip or off-chip. Even for integrated on-chip systems, the valves are controlled by external macro-scale elements, such as computers, and require power sources; thus limiting the usefulness of microfluidic tools in resource poor and field settings.

A majority of commercially available systems depend actively on external pumps, vacuum and pressure sources, or depend passively on capillary filling. These solutions are often prohibitively expensive for field deployment. Research and development of self-contained micro-valves and micro-pumps that are integrated into the system still generate systems that fall short when it comes to reliability and commercial viability. The reasons for some of these challenges include the dominance of surface effects over volume effects at the microscale level—leading to increases in required driving pressure, large frictional forces that must be overcome and bubbles acting as capacitances which absorb the actuator-generated pressure. Such effects make it difficult to make micro-pumps that can prime themselves (e.g., see J. D. Zhan, Methods in Bioengineering, Biomicrofabrication and Biomicrofluidics). In addition, current systems are designed for single use. While fabricating the devices in a large batch may help reduce the costs, clean-room processes and material costs can quickly add to the cost and are typically not available near resource-poor deployments. Moreover, running a complex protocol often requires a very complex device design and/or highly skilled personnel to carefully run through multiple steps with a low error rate.

Complexity of current microfluidic systems (control systems, number of parts, fragility) renders them ineffective in harsh conditions and field settings, often encountered in global health and other applications.

SUMMARY OF THE INVENTION

Techniques are provided for microfluidic movement control. In some embodiments, techniques are provided for completely programmable fluidic manipulation without requiring any external control elements or electricity, using punch cards. For usage of a single microfluidic chip for many different purposes, in some embodiments, the same chip can be programmed arbitrarily using different punch cards.

In a first set of embodiments, an apparatus includes a support structure, multiple actuators, and a punch card guide. The support structure has a recess configured for receiving a chip with a plurality of microfluidic channels. Each actuator includes multiple teeth protruding outward from the actuator, and each actuator is positioned so that at least in some angle of rotation a tooth of the actuator extends into the recess sufficiently to compress a microfluidic channel in a chip placed in the recess. The punch card guide is connected to the support structure and is configured to guide a punch card with a plurality of punched features. The guide is configured so that, at least in some angle of rotation, a tooth of an actuator extends into the punch card guide sufficiently to engage a punched feature on a punch card disposed in the punch card guide.

In some embodiments of the first set, an actuator is rotated by manually advancing a punch card through the punch card guide when a tooth of the actuator is engaged with a punch feature on the punch card. In some embodiments of the first set, the apparatus includes a valve moveably connected to the support structure. The valve includes a pin configured to extend into the recess sufficiently to close a microfluidic channel in the chip placed in the recess when no tooth of the plurality of teeth on an actuator is in contact with the valve and to withdraw from the recess when a tooth of the actuator is in contact with the valve.

In a second set of embodiments, a microfluidic channel chip is made of a body structure having formed therein multiple microfluidic channels in an actuator interaction region, a reaction chamber and a reservoir. Each microfluidic channel in the actuator interaction region has at least one dimension in a size range from about 0.1 micron to about 1000 microns (1 micron, also called micrometer, μm, =$10^{-6}$ meters) and is separated from an outside of the body structure by an outer flexible substrate. The reaction chamber is in fluid communication with a first end of each of the microfluidic channels in the actuator interaction region. The reservoir is configured to hold a supply of a fluid in fluid communication with a second end opposite the first end of at least one channel of the microfluidic channels in the actuator interaction region.

In a third set of embodiments, a punch card medium includes a sheet of a first material on which is formed a plurality of punch features. Each punch feature is configured to engage a tooth extending from an actuator of multiple actuators in an apparatus. A different second material is encapsulated in the sheet at a location of at least one punch feature and configured to be released by an encounter with the tooth of the actuator.

In a fourth set of embodiments, a system includes a chip and an apparatus. The chip includes multiple microfluidic channels in an actuator interaction region separated from an outside of the chip by an outer flexible substrate. The apparatus includes multiple actuators rotatably connected to a support structure that has a recess for receiving the chip. Each actuator includes multiple teeth protruding outward from the actuator. Each actuator is positioned in the support structure so that, at least in some angle of rotation, a tooth of the actuator extends sufficiently into the recess to compress a microfluidic channel in the actuator interaction region of the chip disposed in the recess.

In some embodiments of the fourth set, the support structure of the apparatus also includes a punch card guide for guiding a punch card to contact the plurality of actuators. The system further includes a punch card comprising a sheet of a first card material on which is formed multiple punch features. Each punch feature is configured to engage a tooth of an actuator of the plurality of actuators.

In a fifth set of embodiments, a kit includes a chip and a punch card. The chip includes multiple microfluidic channels in an actuator interaction region separated from an outside of the chip by an outer flexible substrate. The punch card includes a sheet of a first card material on which is formed a plurality of punch features. Each punch feature is configured to engage a tooth of an actuator of a plurality of actuators in an apparatus in which each actuator is configured to compress a corresponding microfluidic channel of the plurality of microfluidic channels in the actuator interaction region.

In a sixth set of embodiments, a method includes obtaining an apparatus comprising an actuator rotatably connected to a support structure. The actuator includes multiple teeth. One tooth on the actuator is configured to compress a microfluidic channel in a chip when another tooth on the actuator is engaged in a punch feature in a punch card. The method also includes receiving a chip and punch card. The chip includes a microfluidic channel separated from outside the chip by a flexible substrate in an actuator interaction region. The punch card includes a sheet with multiple punch features, each configured to engage a tooth of the actuator. The method further includes contacting a sample to at least one of a capsule on the punch card, or to a reservoir in fluid communication with the microfluidic channel in the chip. The method still further includes advancing the punch card through the apparatus in contact with the actuator to cause a first tooth of the actuator to compress the microfluidic channel when a second tooth of the actuator engages a punch feature on the punch card.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a block diagram that illustrates an example cross-sectional view of a microfluidic chip inserted in an actuation apparatus with a rocking actuator, according to another embodiment;

FIG. 3A is block diagram that illustrates an exploded view of an example microfluidic chip and actuation apparatus, according to an embodiment;

FIG. 8 is a photograph that illustrates example droplet generation, according to an embodiment;

FIG. 10A through FIG. 10H are block diagrams that illustrate example compression of a channel in a chip by a 90 degree rotation of an actuator in 15 degree increments, respectively, according to an embodiment;

FIG. 10I through FIG. 10O are photographs that illustrate example compression of a channel in a chip by a 90 degree rotation of an actuator in 15 degree increments, respectively, according to an embodiment;

FIG. 22A is a block diagram that illustrates example microfluidic channels as depicted on a microfabrication mask for laminar flow, according to another embodiment;

FIG. 22B through FIG. 22D are photographs that illustrate example correspondence between features on a punch card and continuous flow, according to various embodiments;

FIG. 24A through FIG. 24D are block diagrams that illustrate example droplet formation in a microfluidic channel step, according to another embodiment;

DETAILED DESCRIPTION

Figure 1A:
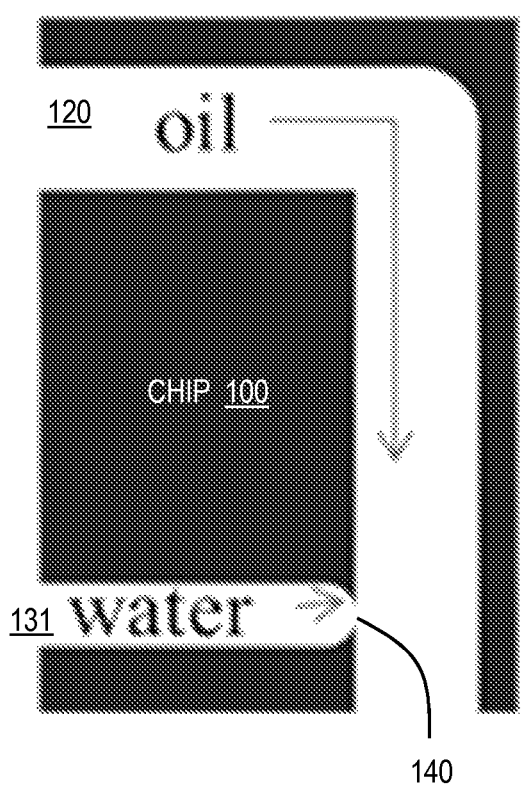
FIG. 1A and FIG. 1B are block diagrams that illustrate example microfluidic channels as depicted on a microfabrication mask, according to an embodiment.

A method and apparatus and article of manufacture are described for programmable microfluidics. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments are described below in the context of microfluidics with just manual power. However, the invention is not limited to this context and may be used with electrical, gravitational, geothermal or other sources of power. Furthermore, some embodiments are described with the chip above the actuators driven by the punch card; however, in other embodiments the chip with microfluidic channels is beside or below the actuators. Many illustrated embodiments are also described in the context of two phase flow with water based fluids flowing as droplets in oil as an immiscible carrier fluid. However, in other embodiments other immiscible fluids are used, or single phase fluid flow (also called "continuous flow") is utilized.

As used herein a microfluidic channel is a leak-resistant channel having at least one dimension in a size range from about 0.1 micron to about 1000 microns. For brevity, the term "microchannel" is used interchangeably with the term "microfluidic channel." A microfluidic device is a material object in which is formed one or more microfluidic channels. The term "microfluidic chip" is used interchangeably with the term "microfluidic device." For brevity, a microfluidic chip is herein often referred to simply as a "chip." A microfluidic protocol refers to a sequence of fluid movements in the microfluidic channels of a chip, and is also called simply a protocol herein for brevity. Thus a protocol implements a method on a chip. Protocols include assays that determine the existence or amount of a substance in a sample.

A punch card is a sheet of one or more layers of one or more materials on which persistent features, such as dimples and holes, can be punched or pressed or embossed or carved or otherwise imposed on the sheet. In some embodiments the punch card is of limited width and length (e.g., length about twice the width). In other embodiments, the punch card is of limited width but is extended substantially in length (much larger than twice the width) and is called a punch card tape or punch tape. Any material can be used to make the punch card, such as punched paper formerly used to input computer instructions, laminated paper, other papers such as card stock paper, Manila paper, sandpaper, Kraft paper available from Georgia-Pacific in Atlanta, Ga. and other derivatives of Kraft paper such as sack kraft paper, spinning kraft paper and hunting cartridge paper, leather, metal such as aluminum foil or other thin, flexible variations, cloth such as millinery buckram or bookbinding buckram other cloths stiffened in ways such as soaking in a substance such as pyroxylin or starch, or various polymers, such as Mylar® available from Tekra Corporation, New Berlin, Wis., and other materials, alone or in some combination. The term "punch card" is meant to refer to all such embodiments described in this paragraph.

As used herein, the term "actuator" refers to a component that causes, or is able to cause, a fluid in a microchannel to move. While actuators that revolve around a shaft are primarily depicted, other actuators that rock back and forth may also be used in some embodiments, along with, or instead of, actuators that revolve through 360 degrees around a shaft. In either case, the actuators are said to rotate relative to an actuator support structure and, thus, to be rotatably connected to the support structure.

A microfluidic actuation apparatus is described which reads features on a punch card to sequence in an arbitrary fashion (program), or to power, or both, fluid flow in a microfluidic chip. This simple solution allows for arbitrarily complex protocols to be executed by a chip without any requirement of external pumps, valves or even electricity. Different protocols are executed in a single chip by using different punch cards. In some embodiments, different protocols employ different chips and corresponding punch cards.

Some embodiments include a microfluidic chip that includes inputs and an output with channels in predefined locations for various functions. One part of the channel location is an actuator interaction region where an actuator external to the chip compresses the microchannel to propel or retard the flow of fluid in the microchannel. Some actuators include teeth (also called spokes) on a gear wheel to make contact with the channels in the actuator interaction region at a predefined height so as to push the fluids in them in each instance when engaged. The actuator in these embodiments is rotated by advancing a stiff paper punch card containing holes punched in predefined positions, so as to determine when the gear teeth are engaged thereby programming the instances when the fluid in the microfluidic channels is propelled forward. In a multi-phase set of these embodiments, the chip embodies a microfluidic design incorporating the use of T-junctions, an oil line of a predetermined flow rate, and other lines with other media so as to generate droplets which can then be manipulated as desired, corresponding to the programmed punch card.

Some embodiments disclosed here include a microfluidic movement system which is completely programmable, but requires no electricity or any other external control system. Numerous applications exist in ultra-low-cost biomedical devices, point of care diagnostic devices, research tools for automated pipetting of fluids, drug screening devices and so forth. The system is general purpose and operates in both single phase and multi-phase microfluidic modes. The system can be used in environmental monitoring applications which require conducting sophisticated molecular tests in a field setting. One or more components of the disclosed system are amenable to on-demand manufacturing and three-dimensional (3D) printing.

Some embodiments are used to manipulate fluids in innumerable ways simply by programming the same chip with a different punch card; e.g., for a new protocol. Reprogramming just involves using a different punch card. The technology does not require any batteries or any other source of electricity; and thus eliminates the need for electric power. The technology does not require any external pumps to drive the fluid; since the motion of the gear train drives fluid automatically into and through the system.

The use of punched cards for creating, editing and storing computer programs continued up until the mid-1980s. However, means to use programs on punch cards to drive microfluidic channels without intervening electronic controls has not been suggested or demonstrated before.

Current approaches toward microfluidics programmability include the use of valve-based systems, such as the use of multiple micromechanical valves, each valve being separately controlled by an off-chip solenoid valve (e.g., see E. C. Jensen, B. P. Bhat and R. A. Mathies, Lab Chip, 2010, 10, 685-691). Another approach has been the use of thin film metal flexures in polydimethylsiloxane (PDMS) microfluidic devices to electronically control the opening and closing of specific valves without the use of any pressure (e.g., see M.-P. Chang and M. M. Maharbiz, Lab Chip, 2009, 9, 1274-1281). By designing the location of the valves and channels, fluid flow can be programmed.

However, the valve based systems are often single phase systems. Maintaining sample integrity in continuous flow systems has been a major challenge due to the ease with which samples that are not meant to mix can come into contact. Multi-phase systems, such as droplet-based systems, solve this problem by containing solutions of interest as emulsions in immiscible carrier fluids, thereby avoiding direct contact with device walls or with other samples until desired through specific manipulations. Multiphase systems have therefore been employed to program fluid flow using means such as the manipulation of conductive droplets using electrical means in electrowetting-on-dielectric microfluidic devices (e.g., see M. J. Jebrail and A. R. Wheeler, Curr. Opin. Chem. Biol., 2010, 14, 574-581; and S.-K. Fan, T.-H. Hsieh and D.-Y. Lin, Lab Chip, 2009, 9, 1236-1242).

Further disadvantages arise in these current systems when it comes to the limitations arising from the difficulty in integrating and miniaturizing components for increased density. Moreover, the programming process is extremely challenging, requiring exceptional knowledge and skills in microfabrication and physics for each design. Moreover, in some instances, the valves require external control for each valve leading to the need of an external controller, such as a computer, with increased complexity and cost, and often require highly trained personnel to operate.

Other approaches for controlling microfluidics mechanically include using human input such as thumb-actuated devices for pumping fluids in various compartments for storing the fluids. This approach does not allow for arbitrary control since only a limited number of inputs (two) can be given. Moreover, programmability is not possible with the above-described scheme (e.g., see X. Qiu, J. A. Thompson, Z. Chen, C. Liu, D. Chen, S. Ramprasad, M. G. Mauk, S. Ongagna, C. Barber, W. R. Abrams, D. Malamud, P. L. A. M. Corstjens; and H. H. Bau, Biomed Microdevices, 2009 December; 11[6]: 1175-1186). Furthermore, the user must be trained to perform the functions and highly practiced to perform them adeptly. The thumb-driven approach is also limited in that reagent introduction is complex and limited. Furthermore, great limitations exist in the complexity of the programs that can be run.

Moreover, most, if not all of the above listed current approaches also feature programs and chips that are tightly connected, making it practically impossible to have simple chips running complex programs. The needed supportive architecture for current complex programmable microfluidic devices includes expensive equipment, such as computers or electronic hand-held devices, and an external power supply for fluid handling and processing. All such characteristics make such systems expensive and practically prohibitive for field-based approaches in low-resource settings.

Programmability of microfluidic systems described here presents the capacity to run countless protocols through a single chip and actuator apparatus design. Illustrated embodiments present a way to program microfluidic systems using a simple chip design. Fluids can be manipulated arbitrarily by programming an external actuation apparatus that is coupled to the chip. Various embodiments use a programmable punch card coupled to a hand-powered gear train that serves as a pump to drive fluid in a microfluidic chip from outside the chip. This capacity, coupled with a droplet-based, two-phase system, also provides the possibility of reusing the same device for multiple complex protocols by simply changing the punch card code.

The illustrated embodiments provide solutions that require no electrical power, yet can perform highly complex, programmable and/or parallel fluid manipulations for various assays in simple reusable chips. The approach disclosed here embeds complexity in the punch card tape (physical program) that serves as both a program and storage register and power transmission.

Some embodiments comprise a device capable of being modified to run at very high speeds for materials processing at a high throughput. In some embodiments, the designs for microfluidic chips expand the number of programming functions available on chip. Still other embodiments comprise devices capable of being made completely disposable to allow for one time use, such as for infectious diseases related applications. Some embodiments are capable of replacing the common pipettes used in lab settings or provide the advantage of a much more precise mechanism, or some combination. Some embodiments also offer the advantage of sharing the punch card program between individuals.

New features of various embodiments include: (1) Coupling of a microfluidic chip to a punch card; (2) Actuation of fluids purely driven by interaction with a gear train eliminating any external pumps; and (3) Programmable microfluidics that can operate in harsh field settings including developing countries, hospitals, environmental monitoring, etc.

Thus, various embodiments provide a novel, elegant and a highly accurate way to manipulate fluids at microscopic length scales in a completely programmable fashion. Each protocol can be broken down into a set of instructions that are punched onto the tape and which are mechanically read by an actuator apparatus and transferred to compressions on microchannels in the microfluidic chip. This opens the possibility of lightweight, hand-held diagnostic devices that can operate in harsh settings without the need for electricity, while still providing complex fluidic manipulation of high precision useful for many applications.

An illustrated system comprises several parts: a microfluidic chip made using polydimethylsiloxane (PDMS) with various input and output channels in a predetermined configuration, a stiff paper or other material with parallel lines spaced apart running parallel to the long edge, and an actuator apparatus. The actuator apparatus includes a bedplate metal support structure on which actuators and the supporting pieces are fastened. Example actuators include gear wheels with a cylinder or shaft having rotatably connected metallic disks each with teeth that are spaced circumferentially, or cams that move one or more pins up and down under a restoring force such as gravity or shape memory material or an external spring. In some embodiments, the teeth are spaced equally around the circumference. In various embodiments, various numbers of teeth are included on each actuator. In various embodiments, the teeth are shaped for various purposes, such as to engage the punch feature, compress channels, close channels like a valve or puncture a capsule in a punch feature or some combination. In some embodiments, different actuators in different rows have different numbers and types of teeth or different sizes.

In an illustrated embodiment, a stiff paper card is punched with holes, or other features, such as bumps or depressions, on the lines, which are aligned to the teeth on an actuator (such as a cylinder with multiple gears) and about two millimeters apart in an illustrated embodiment. In other embodiments, other spacings between lines are used. The spacings between the actuators in several illustrated embodiments are created using toroid discs made of plastic that are one and a half millimeters thick and are completely replaceable and adjustable. It is anticipated that thinner spacings are used in some embodiments to provide more actuators and therefore more channels for a given area. The opposite would also be true that is, if thicker spacings are used, fewer actuators would fit and subsequently fewer channels would be actuated for a given area. More closely packed actuators and channels at some point eventually lead to more than one channel being perturbed or actuated by an actuator, which may or may not be desirable depending on the application. The point where more than a single channel is perturbed by the action of a single actuator also depends on the thickness of the tooth on the actuator. Thinner teeth result in a lower likelihood of neighboring channels being perturbed for a particular density.

An illustrated embodiment features actuators with thicknesses ranging from 0.5 mm to 1 mm, spaced 2 mm apart. The actuator thickness in this embodiment is such that it is slightly larger than the channel being actuated to ensure that channel collapse is substantively complete. The thickness of the teeth or pins can also be increased or decreased arbitrarily compared to the thickness of the actuator. The limits for thin teeth or pins is determined partly by the material being used and its interaction with the material of the microchip and the size of microchip channels and substrates; if too thin, the tooth or pin can cut though the material which may be undesirable for channels that need to be intact for correct functioning.

Upon encountering a punch feature on the punch card, a tooth of the actuator gets engaged and rotates the actuator, pressing another tooth of the actuator, or a pin motivated by the tooth, to compress a microchannel in the chip. The other actuators are not engaged (unless there is a feature on the punch card on the particular line for another actuator at the same distance on the punch card). As one of the teeth on the actuator engages the feature, another tooth on the actuator, e.g., a tooth 180 degrees from the tooth engaging the punch feature, compresses the microfluidic channel on the chip mounted on another side of the actuators. The microchannels are aligned with the actuators' teeth so that the microchannel can be compressed every time the punch card has a feature at the particular line and distance. The distance along the length of the punch card corresponds to a sequence step or time.

In some embodiments, the microfluidic channels include at least one microchannel with a carrier fluid flowing at a predetermined flow rate, e.g., because of regular compression by one or more actuators due to regular spacing of features on the punch card. This carrier fluid is immiscible with the fluids in other channels. The input channels are designed in such a way as to have a T-junction with a microchannel carrying the immiscible fluid. For example, the input channels carry a water-based fluid while the immiscible carrier fluid is oil. The design is such that droplets can be generated at the T-junction through the shearing of the fluid whenever the tooth of an actuator pushes the fluid forward in a pulsatile way.

Fluids in the various droplets are manipulated as desired through various designs in the microfluidic chip, including but not limited to ways of passively mixing the fluids in any order in a reaction chamber or laminar flow channel or merging various fluid droplets in the reaction chamber as desired for various applications.

Figure 1B:
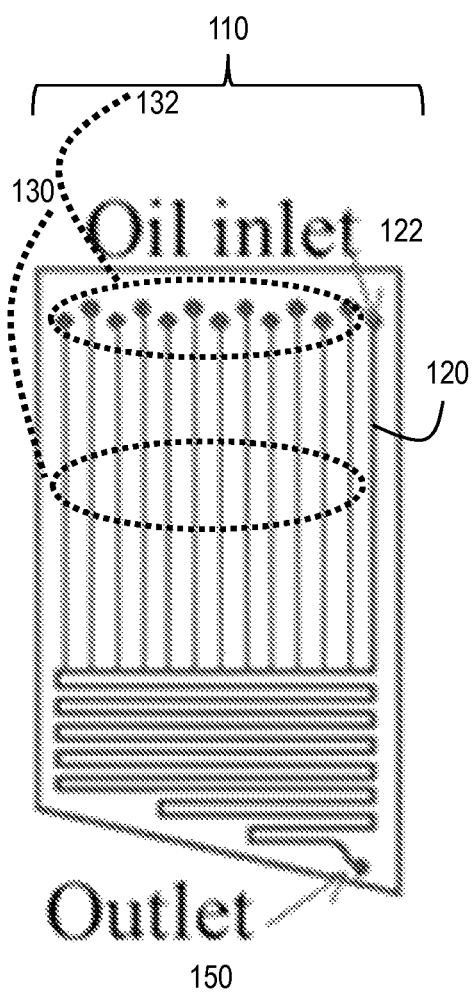

FIG. 1A and FIG. 1B are block diagrams that illustrate example microfluidic channels as depicted on a microfabrication mask, according to an embodiment. This presents channels in a plan view. A chip so produced includes multiple microchannels 110, including an immiscible carrier fluid line (e.g., oil line 120) with inlet or port to a reservoir (e.g., oil inlet 122). The remaining microchannels 110 include one or more sample fluid microchannels 130 and corresponding inlets or ports to reservoirs (e.g., sample fluid inlets 132) for a sample fluid (such as water with one or more suspended or dissolved components) that connect to the immiscible fluid line at corresponding T-junctions, such as T-junction 140 for a water line 131 and oil line 120 on chip 100. The oil line ends at outlet 150. One design includes a setup where droplets can be generated at the T-junction through the shearing of the fluid whenever an actuator tooth pushes the fluid forward in a pulsatile way at the location of a hole or other feature in the punch card. In some of these embodiments, the T-junction includes a channel narrowing as depicted in junction 140. Fluids in the various droplets may then be manipulated as desired through various designs in the microfluidic chip, including but not limited to ways of passively mixing the fluids and merging various fluid droplets as desired for various applications. In other embodiments, no immiscible fluid is used, and all fluid channels 110 carry compatible fluids for a continuous flow (single phase) application that combined to form laminar flow in a downstream channel.

In the illustrated embodiment, the chip is made of polydimethylsiloxane (PDMS), which is inert, flexible at certain thicknesses, and transparent so that fluid reactions can be observed visually. In some embodiments, material coatings are employed to avoid or reduce wear and tear, including polymer coating to match material stiffness/hardness. An example of such an approach is the coating of actuator teeth in a polymer or material that will match the microchip stiffness/hardness. In some embodiments, mechanisms are included to reduce friction, such as timed release of a friction-reducing agent; or the use of other materials for the microchip, the actuator or both, leading to reduced friction. The channels can be formed in various ways in the material of the chip, in one block or multiple blocks that are then glued or melted together, such as by machining each block of material, etching each block, using a mold for one or more blocks, or injection molding one or more blocks, or by 3D printing with the chip material.

Figure 2A:
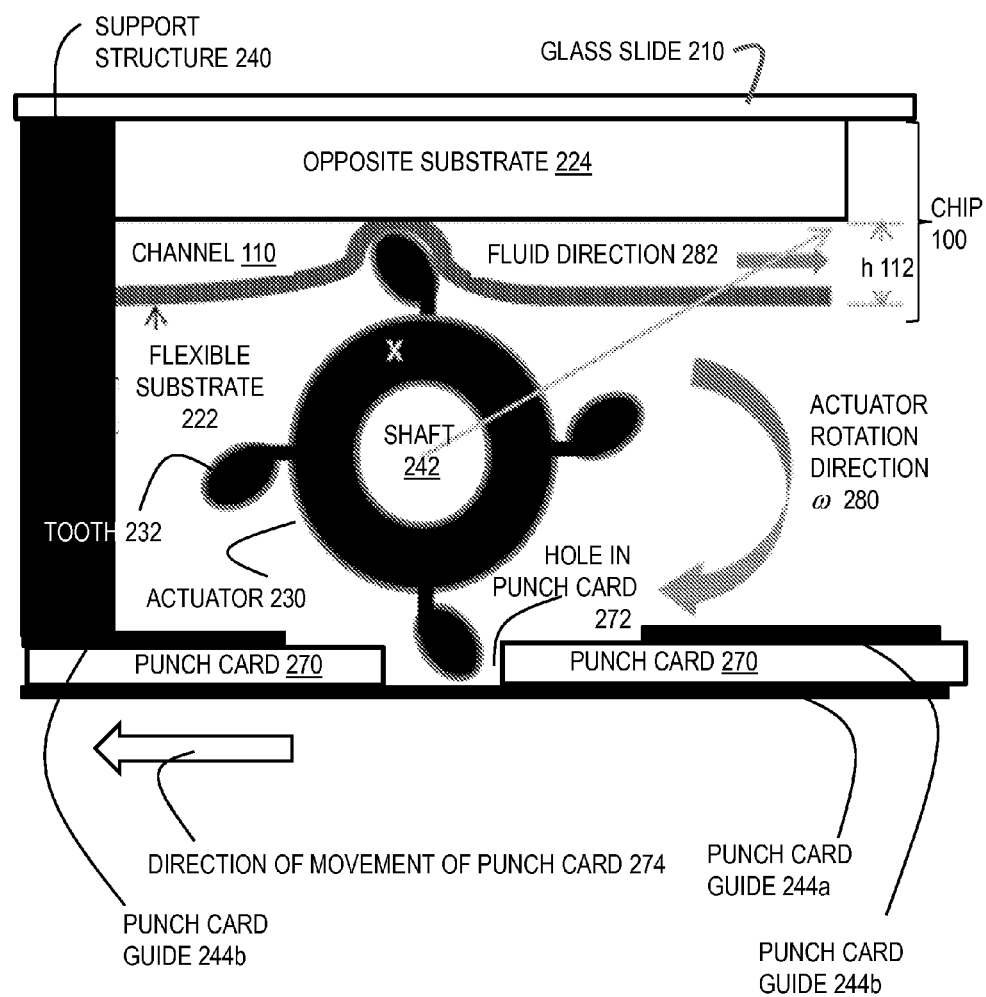
FIG. 2A is a block diagram that illustrates an example cross-sectional view of a microfluidic chip inserted in an actuation apparatus, according to an embodiment.

FIG. 2A is a block diagram that illustrates an example cross-sectional view of microfluidic chip 100 inserted in an actuation apparatus, according to an embodiment. FIG. 2A depicts, in a cross section, one channel 110 in the chip 100 of the channels 110 depicted in plan view in FIG. 1B. The channel height h 112 is indicated. In various embodiments, the channel height h 112 is less than one millimeter, and advantageously for small sample sizes, about 50 to 100 microns. Channel height considerations are made with the applications in mind. For instance, when working with and analyzing human cells, channels that are 10 microns or less in height will be disadvantageous as they are likely to result in shearing and destruction of the cells during the actuation action, and blockage of channels. However, such small channels can be advantageous in the encapsulation of single simple cells in single droplets for single-cell analysis. One can envision a setup whereby the channels have a smaller height downstream from the actuation location to take advantage of the capacity to easily manipulate single cells while still reducing the instances where cells may be destroyed by shearing. Channels featuring greater heights such as 200 microns offer the advantage of being able to process larger volumes of fluids which can be advantageous for instance in the processing of large volumes of blood (for instance 10 milliliters) in search of circulating cancer tumor cells, which are rare, and found in patients with tumors that may be undergoing metastasis. The number of these cells has been found to correspond to disease progression and response to therapy, and may perhaps be used someday for disease diagnosis. The larger volumes are also useful in a search for proteins found in low quantities for disease diagnostics in the case of diseases such as Alzeheimer's disease, where tau proteins have been found in cerebrospinal fluid.

One wall of the channel 110 is a flexible substrate 222 (such as a thin PDMS substrate about 200 microns thick) that flexes when pressure is applied, e.g., by one or more teeth (such as tooth 232) of actuator 230. The shape of the teeth 232 varies in various embodiments, as described in more detail below. The opposite wall of the channel 110 is an opposite substrate 224. In some embodiments, the opposite substrate 224 is stiff (such as a thick PDMS substrate about 10 mm thick) and does not flex under the pressures applied by the actuator 230. In some embodiments the opposite substrate 224 is also flexible and also flexes to the same or lesser degree under pressure.

An illustrated embodiment comprises a flexible substrate of a soft elastic PDMS layer made of a base-to-crosslinker ratio of 20:1, which is about 200 microns thick. This thin PDMS substrate was made using a spin-coater such as the P6700 spin-coater from Specialty Coating systems based in Indianapolis, Ind., with the settings of 250 rotations per minute angular velocity for 30 seconds, before being cured at an oven set to 80 degrees Celsius for at least 30 minutes. This thin substrate has an elastic modulus of about 1.1 MPa. This flexible substrate provides the outside wall of channels with cross sections from about 250 microns to about 500 microns wide and height h 112 about 50 microns to about 100 microns. In some embodiments, the outer flexible substrate comprises a layer of polydimethylsiloxane (PDMS) less than about 50 microns thick, which provides sufficient strength to prevent rupture and sufficient flexibility to be easily deformed.

The opposite substrate is a stiffer, thicker PDMS layer of about 10 mm thick made of a base-to-crosslinker ratio of 5:1, with an elastic modulus of about 3.5 MPa. Other materials that would work include wood, glass, polymers such as 75-80 RTV urethane mold rubber available from West Palm Beach, Fla., polymers such as Delrin® manufactured by DuPont in Wilmington, plastics, metal, foam, or any other material that would be thick enough to ensure that the PDMS microchannel layer makes contact with the gear pins.

The glass slide 210 provides a stiff substrate for attachment to the actuator apparatus support structure 240 that houses the actuators and punch card guide. In some embodiments, opposite the outer flexible substrate of each microfluidic channel in the actuator interaction region is a layer of polydimethylsiloxane (PDMS) greater than about 50 microns thick. In various other embodiments, the thickness is selected within a range from about 50 microns to about 200 microns.

The chip with channel 110 is inserted into a recess in the actuator apparatus support structure 240. In some embodiments, the chip 100 is mounted to a glass slide 210 which is used to manipulate the chip 100 into the recess of the support structure 240, e.g., by resting the glass slide on top of the support structure 240. In some embodiments, the chip is removably inserted into the recess so that the same apparatus can be used with different chips of the same or different arrangement of channels, reservoirs and reaction chambers. Thus, in some embodiments, the recess is configured for removably receiving the chip with the plurality of microfluidic channels. In some embodiments, the chip is not removably inserted into the recess; but, in contrast, is permanently fixed to the actuation apparatus. Thus, in some embodiments, the chip with the plurality of microfluidic channels is fixed within the recess.

Mounted to the support structure 240, through a connection not in the plane depicted, is a shaft 242 (e.g., a cylindrical piece of metal). Rotating around shaft 242 is actuator 230 with teeth (also called pins) such as teeth 232. As described in more detail below, the teeth 232 can assume various shapes to achieve various functions. Any material can be used to make the actuators and teeth. In the illustrated embodiments, the thin actuators, about 0.5 mm thick, were made of stainless steel, while thicker actuators, about 1 mm thick, were made of aluminum. In some embodiments, the actuator is fabricated using other metals, or plastics or other materials that have less frictional action on the chip, such as wood of various kinds that is smoothened, polished or coated with a resin such as 75-80 RTV urethane mold rubber available from West Palm Beach, Fla., polymers such as Delrin® manufactured by DuPont in Wilmington, Del., ceramic such as porcelain, glass, sea shells, bone, enamel, polished rocks and other similar hard yet smooth materials.

Also mounted to the support structure 240, through a connection not in the plane depicted, are opposite members of a pair of punch card guides 244a and 244b, respectively (collectively referenced as punch card guides 244). The guides 244 are configured to hold a punch card 270 so that the punch card 270 contacts or nearly contacts the actuator 230.

As the punch card moves in the direction 274 with a tooth of actuator 230 engaged in a hole 272 or other punch feature of the punch card 270, the actuator 230 rotates in the actuator rotation direction ω280. This movement applies pressure on flexible substrate 222 by a tooth along the actuator (e.g., on the opposite side of the actuator) and propels some fluid in the channel 110 into the downstream fluid direction 282 along the fluid channel. The portion of chip 100 with a flexible substrate 222 for interaction with the teeth 232 of actuators 230 is called the actuator interaction region. In some embodiments, the actuators operate in multiple-modes whereby the movement of a particular actuator results in the movement of one or more gears connected to the actuator, which may or may not move multiple other actuators. With this capacity, increased complexity and functionality can be achieved.

FIG. 2B is a block diagram that illustrates an example cross-sectional view of a microfluidic chip inserted in an actuation apparatus with a rocking actuator, according to another embodiment. The fluid channel 110 and punch card 270 are as described above. A rocking actuator (referenced hereinafter as actuator 236) is shown in two positions, a disengaged position represented by actuator 236a and an engaged position represented by actuator 236b. The actuator rotates back and for the between the two positions. When there is no feature to engage in the punch card 270, the actuator 236 assumes the configuration of actuator 236a. A spring (referenced hereinafter as spring 237) connected to one tooth 234 of the actuator 236 assumes the configuration of stretched spring 237a, while a second spring (referenced hereinafter as spring 238) connected to another tooth 235 of the actuator 236 assumes the configuration of compressed spring 238a. When there is a feature to engage in the punch card 270, the actuator 236 moves to the configuration of actuator 236b, with intermediate positions indicated by dashed outlines of actuator 236. The spring 237 assumes the configuration of normal tension spring 237b, while spring 238 assumes the configuration of normal tension spring 238b. The springs 237, 238 are connected on their opposite ends to a spring support 241 connected out of the plane of the diagram to the support structure 240. As the feature moves from right to left with the punch card 279, the actuator 236 is rotated from the engaged configuration of actuator 236b to the disengaged configuration of actuator 236a, compressing the channel 110 with the tooth 235.

In some embodiments, one side of the punch card guide is provided by another component (e.g., punch card guide 244b is actuator 230 or shaft 242 or a cam without teeth, not shown, attached to the shaft 242). In some embodiments, manually pulling the punch card 270 provides the power to rotate the actuator 230 in direction ω280 and propel the fluid into direction 282. In some embodiments, the punch card is advanced by turning a crank attached to one or more rollers serving as punch card guide 244. In some embodiments, the punch card 270 is advanced by turning a crank attached to the shaft 242 that is permanently engaged with at least one actuator corresponding to a row on a punch card with punch features at regular spacing. In such embodiments, turning the crank advances the punch card, and other punch features in the punch card variously engage the other actuators rotatably connected to the shaft 242. Thus, in some embodiments, an actuator of the plurality of actuators is rotated by manually advancing a punch card through the punch card guide when a tooth of the actuator is engaged with a punch feature of the plurality of punched features on the punch card. In some such embodiments, no actuator of the plurality of actuators is rotated by an electric motor.

Thus, the actuation apparatus includes a support structure 240, a plurality of actuators 230, and a punch card guide 244.

FIG. 3A is block diagram that illustrates an exploded view of an example microfluidic chip 100 and actuation apparatus 300, according to an embodiment. Though punch card 370 is depicted for purposes of illustration, punch card 370 is not part of actuation apparatus 300. The chip 100 is mounted to glass slide 210 for ease in handling without contaminating the surface of the chip 100. The actuation apparatus 300 includes actuator support 310 (such as a metal base plate) with recess 312 configured to receive chip 100. Thus, the support structure includes a recess configured for receiving a chip with a plurality of microfluidic channels. Rotatably connected to the support 310 through shaft 342 are actuators 330 axially distributed on shaft 342. Thus, a plurality of actuators are rotatably connected to the support structure, wherein each actuator includes a plurality of teeth protruding outward from the actuator, and wherein each actuator of the plurality of actuators is positioned so that at least in some angle of rotation a tooth of the actuator extends into the recess sufficiently to compress a microfluidic channel in a chip placed in the recess. Also depicted is a roller 340 serving as punch card guide 244a. Thus, a punch card guide is connected to the support structure and configured to guide a punch card with a plurality of punched features so that at least in some angle of rotation a tooth of an actuator of the plurality of actuators extends into the punch card guide sufficiently to engage a punched feature on a punch card disposed in the punch card guide.

In the illustrated embodiment, there are 15 actuators evenly distributed on shaft 342. Thus, in this embodiment, each actuator of the plurality of actuators is rotatably connected to a single shaft connected to the support structure. In various other embodiments, more or fewer actuators are evenly or unevenly distributed on one or more shafts or cylinders. For example, in various embodiments, the apparatus includes a number of actuators in a range from about 8 to about 32. In various embodiments, the number of actuators can be in the hundreds, thousands or even millions. An example of where multiple ones could be an advantage is in genomic sequencing or the running to large arrays of assays needing many systems in parallel. An advantage of evenly distributed actuators is simplicity of design for a variety of chips and simplicity of providing punch cards with punch features. An advantage of uneven distribution is that one or more actuators of different widths can be employed to propel different amounts of fluid through the microchannels of corresponding widths on the chip. In some embodiments, spacing between a pair of actuators of the plurality of actuators along the support structure is in a range from about 20 microns to about 2000 microns.

Figure 3B:
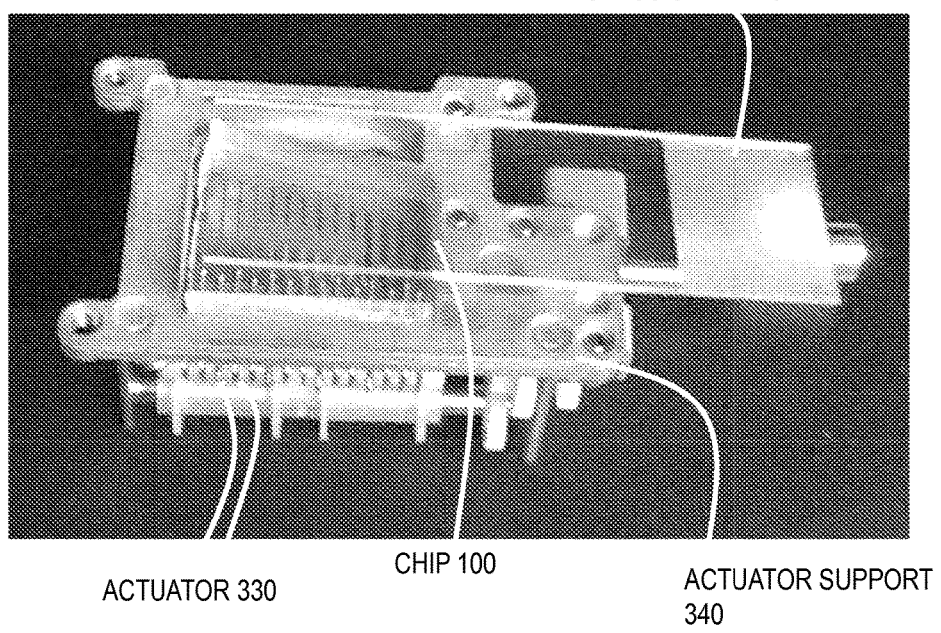
FIG. 3B is a photograph that illustrates an example microfluidic chip mounted in an actuation apparatus, according to an embodiment.

In the illustrated embodiment, the recess 312 is shaped so that the chip 100 fits inside in only one orientation to ensure that the chip 100 is properly disposed in the recess 312 so that the microchannels in an actuation interaction region of chip 100 align with the actuators 330. Thus, the recess is configured for removably receiving the chip with the plurality of microfluidic channels. FIG. 3B is a photograph that illustrates an example microfluidic chip 100 on glass slide 210 mounted in an actuation apparatus 300, according to an embodiment. The actuator support 340 and actuators 330 are apparent.

Thus, an actuation apparatus includes a support structure 240, 340 including a recess 312 configured for receiving a chip 100 with a plurality of microfluidic channels 110. The apparatus also includes a plurality of actuators 230, 330 rotatably connected to the support structure; and, each actuator includes a plurality of teeth 232, 332 protruding outward from the actuator. Each actuator of the plurality of actuators is positioned so that, at least in some angle of rotation, a tooth of the actuator extends into the recess 312 sufficiently to compress a microfluidic channel 110 in a chip 100 placed in the recess 312. The apparatus also includes a punch card guide 244, 344 connected to the support structure 240, 310, respectively, and configured to guide a punch card 270, 370, respectively, with a plurality of punched features 372 (such as holes 272) so that at least in some angle of rotation a tooth of an actuator of the plurality of actuators extends into the punch card guide sufficiently to engage a punched feature on a punch card disposed in the punch card guide.

In the illustrated embodiment, actuator apparatus 300 includes a manual crank 350 mechanically connected by gears 314 to roller 340 and shaft 342, to advance the punch card 270. Because at least some of the actuators 330 are rotatably connected to the shaft 342, the rotation of shaft 342 can assist in the advancing of punch card 270 without rotating the actuators 330. In other embodiments, the manual crank 350 is mechanically connected to the roller 340 or other rollers that are part of the punch card guide 244, but not to the shaft 342. Thus, in some embodiments, the punch card guide comprises a pair of rollers and a crank, and at least one roller of the pair of rollers is mechanically connected to the crank such that the punch card is advanced when the crank is rotated. In some embodiments, the crank is rotated manually. In some other embodiments, the manual crank is replaced by a motor. In still other embodiments, the manual crank and motor are omitted; and, the apparatus 300 is operated by an operator manually pulling on the punch card to advance the punch card.

In some embodiments, fluid in one microchannel, such as the immiscible fluid in microchannel 120, is propelled at each step and so an actuator corresponding to that microchannel rotates at every step, as indicated by a feature 372 (such as hole 272) at a regular interval along the punch card 270, 370 (the regular interval corresponding to the distance between teeth on the actuator). In some of these embodiments, the actuator for the immiscible fluid channel is fixed to the shaft 342 and mechanically connected to the crank 350 or other handle.

In some embodiments, a spring or other component is included to store the mechanical energy produced by turning the crank, and the card is advanced by the unwinding of the spring or mechanical release of the other component. In some embodiments, the rate of mechanical release is controlled so that the card is advanced at a rate prescribed for one or more protocols. In some embodiments the punch card is advanced by an electronic motor powered by power line or battery or solar panel or electric generator or some other electric power source or by a different kind of motor powered directly by water or wind or geothermal or other energy source.

Figure 3C:
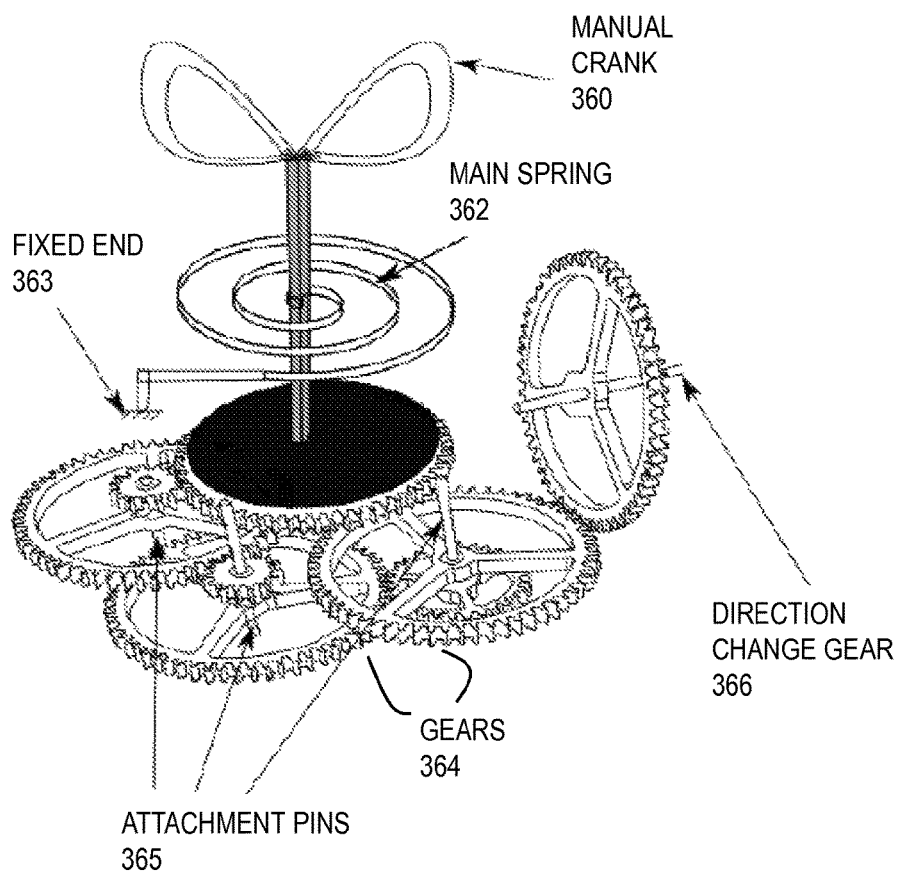
FIG. 3C is a block diagram that illustrates an example wind-up mechanism in an actuation apparatus, according to another embodiment.
Figure 3D:
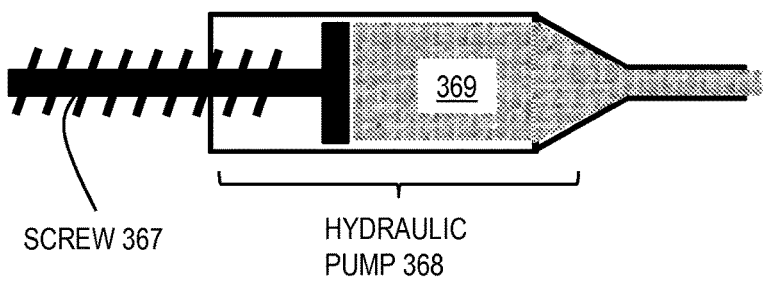
FIG. 3D is a block diagram that illustrates an example hydraulic pump powered by manual or wind-up crank, according to another embodiment.

FIG. 3C is a block diagram that illustrates an example wind-up mechanism in an actuation apparatus, according to another embodiment. The manual crank 360 is connected to a main spring 362 attached at an opposite fixed end to the support structure, e.g., actuator support structure 310. As the manual crank is turned in one direction, the main spring 362 tightens under tension to store mechanical energy. As the spring 362 unwinds, it causes one or more other gears 364, supported on corresponding attachment pins 365 connected to the support structure, to rotate, as well. In some embodiments, one or more gears 364 include a direction and/or rotation axis change gear 366. One of these gears is attached to a shaft that advances the punch card, as described above. In some embodiments one of the gears is attached to a screw that drives a hydraulic pump. FIG. 3D is a block diagram that illustrates an example hydraulic pump 368 powered by manual or wind-up crank, according to another embodiment. As screw 367 is rotated by attachment to one or more gears 365, a dashpot in the pump 368 is pushed against a fluid 369 in the pump, such as the oil used in a two phase system, and propels the fluid through one or more of the microchannels.

Figure 4A:
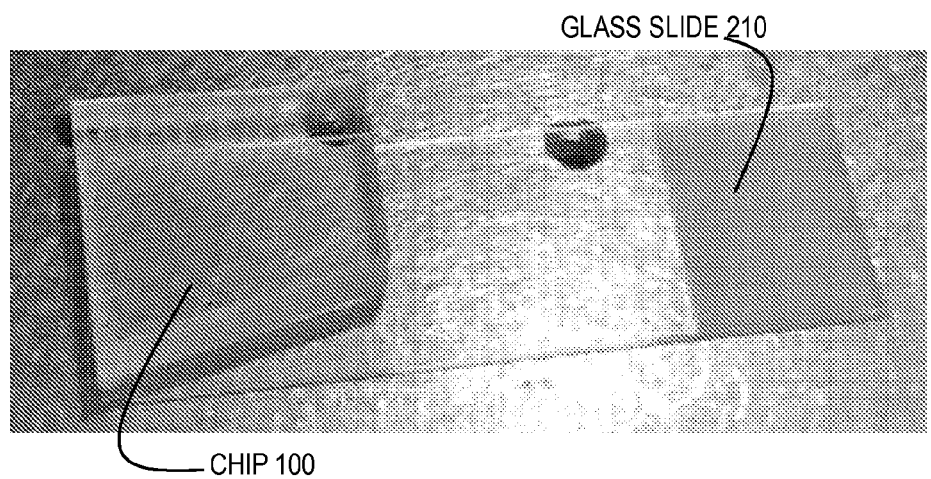
FIG. 4A is a photograph that illustrates an example microfluidic chip bonded on a glass slide, according to an embodiment.
Figure 4B:
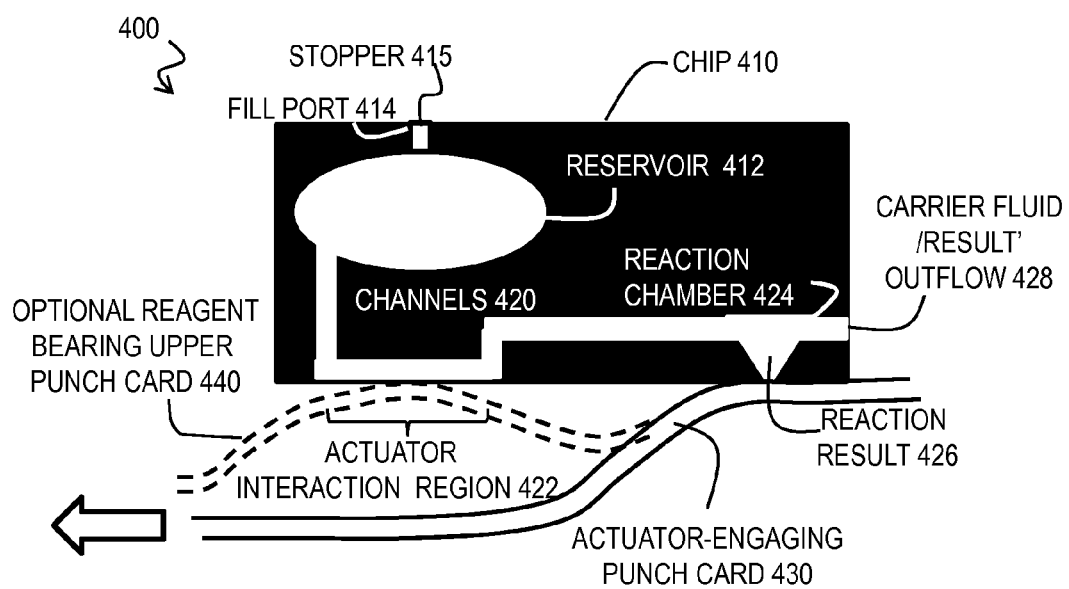
FIG. 4B is a block diagram that illustrates an elevation cross section of an example microfluidic chip and relation to a punch card, according to an embodiment.

FIG. 4A is a photograph that illustrates an example microfluidic chip 100 bonded on a glass-slide 210, according to an embodiment. FIG. 4B is a block diagram that illustrates an elevation cross section of an example microfluidic chip 410 and relation to an actuator-engaging punch card 430, according to an embodiment. The chip 410 includes a reservoir 412, microchannels 420 and a reaction chamber 424. At least a portion of the microchannels 420 have a flexible outer wall and thus constitute an actuator interaction region 422 where an actuator can compress the channel and propel the fluid therein.

The reservoir 412 is configured for holding a fluid used in the protocol, including the immiscible carrier fluid, such as oil, for a two-phase protocol. In some embodiments, the chip is single-use; the reservoir is supplied with the fluid and the reservoir is sealed. In other embodiments, the chip is reused or reusable, and the chip 410 includes a fill port 414. In some embodiments, a stopper 415 is placed in the fill port 414 after the reservoir 412 is filled to keep the fluid within the reservoir 412. In some embodiments, the orientation of the chip 410 in use is such that gravity keeps the fluid in the reservoir 412 without the stopper 415, and the stopper 415 is omitted. In some embodiments, described in more detail below, one or more fluids for the protocol that uses chip 410 are provided in a capsule of the punch tape, and the reservoir 412 is omitted for one or more of the microchannels 420 in chip 410. Instead, fluid is transferred from the punch card 430, such as optional reagent bearing upper punch card 440, in the actuator interaction region 422 of the microchannel 420. In some embodiments, the reservoir is used in conjunction with the transfer of material from the punch card 430, for example a powder from the punch card is added to water or other solvent in the reservoir 412. In some embodiments, port 414 is connected to an external source of fluid, such as tubing, or to an external reservoir. In some of these embodiments, the reservoir 412 is omitted.

In various embodiments, one or more microchannels 420 converge into a reaction chamber 424 where fluids propelled in one or more actuator interaction regions react to provide a result 426 (also called a product) of the protocol. For example, in some embodiments, the result 426 of the reaction is a temperature change or a color change or change in composition or some other physical manifestation. In some embodiments, that result travels through the outflow port 428, with or without the carrier fluid, if any, and is detected by a user, either manually (e.g., by visual appearance, taste, odor, or texture, or some combination) or with the aid of some appropriate detector, such as a thermometer. For example, a fluid or solid of a particular color visible at the outflow port 428 indicates one of two or more possible results of the protocol, each different result indicated by a different color. In some embodiments, the result is deposited on the punch card 430 that is brought into contact with the reaction chamber 424 or outflow 428 by the punch card guide 244. For example a stain on the punch card 430 of a particular color indicates one of two or more possible results of the protocol, each different result indicated by a different colored stain. In FIG. 4B, each component of the chip is shown at a particular different elevation for purposes of illustration; however, in other embodiments, the various components are at the same elevation or at different elevations that are different also from those depicted in FIG. 4B.

Thus, a microfluidic channel chip includes a body structure having formed therein a plurality of microfluidic channels in an actuator interaction region, a reaction chamber and a reservoir. Each microfluidic channel in the actuator interaction region has at least one dimension in a size range from about 0.1 micron to about 1000 microns, and is separated from an outside of the body structure by an outer flexible substrate. The reaction chamber is in fluid communication with a first end of each of the plurality of microfluidic channels in the actuator interaction region. The reservoir is configured to hold a supply of a fluid in fluid communication with a second end opposite the first end of at least one channel of the plurality of microfluidic channels in the actuator interaction region.

Figure 4C:
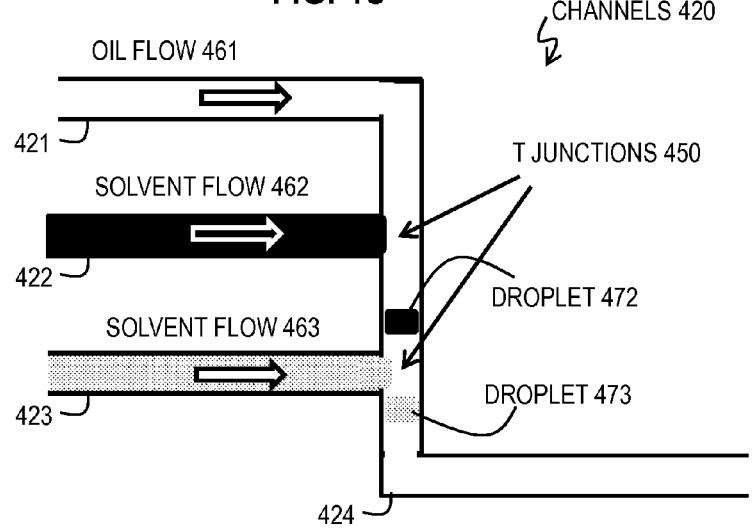
FIG. 4C is a block diagram that illustrates a portion of a plan cross section of an example microfluidic with example fluid movement, according to an embodiment.

FIG. 4C is a block diagram that illustrates a portion of a plan cross section of an example microfluidic chip with example fluid movement, according to an embodiment. The plan depicts microchannels 420 for a two phase flow with oil flow 461 in one channel 421 and water soluble solvent flows 462 and 463 for two different solvents in two different microchannels 422 and 423, respectively. Channels 421, 422 and 423 are in or downstream of an actuator interaction region of the channels 420. A T-junction, with or without the narrowing depicted in FIG. 1A, inhibits flow from the solvent channels 422 and 423 into channel 424 unless the fluid in the channel is propelled by compression of the interaction region of the corresponding channel by a tooth of an actuator. Similarly oil in channel 421 is propelled. By timing the compression of the interaction regions associated with channels 421, 422, 423, the introduction of droplets 472 and 473 from channels 422 and 423, respectively, can be controlled, including the number of droplets and spacing. For example by propelling solvent flow 462 before propelling solvent flow 463, the distance between droplets 472 and 473 can be less than the distance between the T-junctions of channels 422 and 423 with channel 424. If the droplets are timed to coincide in space within channel 424, then channel 424 is at least part of the reaction chamber. In the illustrated embodiment, the droplets are kept separate in the oil flow, and the reaction chamber is downstream of channel 424.

Figure 5:
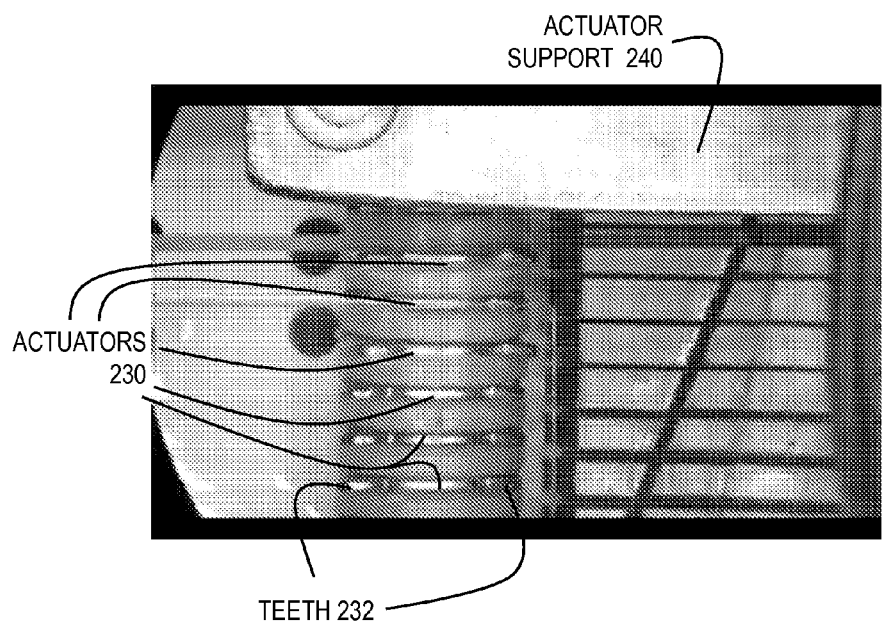
FIG. 5 is a photograph that illustrates an example top-down view of the actuation apparatus, according to an embodiment.

FIG. 5 is a photograph that illustrates an example top-down view of the actuation apparatus, according to an embodiment. Evident is actuator support 240, six actuators 230, and teeth 232 on several actuators. The actuators are thin in this view; and can be characterized as discs with teeth. Multiple actuators 230 engage the microfluidic device simultaneously, thus a large number of channels can be programmed. The punch code lines can be packed closely for large number of channels with reagents; programming information can be included at high density along the card tape for rapid actuation. Further design considerations allow for repeatable operation for a large variation of tape travel velocity, making the various device embodiments robust.

Figure 6:
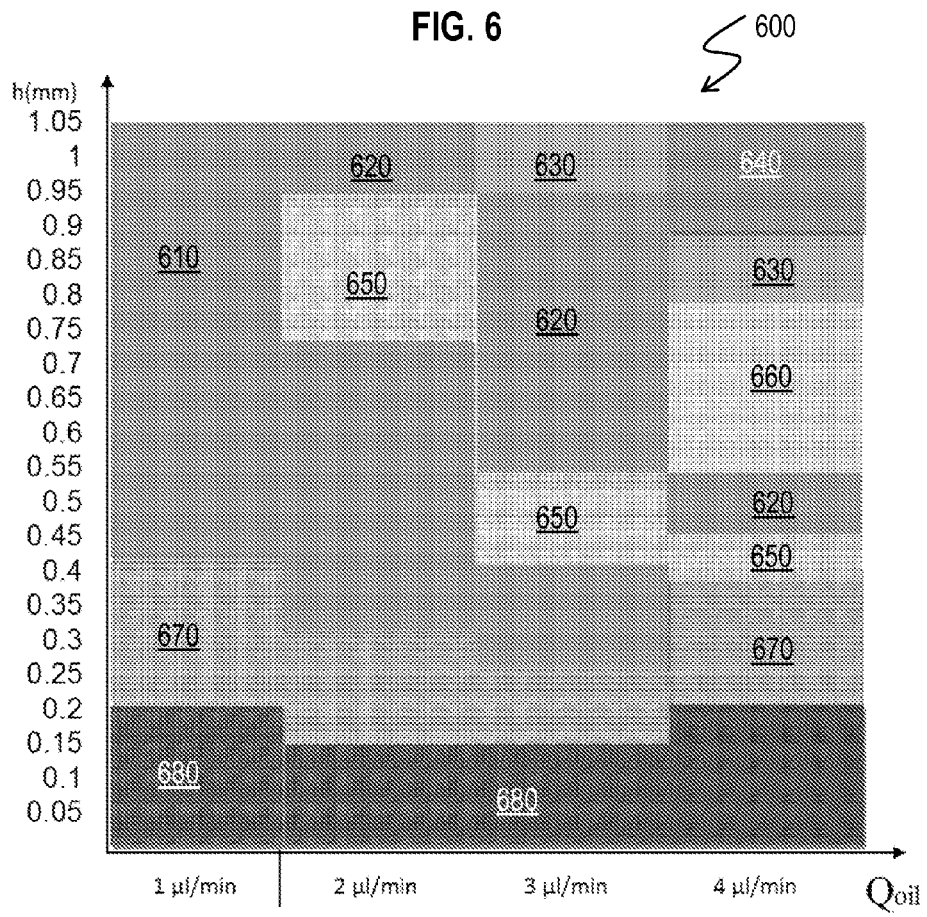
FIG. 6 is a block diagram that illustrates an example phase-diagram depicting different flow regimes across various channel heights and oil flow rates for the example apparatus and chip of FIG. 3B, according to an embodiment.

FIG. 6 is a block diagram that illustrates an example phase-diagram depicting different flow regimes across various channel heights and oil flow rates for the example apparatus and chip of FIG. 3B, according to an experimental embodiment. The horizontal axis indicates flow rate (Q) of oil in the oil channel 120 for four different values of the flow rate (1 microliters [µl] per minute (min); 2 µl/min; 3 µl/min and 4 µl/min). The vertical axis indicates the height (h) (e.g., h 112 in FIG. 2) in millimeters of an actuator penetration into a sample fluid microchannel (e.g., one of microchannels 120 or 422 or 423). The different areas indicate different rates of entrainment of fluid from the sample fluid microchannel as measured during an experiment. Given that the fluid channel dimensions are known, the dispensed volume was determined by measuring the droplet lengths and using this value to calculate the volume. Other parameters include the number of droplets with each actuation, determined by simply counting. Region 680 indicates no droplets of sample extruded to the oil flow as a hole on a punch card moves past the actuator; region 670 indicates 1 droplet of sample fluid per 3 to 5 holes, region 610 indicates 1 droplet per hole (and provides for simple programming of the system), region 650 indicates 1 to 2 droplets per hole; region 620 indicates 2 droplets per hole; region 660 indicates 2 to 3 droplets per hole; region 630 indicates 3 droplets per hole; and region 640 indicates 4 droplets per hole.

Figure 7A:
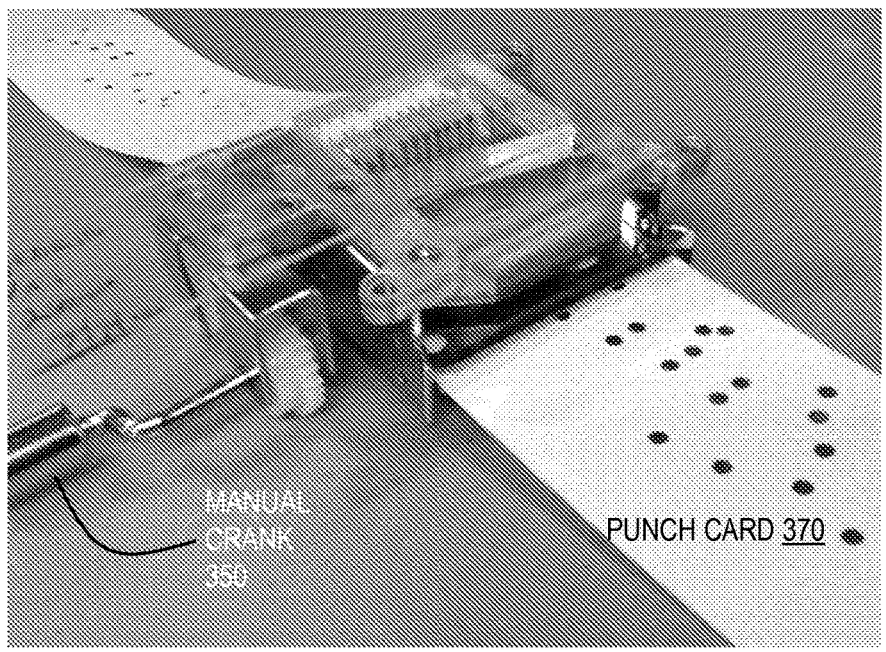
FIG. 7A and FIG. 7B are pictures that illustrate example operation of the apparatus with a chip and punch card tape and a manual crank, according to an embodiment.
Figure 7B:
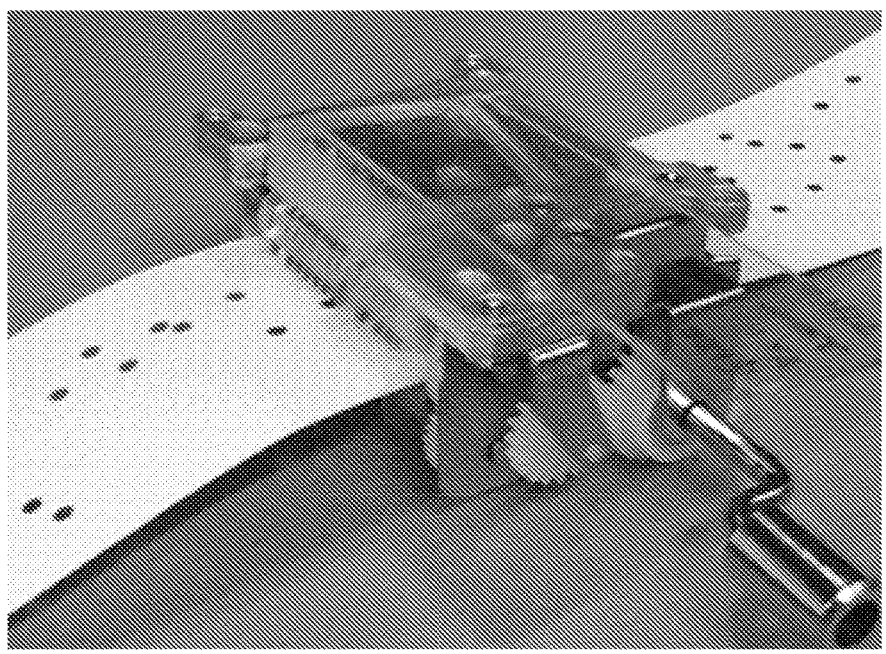

FIG. 7A and FIG. 7B are pictures that illustrate example operation of the apparatus with a chip and punch card tape and a manual crank, according to an embodiment. For example, the embodiment of FIG. 3A is shown in operation. A user rotates the crank 350 to rotate the shaft 342, which rotates the actuator 330 for the immiscible fluid channel and advances the punch card tape 770 that has holes at regular intervals in line with the immiscible fluid channel. In some embodiments, a line of punch features is not used to propel the immiscible carrier fluid. Instead, that carrier fluid line is propelled with a gear teeth design that ensures that it is constantly running, e.g., fixed to the shaft that advances the punch card or via the wind-up mechanism detailed in FIG. 3C, or through hydrostatic action from an external reservoir, e.g., manually using a syringe or via a syringe pump as depicted in FIG. 3D.

Initial multi-phase flow experiments with the illustrated embodiment have demonstrated the successful generation of droplets ranging from five to 20 nanoliters. FIG. 8 is a photograph that illustrates example droplet generation, according to an embodiment. As teeth 332 on actuators press on fluid channels, droplets 810 are introduced downstream of T-junctions into the flow of the immiscible fluid (e.g., oil). Results from experimental embodiments reveal that the number of droplets generated by the device for each amount of water-based solvent released depends on the flow-rate of the oil line, as plotted in FIG. 6. As the oil line flow rate increases, so does the number of droplets generated for a particular actuation height due to the increased shearing rate as the water-based solvent pierces the oil line at the T-junction. The droplet size in these embodiments is found to be inversely proportional to the droplet frequency for a constant water-based solution and varying oil flow rate. These results are consistent with those found in other similar experiments (e.g., see P. Garstecki, I. Gitlin, W. DiLuzio, G. M. Whitesides, E. Kumacheva, and H. A. Stone, Formation of monodisperse bubbles in a microfluidic flow-focusing device, Applied Physics Letters, 85 [13]). This relationship allows the incorporation of multiple droplets per bit of code in the punch card, further extending the number of coding schemes that are made possible by the apparatus.

Figure 9A:
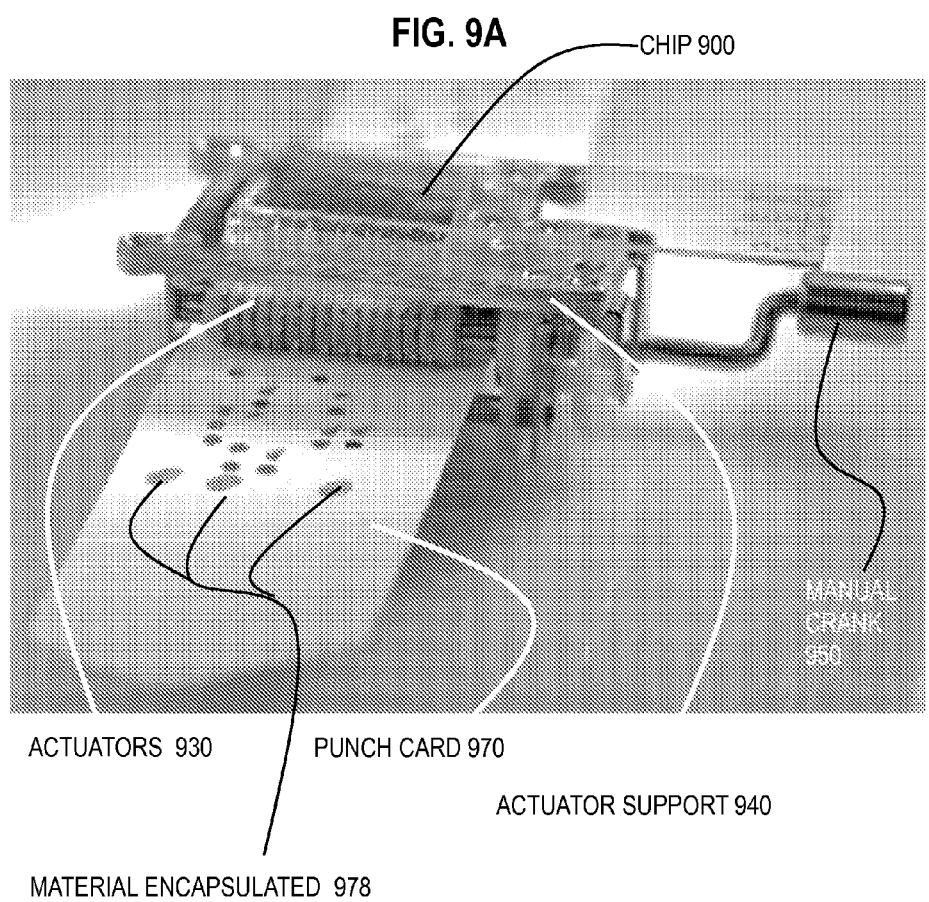
FIG. 9A and FIG. 9B are pictures that illustrate example operation of the device with a punch card tape with fluid encapsulated and a manual crank, according to an embodiment.
Figure 9B:
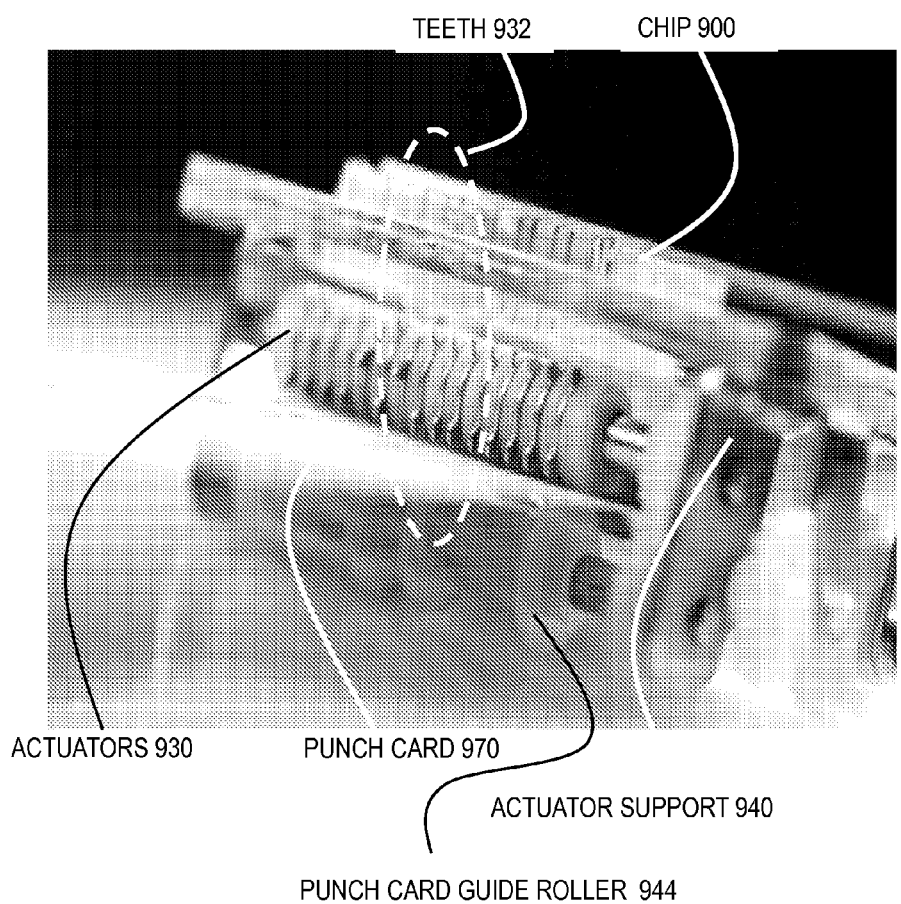

FIG. 9A and FIG. 9B are pictures that illustrate example operation of the device with a punch card tape with material encapsulated and a manual crank, according to an embodiment. Depicted is the actuator support 940 connected to actuators 930. A chip 900 is inserted into a recess of the actuator support 940. A punch card 970 is traversing through the apparatus. Also apparent in FIG. 9B are teeth 932 on actuators 930 and a punch card guide roller 944 used as a punch card guide. Some punch features have materials encapsulated 978, such as a sample or reagent, as a liquid or a powder or solid block or gel. Any method may be used to encapsulate material in a punch feature, such as bubble capsules described in a later section.

FIG. 10A through FIG. 10H are block diagrams that illustrate example compression of a microchannel 1010 in a chip by a 90 degree rotation of an actuator 1030 in 15 degree increments, respectively, according to an embodiment. The example actuator 1030 has four teeth 1032, each with a rounded leading edge; and, therefore, actuator 1030 has 90 degree symmetry. When no tooth of the actuator is engaged with the punch card 1070, e.g., where there are no punch features in the punch card 1070, the actuator is at an angle theta (θ) of 0, as shown by Θ1033 in FIG. 10A with the leading edge of one tooth nearly or barely in contact with the microchannel 1010. The actuator 1030 stays at that orientation until a punch feature engages a tooth opposite to the tooth (barely) in contact with microchannel 1010 at θ=0. As a punch feature comes upon an opposite tooth of the actuator at θ=0, that tooth drops into the punch feature as shown in FIG. 10B. As the punch card moves, the actuator 1030 rotates and the tooth originally barely in contact with the microchannel 1010 deforms the flexible substrate of the microchannel, compressing the microchannel and any fluid therein, and proceeds to sweep through to θ=90 degrees and a distance D 1036 along the microchannel, as depicted in FIG. 10C through 10G. When the punch feature moves out of reach of the opposite tooth, the actuator, because of its 90 degree symmetry, again matches the original configuration with a tooth barely or nearly in contact with the microchannel at θ=0 degrees.

FIG. 10I through FIG. 10O are photographs that illustrate example compression of a channel in a chip by a 90 degree rotation of an actuator in 15 degree increments, respectively, according to an embodiment. Two actuators are visible. The upper actuator does not engage a punch feature and does not move. Its teeth stay in a fixed position during the sequence. In contrast, the lower actuator moves a distance D in 6 increments, corresponding to the 15 degree increments in the change of θ. The deformation of the flexible substrate causes light to bend which forms a light half circle 1019 below the tooth in FIG. 10K and FIG. 10L.

Figure 11A:
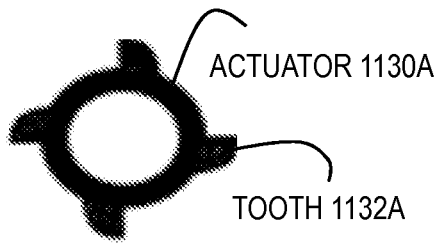
FIG. 11A through FIG. 11E are block diagrams that illustrate example actuator and tooth shapes, according to various embodiments.
Figure 11B:
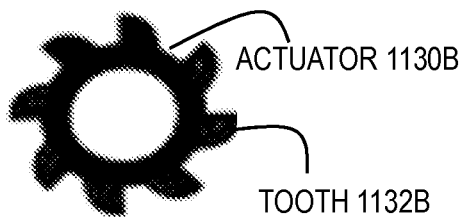

Various actuator and tooth shapes are used in various embodiments. FIG. 11A through FIG. 11E are block diagrams that illustrate example actuator and tooth shapes, according to various embodiments. FIG. 11A depicts an actuator 1130A with 4 identical teeth 1132A, each with a rounded leading edge. The four evenly distributed teeth provide 90 degree symmetry. This actuator is depicted in several example embodiments. FIG. 11B depicts an actuator 1130B with 8 identical teeth 1132B, each with a rounded leading edge.

Figure 11C:
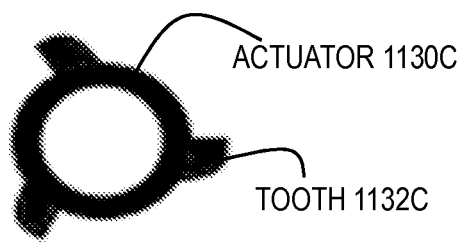

The eight evenly distributed teeth provide 45 degree symmetry. FIG. 11C depicts an actuator 1130C with three identical teeth 1132C, each with a rounded leading edge. The three evenly distributed teeth provide 120 degree symmetry.

Figure 11D:
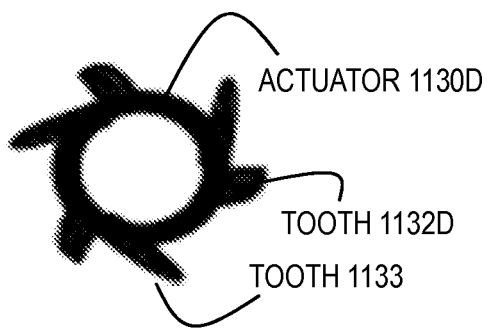

FIG. 11D depicts an actuator 1130D with three identical pair of teeth 1132D and 1133. Teeth 1132D each have a rounded leading edge. The second tooth 1133 of each pair is a slanted pin shape. In some embodiments, the slanted pin-shaped tooth 1133 is used for valve action, to close off a channel before fluid is propelled by the other tooth 1132D of each pair. The three evenly distributed pairs of teeth provide 120 degree symmetry. This actuator can act both as valve and pump simultaneously, in some embodiments. In each pair, one tooth 1133 is used as a valve by closing the microchip channel while the other tooth 1132D positioned right behind tooth 1133 is used as a pump for propelling the fluids forward. When the propelling tooth 1132D is not engaged with a punched feature in the punch card, the valving tooth 1133 closes the microchannel. When the first tooth 1132D is engaged by the punch feature, the other tooth 11333 is moved away and opens the microchannel. The second tooth behind it then propels the fluid in the microchannel. Thus, one tooth 1133 of the plurality of teeth on an actuator of the plurality of actuators is configured to close a microfluidic channel of the plurality of microfluidic channels on the chip to prevent flow of a fluid in the microfluidic channel in a first direction along the microfluidic channel, and a different tooth 1132D of the plurality of teeth on the actuator is configured to propel the fluid in the microfluidic channel into the first direction along the microfluidic channel.

Figure 11E:
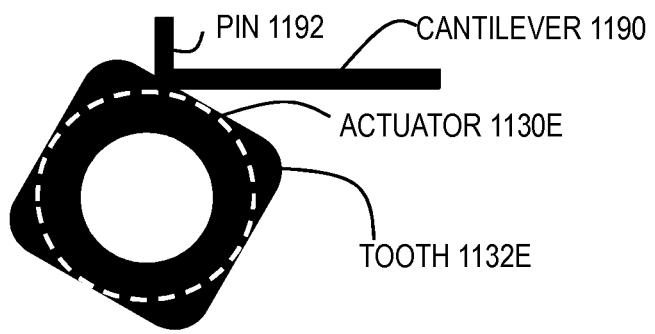

FIG. 11E depicts an actuator 1130E with four identical teeth 1132E, each with a slanted leading edge and slanted trailing edge so the actuator looks like a rounded square. The three evenly distributed teeth provide 120 degree symmetry. Other regular polygons or rounded polygons are used in other embodiments. Other designs, used in some embodiments, include cam wheels that result in the propulsion of fluids in different ways, e.g., by moving a separate pin vertically to provide non-directional pumping in contrast to the sweeping pumping described above. In some embodiments, the actuator 1130E acts as a cam to vertically move a pin 1192 on cantilever 1190 to provide such vertical pumping or valving.

In such embodiments, the pin 1192 is a tooth of a compound or multi-moded actuator that includes both the original actuator 1130 and cantilever 1190 with pin 1192.

Various actuator shapes and other ways to mechanically drive the fluid were explored, such as the up and down motion of pins to produce different flow patterns and ways of manipulating fluids to a desired effect. This allows the actuator to be used both for pumping and/or valving. When used for valving, the actuator valves can be either in "always ON" or "always OFF" state, switched for example by pins contacting gears as depicted in FIG. 11D, or by tilting the chip, as described in more detail below. Moreover, in various embodiments, actuator and tooth shapes propel discrete flow rates thus allowing pipetting-like operations that measure the amount of fluid dispensed.

Various size actuators and teeth are used in various embodiments. Ranges of actuator widths for various embodiments were described above. In various embodiments, the diameter of actuators vary from a smaller diameter of about 3 mm, which translates to lesser material for the thick substrate (thickness will reduce by the same order of magnitude) and also a shorter distance between the microchannel and the punch card tape (which will make it easier to transfer material into and out of the chip). A larger diameter of about 16 mm makes it possible to get many more pulses with each cranking action as you can fit more gear teeth. In some embodiments, teeth with variations in height are used on the same actuator (e.g., alternating teeth with about a 30 micron height difference, such as the second, fourth, sixth and eighth teeth having a height of about 1500 microns from an axis of rotation while the $1^{st}$, $3^{rd}$, $5^{th}$ and $7^{th}$ teeth having a height of about 1520 microns). This enables having fluid in some channels propelled with less perturbation than others, leading to variation in fluid dispensed. As determined above, there is a regime in which the channel collapse on actuation is not complete yet at least some fluid is still propelled.

In some embodiments, the actuator diameter and teeth height is selected to match a microchannel height plus thickness of the flexible substrate to fully motivate the fluid in the microchannel. In some embodiments, the actuator diameter and teeth height is selected to only partially penetrate the microchannel to allow for some backflow and mixing. In some embodiments, the actuator diameter and teeth height is selected to exceed the microchannel height to compress the opposite substrate or compress other microchannels farther from the outermost microchannel. In some embodiments, teeth of different heights are used on the same actuator. In some embodiments, a width of the tooth of the actuator is in a range from about 10 microns to about 1000 microns; and, spacing between a pair of actuators of the plurality of actuators along the support structure is in a range from about 20 microns to about 2000 microns. In various embodiments, a tooth of an actuator of the plurality of actuators protrudes outward from the actuator by a distance in a range from about one micron to about 100 microns to partially or completely fill the height of a microchannel in the actuator interaction region.

Figure 12A:
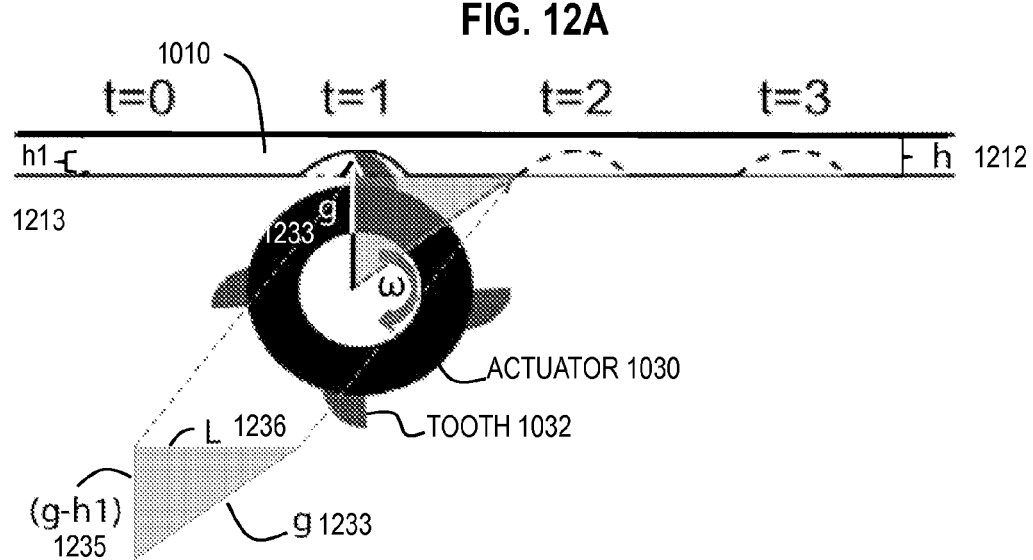
FIG. 12A through FIG. 12C are block diagrams that illustrate example geometry of actuator interaction with a channel in a chip, according to an embodiment.
Figure 12B:
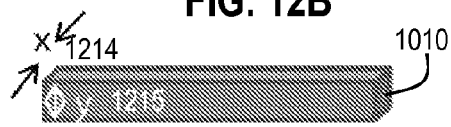
Figure 12C:
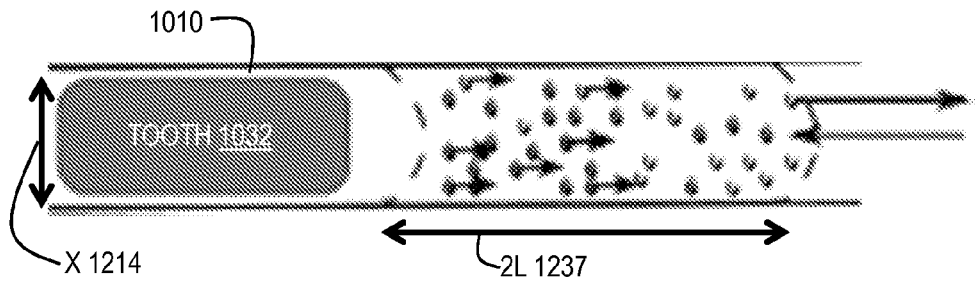

An analytical model was constructed for single phase fluid experiments of an elastomer coupling to a mechanical gear reflecting the mode of operation of the illustrated device embodiment. FIG. 12A through FIG. 12C are block diagrams that illustrate example geometry of actuator interaction with a microchannel 1010 in a chip, according to an embodiment. The channel height is h 1212. From a center of an actuator 1030 to an outer edge of a tooth 1032 is a distance g 1223. The maximum distance that the tooth 1032 penetrates into the microchannel 1010 is the actuation height h1 1213 which may be less than or equal to h 1212. In some embodiments, where the opposite substrate is also flexible, h1 1213 may be greater than h 1212. Thus, the distance from the center of the actuator to the bottom of the microchannel is given by the expression g−h1. The distance along the microchannel that the tooth impinges on the channel from maximum penetration to no penetration is given by the length L. The value of L can be determined from g and h1 based on the right triangle depicted below the actuator and the Pythagorean Theorem, as given by Equation 1.

$$L=(g^2-(g-h1)^2)^{1/2} \qquad (1).$$

The total distance that the tooth travels in the channel 1010 is 2L. FIG. 12B depicts a volume of fluid in microchannel 1010 that is compressed (or "squeezed") by the motion of tooth 1032 within the microchannel 1010. The volume has a height y 1215 and a width x 1214. The value of x is the width of the flexible substrate pushed into the microchannel by the tooth 1032, and is approximately equal to the width of the tooth 1032. The value of y is less than the actuation height h1, because the tooth moves from no penetration to the maximum penetration. The penetration follows a sine wave with a maximum of h1, so y is the average of this sine wave over one quarter cycle. The squeezed or compressed volume V of fluid set in motion by the progression of the tooth 1032 is then given by Equation 2.

$$V=2L \times y=2xy(g^2-(g-h1)^2)^{1/2} \qquad (2)$$

FIG. 12C is a plan view of the microchannel 1010 penetrated by tooth 1032, showing the relationship to the width x of the fluid volume in motion, and the length 2L. Fluid molecules in a pulse region bracketed by dashed curves flow in the direction the tooth sweeps through the microchannel, left to right in the drawing. The backward arrow indicates that with each actuation, there is some fluid that flows backward as the penetration of the pin displaces it. It is somewhat akin to squeezing out toothpaste from a tube. One can consider this action as being comprised of two main steps: the squeezing, and then the pushing. The initial squeeze leads to some backward displacement as the pressure from the reservoir is lower than that exerted on the fluid during the actuation.

From this model, fluid velocity was calculated and confirmed for different actuation positions. The model includes operating parameters such as rotational velocity of the gear, elastic modulus of the polymer, and geometrical coupling parameters. In one mode of operation, a pinch in a channel travels along the direction of the channel as shown in FIG. 12A by the curves at times t=1, 2 and 3. The motion of the actuator tooth thus pumps fluid based on the volume swept in the channel in a unit amount of time. FIG. 12A illustrates a pinch in the thin PDMS substrate that propagates with a certain volume of fluid as a result of actuator action, according to an embodiment. This depicts an example device embodiment functioning for single phase flow to calculate fluid flow rate. This allows for discreet programming of volume dispensed as a function of the length of pinch travel points (function of gear shape). Thus pipetting operations can be performed easily.

Figure 13:
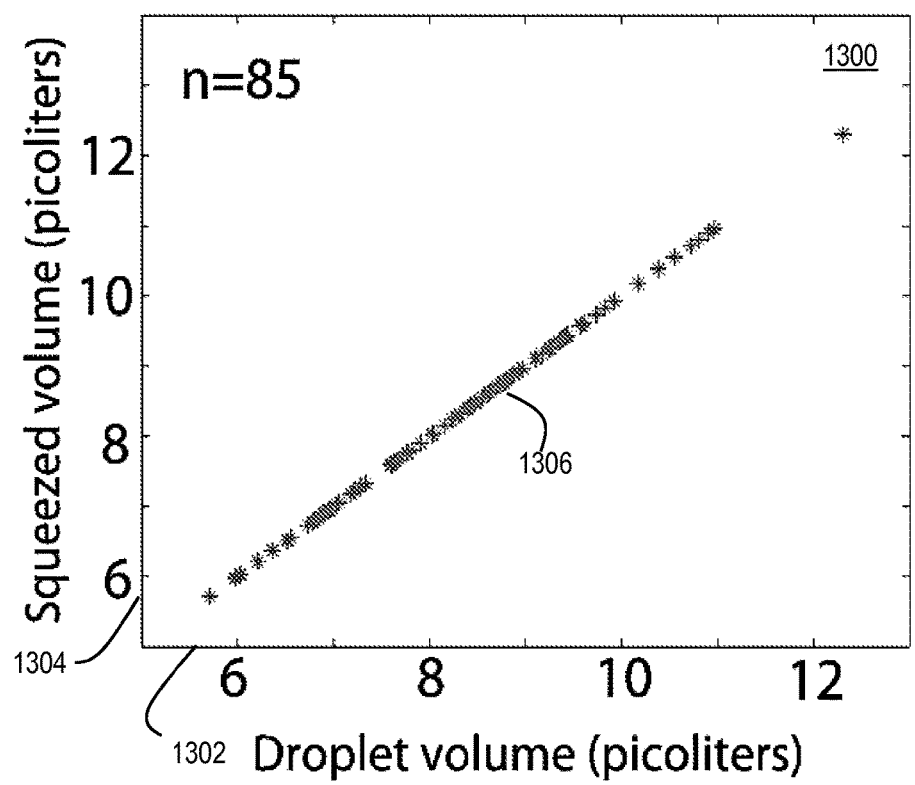
FIG. 13 is a graph that illustrates example droplet volume dependence on compressed volume, according to an embodiment.

Measurements were made for two phase embodiments as well. FIG. 13 is a graph 1300 that illustrates example droplet volume (V from Equation 2) dependence on compressed volume, according to an embodiment. The horizontal axis 1302 indicates droplet volume in picoliters (pL, 1 pL=$10^{-12}$ liters). The vertical axis 1304 indicates the compressed volume caused by the tooth in the microchannel, e.g., as given by Equation 2, in picoliters. The droplet volume is a volume of droplet, such as droplet 472 or droplet 473 of an aqueous solution of some reagent in an oil flow 461 depicted in FIG. 4C. A fluid stream is injected into the continuous oil stream for droplet generation with each stroke of the actuator. For 85 measurements, there is strong relationship with slope 1, e.g., the droplet volume is practically equal to the compressed volume.

Figure 14:
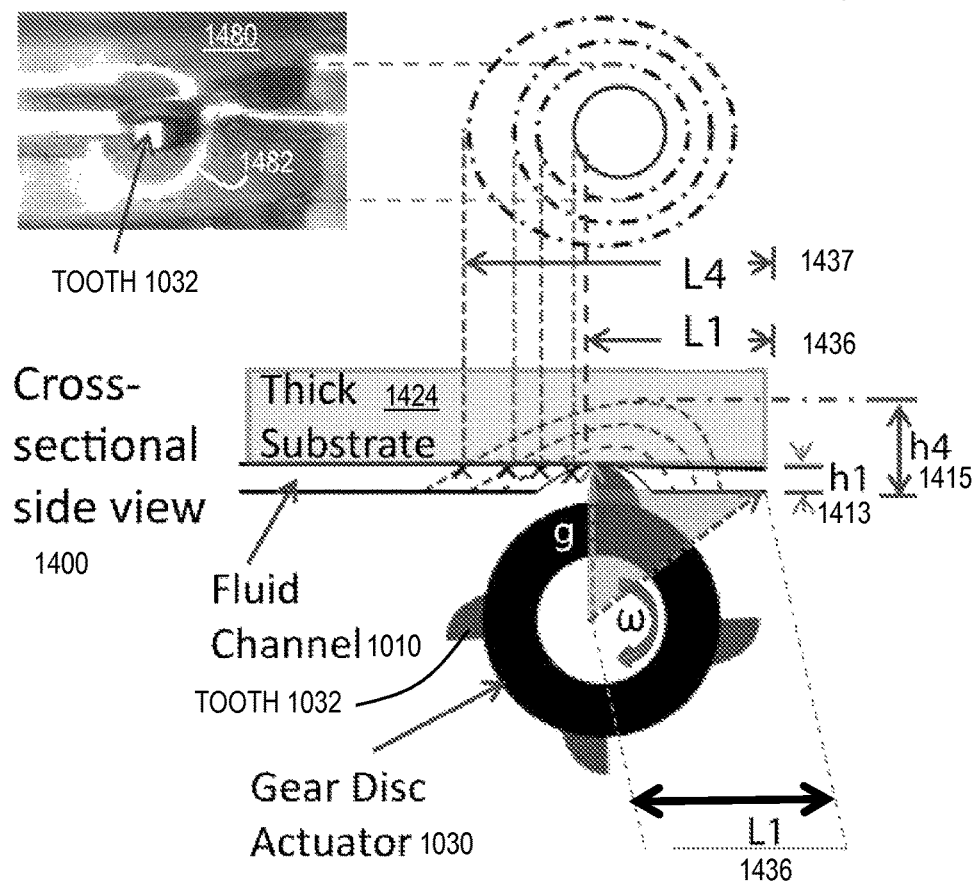
FIG. 14 is a block diagram with photographic insert that illustrates example compression of a substrate in a microfluidic chip, according to an embodiment.

FIG. 14 is a block diagram with photographic insert that illustrates example compression of an opposite substrate 1424 in a microfluidic chip, according to an embodiment. A cross sectional side view 1400 is presented that shows the microchannel (e.g., fluid channel) 1010, the actuator 1030, the tooth 1032, as depicted above. The variables g, h and h1 1413 have the meanings as in FIG. 12. The value of actuation height h1 1413, however, is at least as large as the microchannel height h, so the tooth 1032 compresses the opposite substrate 1424 (such as a thick PDMS substrate). This is true in the regime where there is complete channel collapse for fluid flow. One can still have fluid flow when the channel is perturbed yet not completely collapsed somewhat akin to a peristaltic pump. The heights h1 and h4 are examples of different actuation heights with h4 producing a greater penetration of the teeth as compared to h1. The photographic insert 1489 shows a circular highlight 1482 of diameter less than L4 where light passing through the PDMS material is refracted and internally reflected by the compression of the opposite substrate as a tooth 1032 impinges through the microchannel.

Figure 15:
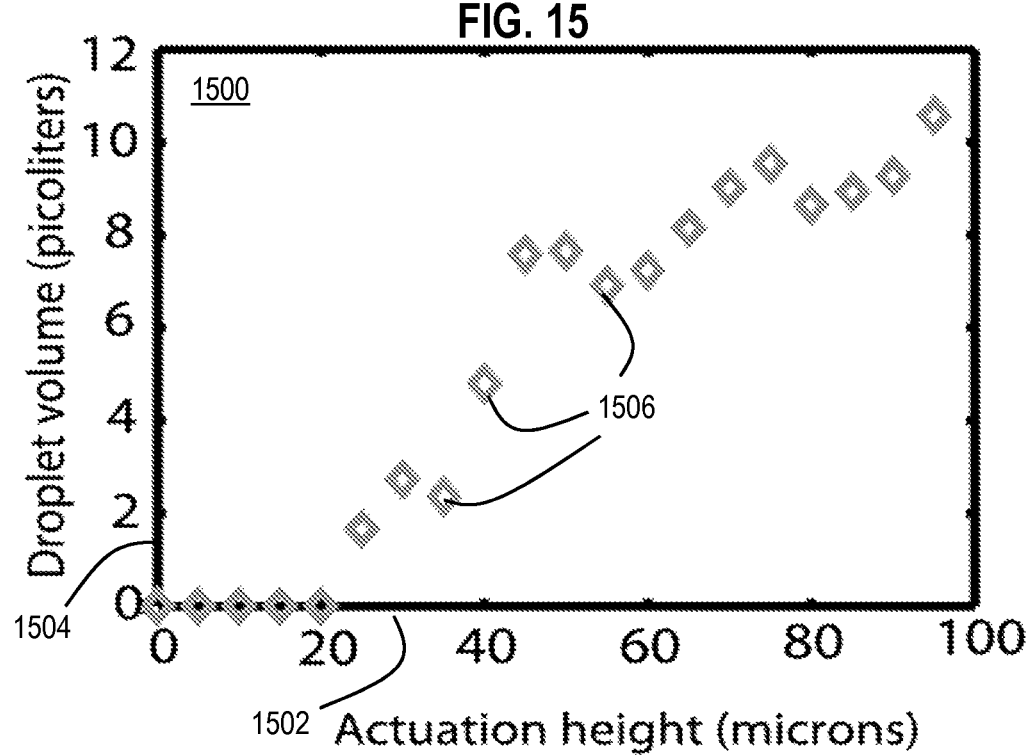
FIG. 15 is a graph that illustrates example droplet volume dependence on actuation height of an actuator, according to an embodiment.

FIG. 15 is a graph 1500 that illustrates example droplet volume dependence on actuation height h1 of an actuator, according to an embodiment. The horizontal axis 1502 indicates the actuation height h1 in microns. The vertical axis indicates the droplet volume in picoliters. The microchannel has a height of about 55 microns, so too little fluid is compressed to form a droplet for activation heights of 20 microns or less. Between 20 and 55 microns actuation height, the droplet volume increases rapidly with actuation height. Above 55 microns, the droplet volume changes somewhat less, but does increase with increase of the average penetration of the tooth over half a sine wave cycle.

Figure 16:
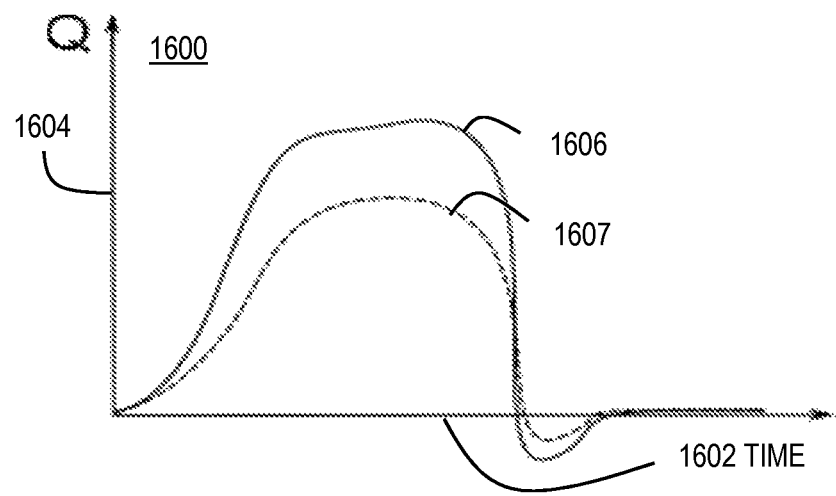
FIG. 16 is a graph that illustrates example flow rate dependence on time for two actuation heights, according to various embodiments.

FIG. 16 is a graph 1600 that illustrates example flow rate (Q) dependence on time for two actuation heights, according to an embodiment. The horizontal axis 1602 indicates time in arbitrary units. The vertical axis 1604 indicates flow rate in arbitrary units. Trace 1606 for a first value of actuation height h1 that is greater than the microchannel height h shows a high flow rate with some backflow (negative flow rate at the trailing edge of the trace 1606). Trace 1607 for a second value of actuation height h2 that is also greater than the microchannel height h but less than h1 shows a lower flow rate with slightly less backflow.

Figure 17A:
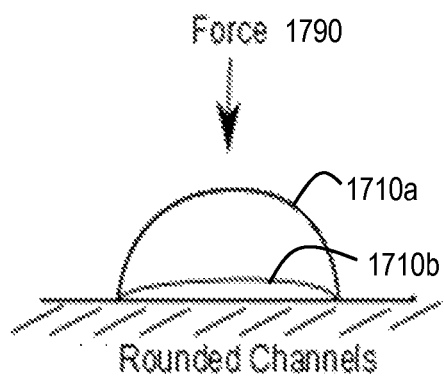
FIG. 17A and FIG. 17B are block diagrams that illustrate effects of compression on channels of different cross sections, according to various embodiments.
Figure 17B:
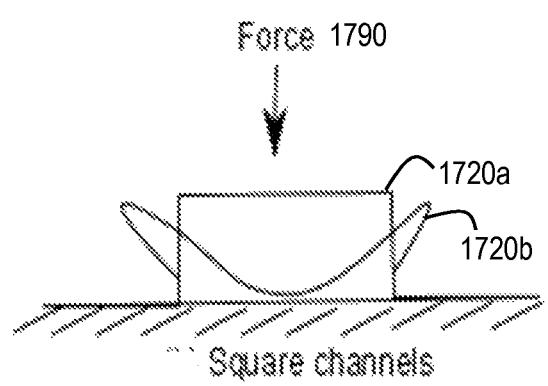

FIG. 17A and FIG. 17B are block diagrams that illustrate effects of compression on channels of different cross section, according to various embodiments. FIG. 17A shows that when a force 1790, such as from an actuator tooth, is applied to a rounded cross section microchannel 1710a, the channel closes neatly to a small concave cross section 1710b. FIG. 17B shows that when the same force 1790 is applied to a rectangular cross section microchannel 1720a, the channel changes to a shape with a complex, convex cross section 1720b. This cross section reaches to the sides and may affect neighboring microchannels. Thus rounded cross-sectioned microchannels used in some embodiments provide the advantage of complete collapse with less force and less deformation to neighboring microchannels.

Figure 18:
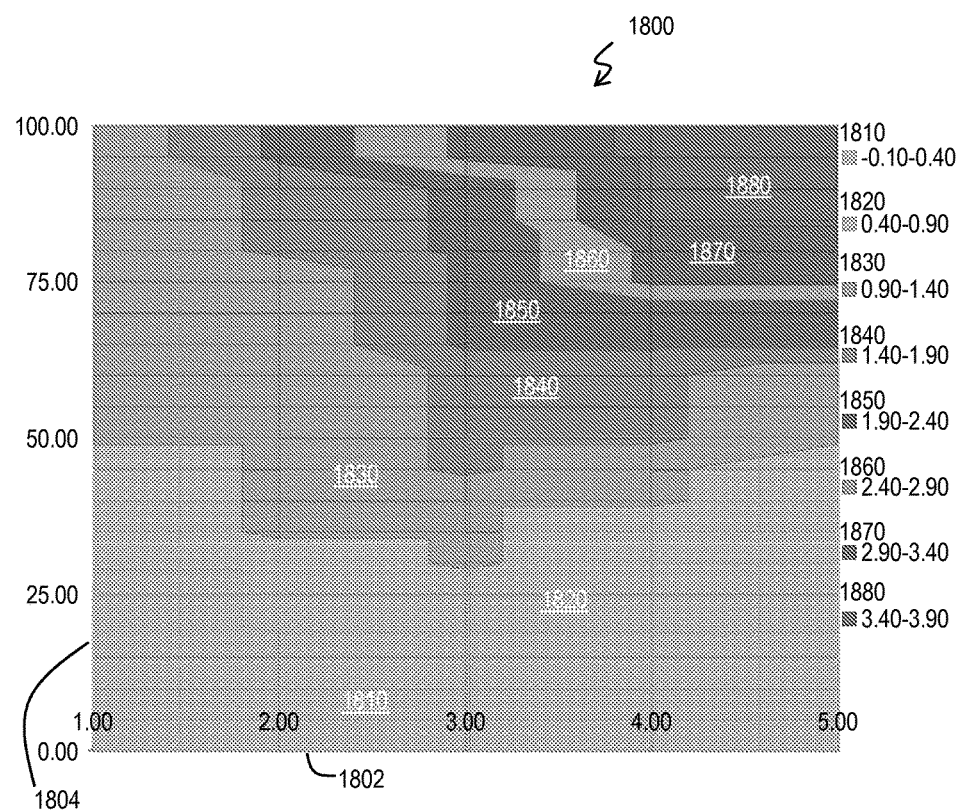
FIG. 18 is a block diagram that illustrates an example phase-diagram depicting different flow regimes across various channel heights and oil flow rates for the example apparatus and chip of FIG. 9A, according to an embodiment.

FIG. 18 is a block diagram that illustrates an example phase-diagram depicting different flow regimes across various channel heights and oil flow rates for the example apparatus and chip of FIG. 9A, according to an embodiment. The horizontal axis 1802 indicates flow rate (Q) of oil in the oil channel 120 for five different values of the flow rate (1 μl/min; 2 μl/min; 3 μl/min; 4 μl/min; and 5 μl/min). The vertical axis 1804 indicates the actuation height (h1) in microns of actuator teeth into a sample fluid microchannel (e.g., one of microchannels 120 or 422 or 423) with channel height of 55 microns. The different areas indicate different rates of entrainment of fluid from the sample fluid microchannel. Region 1810 indicates no droplets of sample on average (−0.1 droplets to 0.4 droplets) as a hole on a punch card moves past the actuator; region 1820 indicates one droplet of sample fluid per 1 to 2 holes; region 1830 indicates one to one and a half droplets of sample fluid per hole; region 1840 indicates one and a half to two droplets of sample fluid per hole; region 1850 indicates two to two and a half droplets of sample fluid per hole; region 1860 indicates two and a half to three droplets of sample fluid per hole; region 1870 indicates three to three and a half droplets of sample fluid per hole; and, region 1880 indicates three and a half to four droplets of sample fluid per hole.

Figure 19:
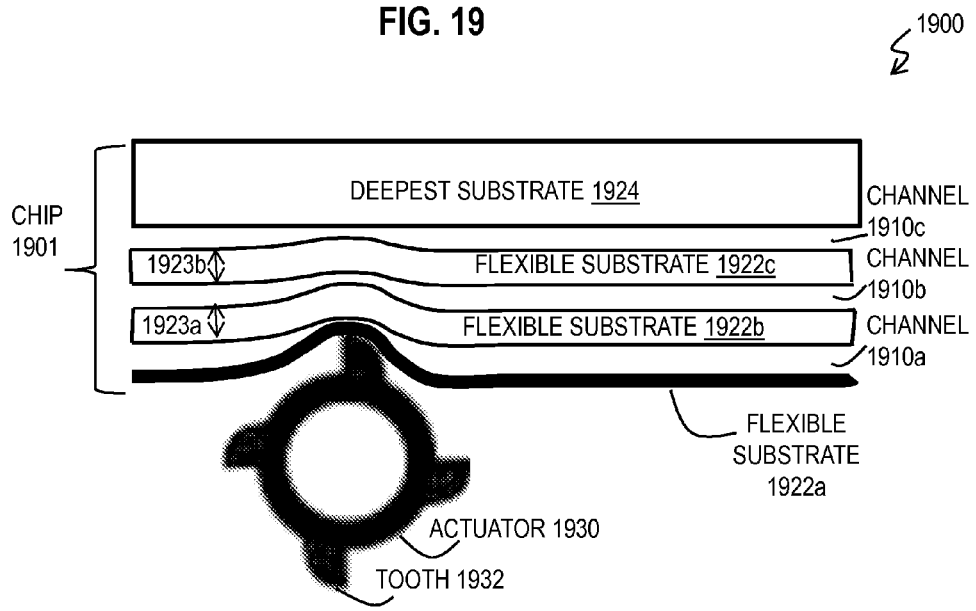
FIG. 19 is a block diagram that illustrates an example three-layered microchannel chip, according to an embodiment.

In some embodiments, the device includes the capacity to multiplex through having multiple layers being actuated simultaneously. FIG. 19 is a block diagram 1900 that illustrates an example three-layered chip 1901, according to an embodiment. The number of microchannels compressed within the chip depends on the actuation pressure of the teeth on the actuators. In the illustrated embodiment, the chip 1901 includes three layers of microchannels aligned with each actuator: microchannel 1910a; microchannel 1910b; and microchannel 1910c (collectively referenced hereinafter as microchannels 1910), all aligned with actuator 1930. In other embodiments, more or fewer layers of microchannels are formed that are aligned with each actuator. A microchannel 1910 in each layer includes a flexible substrate between the microchannel 1910 and the actuator 1930, such as flexible substrate 1922a, 1922b and 1922c (collectively referenced hereinafter as flexible substrate 1922) for microchannels 1910a, 1910b and 1910c, respectively. In an example embodiment, each flexible substrate is made of a thin layer of PDMS with a thickness in a range from about 10 microns to about 100 microns, with the potential to vary the thickness between the different channels. Thicker substrates can be advantageous in propelling in less fluid in the deeper channels where desirable, and vice versa. Thinner interfaces can result in more actuation with each action, across the different layers. In some embodiments, the first flexible substrate 1922a is thinner than the second or third flexible substrates 1922b or 1922c, e.g. is about 10 microns for the first flexible substrate 1922a compared to 50 microns for the other flexible substrates 1922b and 1922c. Farthest from the actuator 1930 is a deepest substrate 1924, such as a stiff substrate formed by a thick PDMS layer.

In the illustrated arrangement, the tooth 1932 of actuator 1930 extends through the first microchannel, e.g., with an actuation height h1 greater than the channel height h. This causes the second flexible substrate 1922b to deflect into the second microchannel 1910b and squeeze a volume of fluid in that microchannel as well. The actuation height in the second microchannel 1910 is less than in the first layer, but enough to increase the pressure on, and at least slightly deform, the third flexible substrate 1922c into the third microchannel 1910c. This squeezes a volume of fluid in the third microchannel 1910c as well. With this capacity, multiple experiments can be carried out simultaneously with the possibility of either merging or not merging the various layers downstream in various embodiments. Thus, in some embodiments, the chip body structure further has formed therein a different microfluidic channel separated from at least one channel of the plurality of microfluidic channels in the actuator interaction region by a different second flexible substrate in an opposite substrate of the at least one channel opposite the flexible substrate.

Figure 20A:
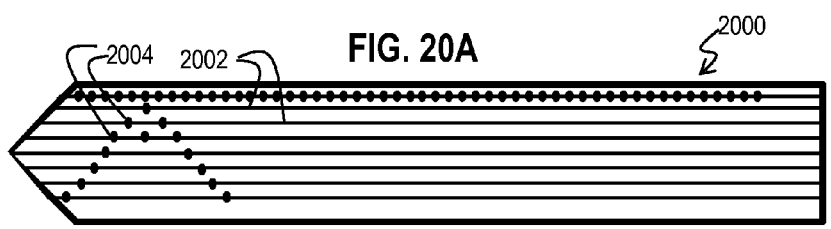
FIG. 20A through FIG. 21D are block diagrams and graphs that illustrate example correspondence between features on a punch card and droplets in an oil flow, according to various embodiments.
Figure 20B:
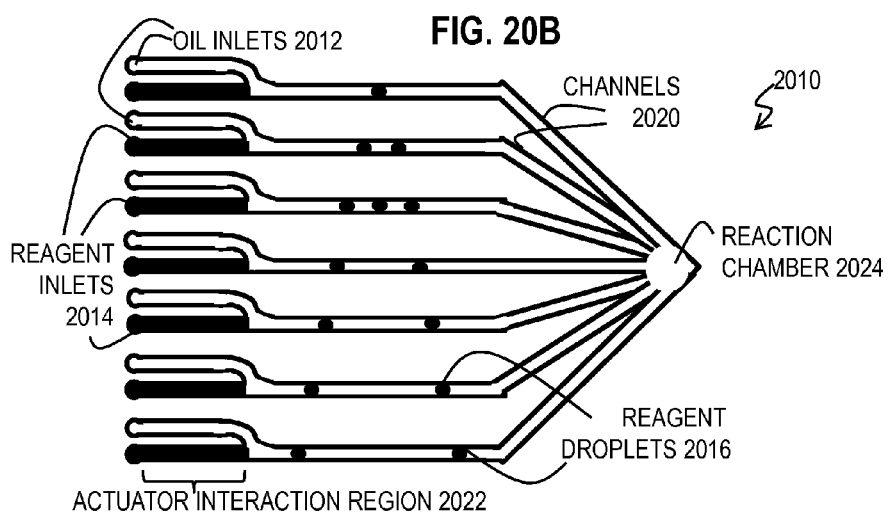

FIG. 20A through FIG. 21D are block diagrams and graphs that illustrate example correspondence between features on a punch card and droplets in an oil flow, according to various embodiments. FIG. 20A is a block diagram that illustrates an example punch card 2000 with punch features 2004 distributed in a particular pattern on 8 lines 2002 aligned with corresponding actuators on an actuation apparatus. The first line has regular features for propelling an immiscible carrier fluid (e.g., oil). The next seven lines have a distinct pattern to be replicated by droplets in a chip. FIG. 20B is a block diagram that illustrates example distribution of droplets in example microchannels on a two-phase chip 2010. In this embodiment, the actuator corresponding to the first line drives oil from an oil reservoir into all oil inlets 2012 in response to the punch features on the first line of punch card 2000. Seven reagent inlets 2014 feed seven microchannels in an actuator interaction region 2022. As each actuator encounters a punch feature, it propels a reagent fluid as a droplet into the oil flow in a corresponding one of the channels 2020 that converge in a reaction chamber 2024. After the punch card 2000 has passed sufficiently far through he actuation apparatus, each of the punch features in lines 2 through 8 have caused teeth of the corresponding actuators to propel fluid in the interaction region 2022 and introduce a droplet 2016 into one of the channels 2020. The pattern of droplets 2016 matches the pattern of punch features 2004.

Figure 21A:
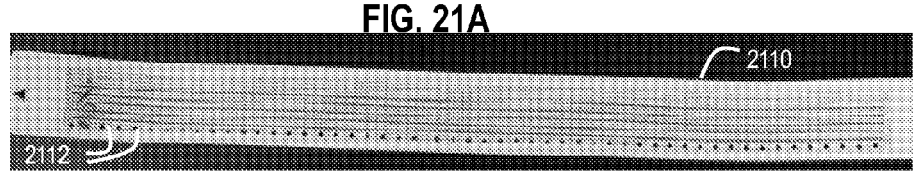
Figure 21B:
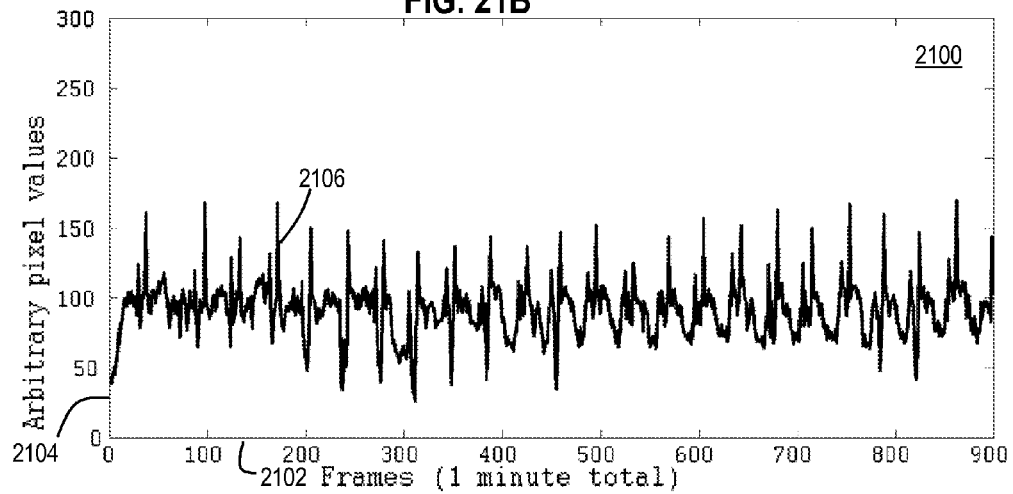

Such correspondence has been measured. FIG. 21A is a photograph of a punch tape 2110 used to drive the apparatus of FIG. 9A with a chip as depicted in FIG. 1B. A regular sequence of punch features (holes 2112) are arranged to drive one actuator. A solvent was input to the microchannel corresponding to this actuator while an oil was used as the carrier fluid. An optical sensor was disposed to view the outlet 150. If the solvent appears at the outlet, then the sensor picks up a first pixel intensity (plotted as a peak on the arbitrary scale of FIG. 21B or FIG. 21C). Conversely, when the oil appears at the outlet, then the sensor picks up a different pixel intensity (plotted as a valley). FIG. 21B is a graph 2100 that depicts the pixel intensity at the outlet as a function of time. The horizontal axis 2102 indicates time in frame number of the optical sensor recording (900 frames corresponding to about one minute). The scale is chosen to correspond to the time it takes to pass the punch tape of FIG. 21A through the actuation apparatus. The vertical axis 2104 indicates pixel intensity in arbitrary units. Trace 2106 shows the intensity at the pixel of the outflow. For every punch feature 2112 on the tape 2110 of FIG. 21A, there is an intensity peak at the pixel of the optical sensor, indicating a droplet of solvent.

Figure 21C:
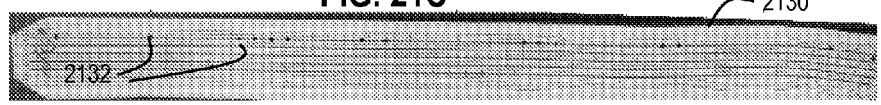
Figure 21D:
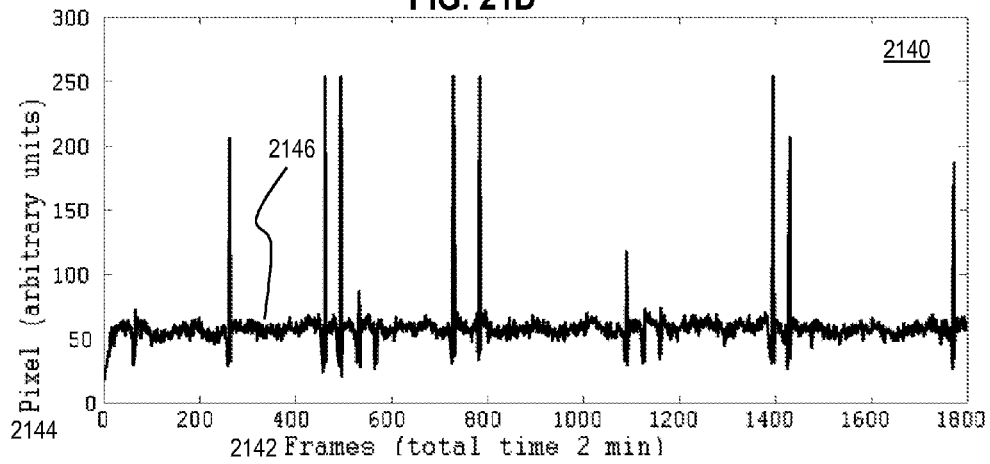

Similarly, FIG. 21C is a photograph of a punch tape 2130 used to drive the same apparatus. A random sequence of punch features (holes 2132) are arranged to drive one actuator. An optical sensor was disposed to view the outlet 150. FIG. 21D is a graph 2140 that depicts the pixel intensity at the outlet as a function of time. The horizontal axis 2142 indicates time in frame number of the optical sensor recording. The scale is chosen to correspond to the time it takes to pass the punch tape 2130 of FIG. 21C through the actuation apparatus. The vertical axis 2144 indicates pixel intensity in arbitrary units. Trace 2146 shows the intensity at the pixel of the outflow. For every punch feature 2132 on the tape 2130 of FIG. 1C, there is an intensity peak at the pixel of the optical sensor, indicating a droplet of solvent.

Figures 22A, 22B:
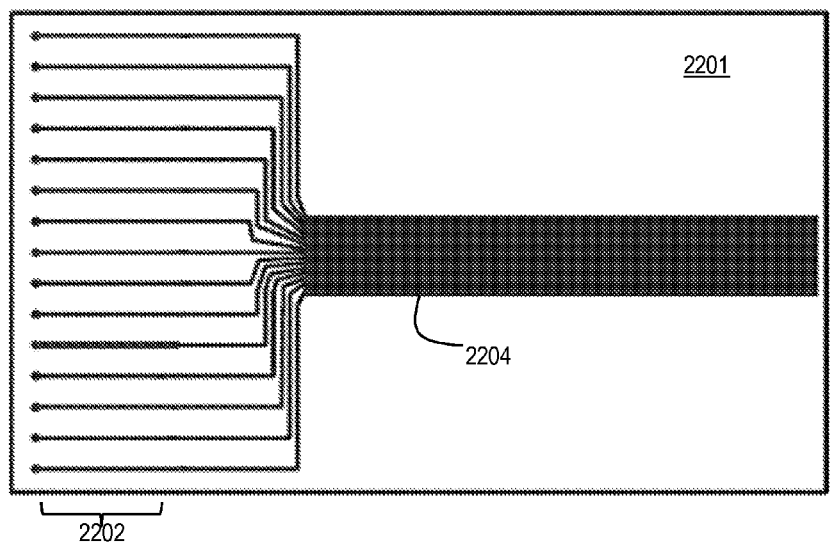

Correspondence also occurs for single phase microfluidics. FIG. 22A is a block diagram that illustrates example microfluidic channels as depicted on a microfabrication mask 2201 for laminar flow, according to another embodiment. In this embodiment, 15 microchannels in an actuator interaction region 2202 merge into a single wide channel 2204. In other embodiments, channel length corrections are added so that pulses generated in the actuator interaction region 2202 at the same time in several different microchannels arrive at the wide channel 2204 at the same time. FIG. 22B through FIG. 22D are photographs that illustrate example correspondence between features on punch card tape and continuous flow, according to various embodiments. FIG. 22A is a photograph 2200 of apparatus of FIG. 9A having 15 actuators 2230 connected rotatably to actuator support structure 2240, used with a chip 2200 in which each microchannel in the actuator interaction regions feeds into a broad outflow channel 2228. The input ports are supplied through external input tubes 2250 which carry water with different dyes. As a punch card is passed through the apparatus, different colored water is propelled through the outflow as laminar flow. As a result of the punch features, one color is propelled over another; and the propelled color widens its laminar flow while the other color narrows. The variations in color width observed at outflow 2228 correspond to the punch features on the punch card, indicating the system is working as desired.

FIG. 22C is a photograph depicting punch tapes 2291, 2292, 2293 and 2294 with four different patterns of holes, respectively. FIG. 22D is a set of photographs 2281, 2282, 2283 and 2284 that show the flow resulting from punch tapes 2291, 2292, 2293 and 2294, respectively. Two colored input fluids are used. A first color only is propelled by the punch tape 2291 as shown by the single color laminar flow of photograph 2281. A first color is propelled twice as much as a second color by the punch tape 2292. The first color is wider in the laminar flow of photograph 2282, and mixing occurs downstream. A first color is propelled four as much as a second color by the punch tape 2293. The first color is even wider in the laminar flow of photograph 2283 and mixing again occurs downstream. The first color and second colored fluids are propelled equally by the punch tape 2294. The width of both colors is the same, with mixture occurring downstream, in the laminar flow of photograph 2284.

Figure 23:
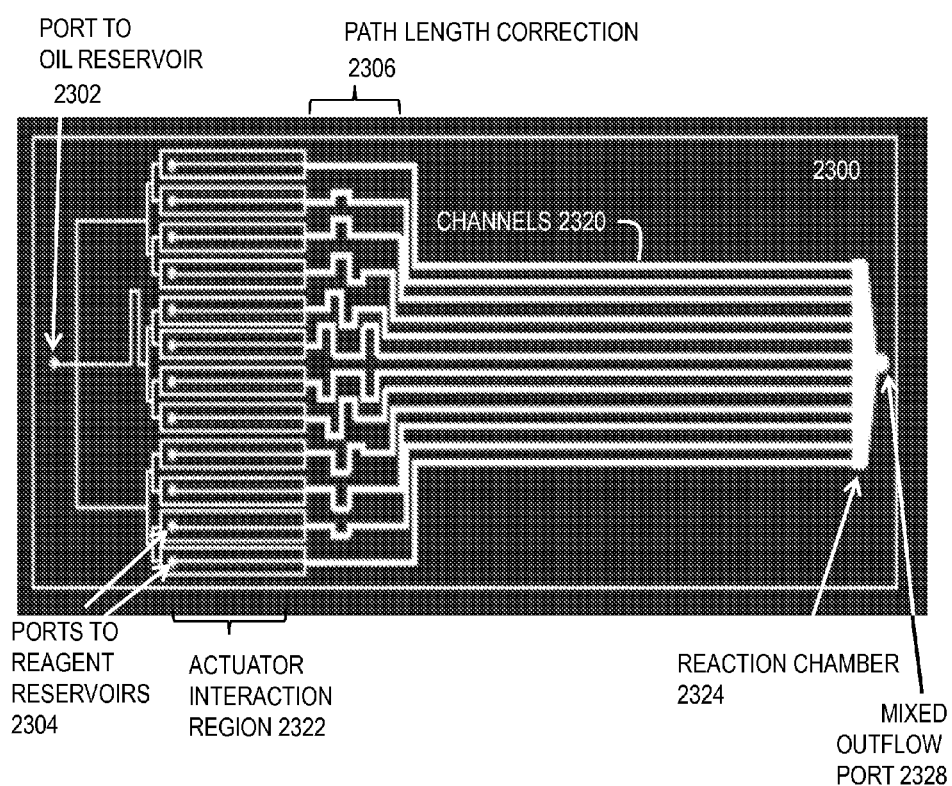
FIG. 23 is a block diagram that illustrates example microfluidic channels as depicted on a microfabrication mask, according to another embodiment.

FIG. 23 is a block diagram that illustrates example microfluidic channels as depicted on a microfabrication mask, according to another embodiment. This chip 2300 has a single port 2302 to an oil reservoir (or supply tube), and 12 ports 2304 to corresponding twelve, possibly different, reagent reservoirs (or corresponding supply tubes). The microchannels are equally spaced in the actuator interaction region 2322. Twelve channels 2320 for droplets carried by the oil are closer together than the microchannels in the actuator interaction region 2322. To keep flows in the channels 2320 in synchrony, path lengths are varied in a path length correction region 2306. Length is added to the central channels of the actuator interaction region 2322 compared to more direct paths from the outermost channels of the actuator interaction region 2322. The droplets carried by the oil in channels 2320 are brought together in a reaction camber 2324 and mixed outflow passes through port 2328.

Droplets of a single reagent are formed in chip 2300 at a channel step comprising two oil channels and a water-based reagent channel. FIG. 24A through FIG. 24D are block diagrams that illustrate example droplet formation in a microfluidic channel step, according to another embodiment. The step comprises a junction of several channels 2420. Oil is propelled in channels 2421*a* and 2421*c*, while the water-based reagent (also called a solvent in the illustrated embodiment) is propelled in a central channel 2421*b* in response to actuator action. A droplet of the solvent in the oil flow is formed at step 2422, when a pulse of solvent propelled by an actuator tooth reaches the step 2422. FIG. 24B shows a solvent pulse 2481 arriving at the end of channel 2421*b* and the locations of cross sections depicted in FIG. 24C and FIG. 24D.

In some embodiments, the reagents are encapsulated in the punch card material and introduced into the device, as liquid or powder or solid. Several ways are illustrated for introducing reagents contained in paper tape into the chip. In a first embodiment, a needle pushes through the paper which has reagents embedded in it to enable access of the same.

The tape then passes by an open fluidic channel to allow the reagents to diffuse into the channel as another tooth presses on the same site to make fluid contact without leakage out of the microchannel. Thus dried or semi-dried reagents can be supplied to the chip on demand (as per the protocol). The same mechanism that is used to introduce reagents into the chip can also be used to introduce biological samples and patient body fluids. Thus multiplexing can be achieved by collecting and running assays for multiple patients simultaneously by introducing samples in different code lanes. Furthermore, multiple tests can be run on multiple patient samples by changing the protocol code in the punch card containing the samples from a given patient.

In a different embodiment, reagents are enclosed in capsules on the punch card tape coupled to device inlets. The side of the capsule facing the chip inlet has a thin film and is flush with the rest of the punch card with the capsule projecting outward toward the microchannels on the chip. The chip inlet features a concave shape and size that matches that of the capsule projecting away from the punch card surface. Upon activation, a compressor such as a gear pin pushes on the capsule from the bottom, leading to the rupture of the thin film and the release of the reagents into the microchannel. In some embodiments, the inlet channel then also features valves to ensure that flow is unidirectional.

In various embodiments, reagent or result storage in the system can occur either within the microchip, or in an external reservoir coupled to the microchip, or within the punch card tape or some combination. Some embodiments use bubble-capsules which are pouches or capsules on the punch card in which the reagents are stored. The reagents or materials are in liquid, solid or gaseous form and are released in a timely fashion depending on the assay or application in question In some embodiments, lyophilized reagents are stored in the punch card tape. This can be achieved either as part of sections on the punch card, strips on the punch card, or specific pouches for which controlled or uncontrolled release is achieved.

In another approach, reagents in the punch card tape are introduced through a porous substrate. In this mode, the fluid introduction is by diffusion into the microfluidic chip via the porous substrate.

Transfer of media/material into the chip from the punch card can occur in a variety of ways, in various embodiments, such as introducing material into the microchip using a sharp object or, using holes that are of dimensions that are below the capillary length scale of the fluid, or through porous structures. In some embodiments, described above, bubble capsules are disposed on the punch card tape, and their contents released in specific instances. In some embodiments, communication between the punch card and the microchip is effected using non-rotational mechanisms such as vertical pins and gates.

Figure 25A:
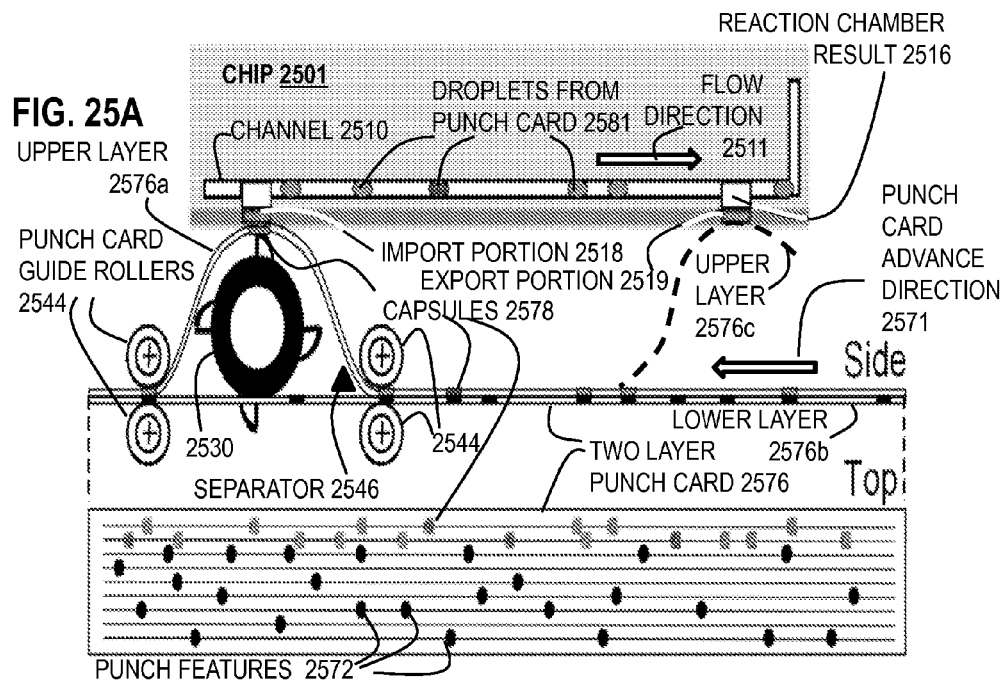
FIG. 25A through FIG. 25C are block diagrams that illustrate example material transfer from punch card to microfluidic chip, according to an embodiment.
Figure 25B:
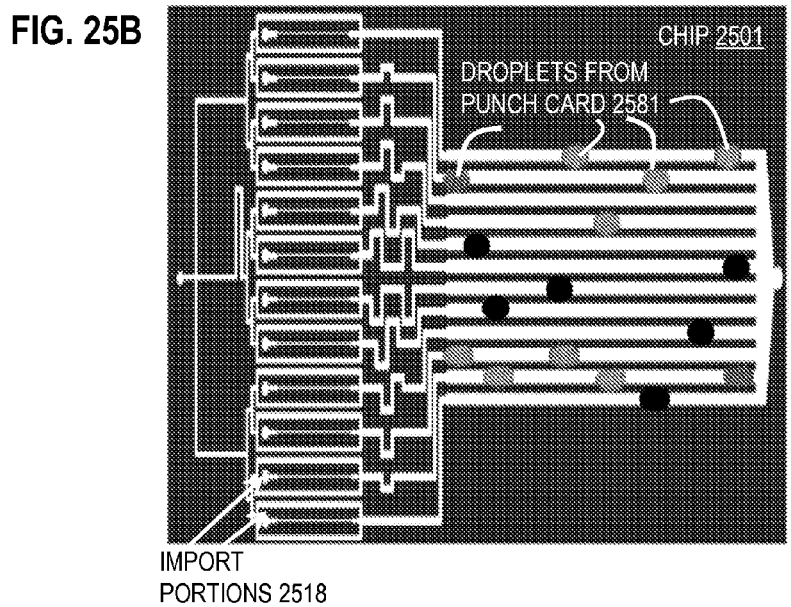
Figure 25C:
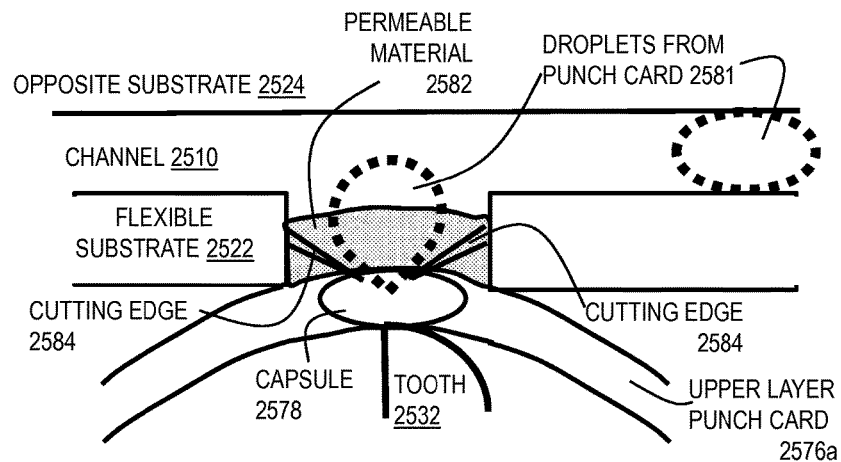

FIG. 25A through FIG. 25C are block diagrams that illustrate example material transfer from punch card 2576 to microfluidic chip 2501, according to an embodiment. FIG. 25A depicts chip 2501 with microchannel 2510 having an import portion 2518 and a reaction chamber 2516 having an export portion 2519. Thus, in this embodiment, the outer flexible substrate includes at least one import portion configured for porting, into the corresponding microfluidic channel, material from a capsule pressed against the import portion. The punch card 2576 comprises two layers, an upper layer 2576a with one or more capsules 2578 of material to introduce into the microchannel 2510, and a lower layer 2576b with punch features 2572 that engage teeth of the actuator 2530 to cause the actuator to rotate. In the illustrated embodiment, the punch card guide includes four rollers 2544 and a separator 2546, such as a wedge, configured to separate the upper layer 2576a from the lower layer 2576b of the punch card.

As the two layer punch card 2576 advances in direction 2571, the separator 2546 causes the upper layer 2576a to pass between the actuator 2430 and the chip 2501, while the lower layer 2576b passes the actuator on a side opposite to the chip 2501. The punch features on the lower layer 2576b act as described above to engage one tooth of the actuator and rotate the actuator. This action presses another tooth of the actuator against the chip 2501. With the upper layer 2576a now disposed between the actuator 230 and the chip 2501, the tooth also presses a capsule, if present, in the upper layer against the import portion 2518 of the microchannel. The import portion is configured to pass material from the capsule 2578 into the microchannel 2510. The material forms a droplet in the microchannel 2510; and the droplet is propelled downstream in flow direction 2511 forced by compression of the microchannel 2510 by the same or different actuator. Thus, the punch card guide further comprises a separator configured to separate an upper layer of a punch card, if present, from a lower layer of the punch card and pass the upper layer of the punch card between the plurality of actuators and a chip disposed in the recess.

As shown in the side view, there is a punch feature synchronized with every capsule, to press the capsule against the import portion. In the illustrated embodiment, the punch feature of the lower layer is collocated just below the capsule; but, in other embodiments, the punch feature may lead or follow the capsule. In the illustrated embodiment, the capsules are disposed in the first two lines of the punch card, as evident by the grayscale features in the top view of the punch card 2576, and microchannels with import portions are confined to those microchannels that are aligned with these first two actuators. Thus, in some embodiments, a punch card medium includes a sheet of a first material on which is formed a plurality of punch features, each punch feature configured to engage a tooth extending from an actuator of a plurality of actuators in an apparatus; and, a different second material encapsulated in the sheet at a location of at least one punch feature and configured to be released by an encounter with the tooth of the actuator. In the illustrated embodiment, the sheet of first material comprises a first sheet of the first material and a second sheet of a third material, wherein the second material is disposed in the second sheet. In some of these embodiments, the third material is a plastic material, such as Mylar. In some embodiments, the third material is the first material, e.g., both are Mylar. In some embodiments, the third material is different from the first material, e.g., the first material is stiff paper and the third material is Mylar.

In some embodiments, the results in the reaction chamber is transferred to the punch card 2576. For example, one or more layers of the punch card are caused by the punch guide to contact the reaction chamber at an export portion 2519, as indicated by the dashed line labeled upper layer 2576c. The export portion 2519 is configured to pass material from the reaction chamber to the punch card, e.g., by diffusion, capillary action or gravity through a port or through a porous, permeable or semipermeable membrane. Results from assays deposited on the punch card can take any form, such as outputs from colorimetric assays, agglutinations from chemical reactions or other forms that may or may not be visual. This capacity enables the ease of results storage. In some embodiments, transmission with the option of further processing such as DNA extraction (and other processes) is made possible by sending the punch card to a processing center after the run.

FIG. 25B is a block diagram that illustrates a plan view of microchannels in the chip 2501, modeled after the path corrected channels of chip 2300. This chip 2501 includes an import portion 2518 within the actuator interaction region. In the illustrated example, the import portions are used only in the first two channels at the top of FIG. 25B where droplets 2581 including material from the punch card are labeled.

FIG. 25C is a block diagram that illustrates an example import portion, according to an embodiment. FIG. 25C depicts a flexible substrate 2522 and opposite substrate 2524 of a microchannel 2510. But, aligned with the actuator, in the actuator interaction region, is an import portion comprising a semipermeable material 2582. Thus, in this embodiment, the import portion includes a semipermeable material. One or more cutting edges 2584 are embedded in the semipermeable material. Thus, in this embodiment, the import portion includes a cutting edge. When the tooth 2532 of actuator 2530 presses against the capsule 2578 in the upper layer punch card 2576a and compresses the fluid in microchannel 2510, the semi-permeable material retreats enough for the cutting edge 2584 to contact the capsule 2578 and rupture the capsule 2578—releasing the material inside. The material from the capsule then spreads, preferably in one direction, through the semipermeable material 2582 into the microchannel 2510 where a droplet 2581 of the material is formed. The droplet 2581 then moves downstream as a result of the compression of the channel 2510 by this actuator or another actuator.

Figure 25D:
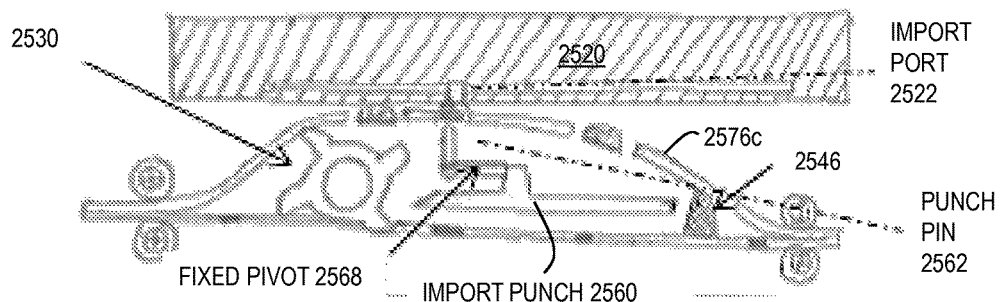
FIG. 25D through FIG. 25R are block diagrams that illustrate example material transfer from punch card to microfluidic chip, according to another embodiment.
Figure 25E:
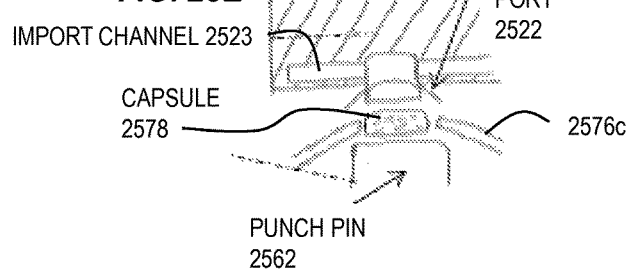

FIG. 25D through FIG. 25R are block diagrams that illustrate example material transfer from punch card to microfluidic chip, according to another embodiment. A different system of inserting samples from the punch card tape into the microfluidic chip is described here. The system comprises of a punch card tape holding the material to be inserted, a way to hold/encapsulate the material in question, a mechanism for presenting the material to the microchip interface, a way to release the material and subsequently, a way to take it into the microchip and propel it for use. As depicted in FIG. 25D, in this embodiment, a separate punch pin 2562 is activated by rotation of an actuator 2530 to force fluid representing a sample or other reagent into at least one microchannel of a microfluidics chip 2520 through a differently configured import port 2522. FIG. 25D is a block diagram that illustrates an example configuration before injection of the sample/reagent from the capsule. The punch pin 2562 is part of an import punch 2560 that includes a fixed pivot 2568 and works similarly to the neutral position open valve described in more detail below with reference to FIG. 29A and FIG. 29B. Similar to the punch card 2576 described above, material-laden punch card 2576 includes an upper layer 2576c with one or more punch features, such as capsules, bearing a sample or reagent fluid and lower layer 2576d with one or more punch features, such as holes, that code for actuator action (i.e., code for a protocol). The two layers are separated by a separator 2546, such as a wedge, as the punch card 2576 advances. FIG. 25E is a block diagram of a zoomed in view that illustrates an example import port 2522, and punch pin 2562 bracketing a capsule 2578 on an upper layer 2576c of a punch card 2576, before injection of the sample/reagent from the capsule. The import port 2522 is connected to a microchannel in an actuator interaction region of the chip by an import channel 2523.

Figure 25F:
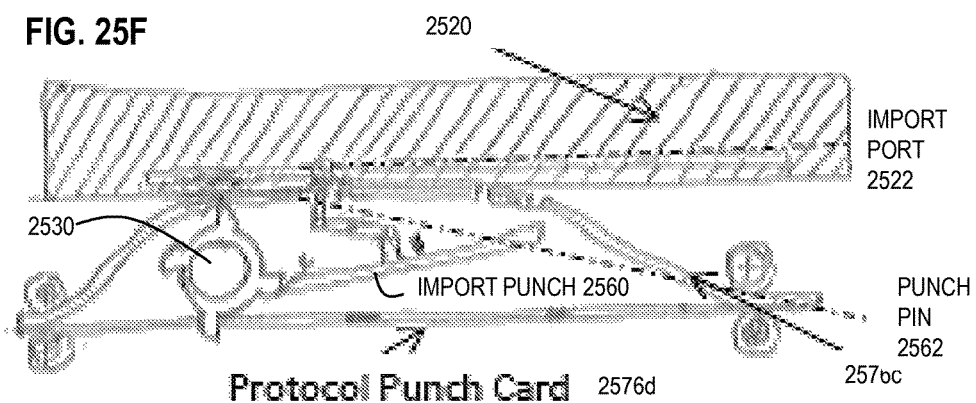
Figure 25G:
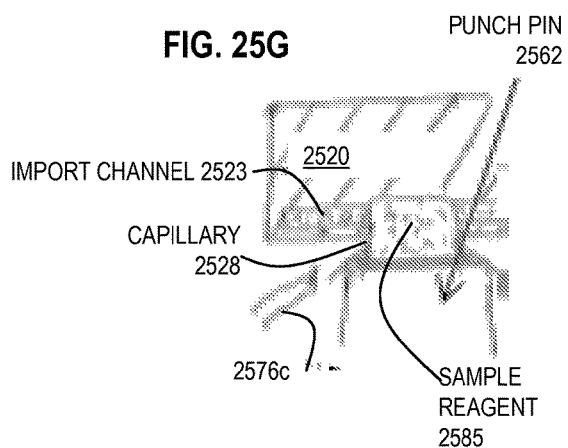

FIG. 25F is a block diagram that illustrates an example configuration during injection of the sample/reagent from the capsule. The actuator 2530 engaged by punch card lower layer (protocol punch card) 2576d has rotated sufficiently to also engage the import punch 2560, which forces punch pin 2562 against the punch card upper layer 2576c with capsule and against import port 2522. FIG. 25G is a block diagram of a zoomed-in view that illustrates the example import port 2522, and punch pin 2562 squeezing the capsule on an upper layer 2576c of a punch card 2576 against a capillary tube 2528 that punctures the capsule and leads into the import microchannel 2523. By capillary action, the sample/reagent 2585 from the capsule moves up through the capillary tube 2528 of the import port and into the import channel 2523.

Thus, in the illustrated embodiment, the interface to the microchannels includes a mechanism to rupture the capsule holding the material to be introduced and provide a way for the material to get to the microchannel. In the illustrated embodiment, a sharp needle or a pin with a hollow center is used. This is then connected to an import channel 2523 that splits into (is in fluid communication with) two other channels, one of which is a chamber that has an absorbent material 2524 that can wick liquids, and the other being the microchannel 2510 that is actuated by the tooth of a actuator to propel the absorbed/wicked material downstream for further processing. An example of the wicking material 2524 is cellulose fiber pads made by Millipore in Billerica, Mass. The needle that serves as capillary tube 2528 and that ruptures the capsule holding the material to be introduced, in various embodiments, features either a beveled edge or a square cut to allow for air to break the fluid interface and leading to capillary pinning of the liquid so that not all the liquid is wicked into the absorbent pad. The microchip interface also features a shape that will accommodate the capsule and be strong enough to withstand the pressure of the actuation pin.

Punched holes on the protocol layer result in the engagement of the actuator teeth which makes them rotate. This rotation also leads to the rotation of another tooth that interfaces with a lever arm upon which the input punch pin is connected and actuated via a seesaw mechanism. The mechanism is such that the downward motion of the lever arm leads to the upward motion of the input punch pin which then presses the material in the capsule against the import port. The import port features a needle (or pin with a hollow center) that ruptures this capsule to allow for the access of the material into the device. After actuation, the lever arm goes back to its default position in which the punch pin is lowered and thus disengaged from the import port.

Figure 25H:
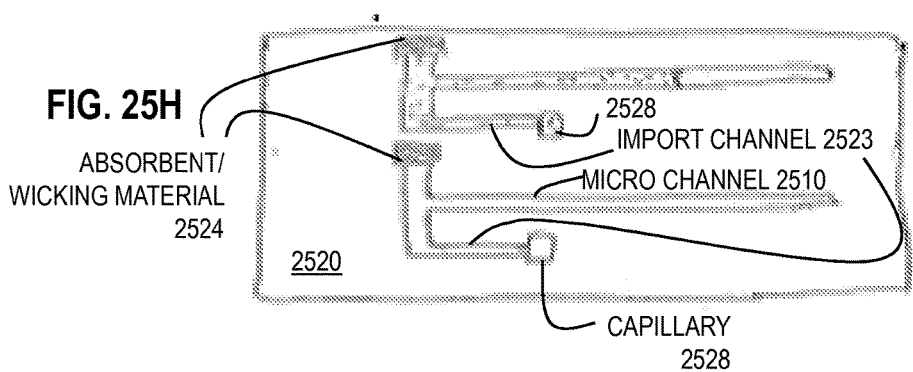
Figure 25I:
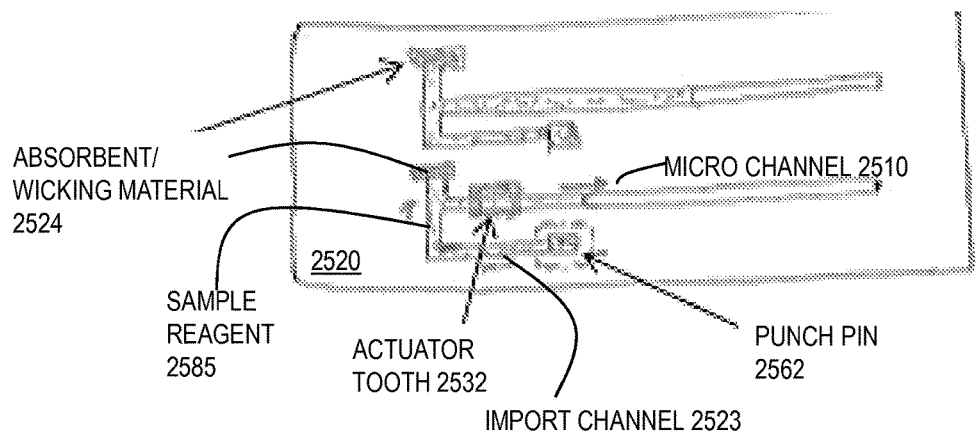

FIG. 25H is a block diagram that illustrates an example configuration of the micro fluidics chip 2520 in plan view before injection of the sample/reagent from the capsule. The chip 2520 includes microchannels 2510 in an actuator interaction region, each of one or more connected to a corresponding capillary 2528 of an import port through the import channels 2523. Both the microchannel and the import channel are connected to a chamber with an absorbent or wicking material 2524. FIG. 25I is a block diagram that illustrates an example configuration of the micro fluidics chip 2520 in plan view during injection of the sample/reagent from the capsule. The chip 2520 includes microchannels 2510 in an actuator interaction region, each of one or more connected to a corresponding capillary 2528 of an import port through the import channels 2523. Both the microchannel and the import channel are connected to a chamber with an absorbent or wicking material 2524. The punch pin 2562 shown by its dashed footprint on the chip 2520 causes the capillary tube 2528 to puncture the capsule. Capillary action brings the sample or reagent 2585 into the import channel 2523, and the action of the absorbent/wicking material 2524 pulls the sample into one end of the microchannel 2510. Simultaneous or subsequent impingement by a tooth 2532 of the actuator, show in by its dashed footprint on the chip 2520 in the actuator interaction region of the microchannel 2510, propels the sample/reagent 2585 along the microchannel 2510.

Figure 25J:
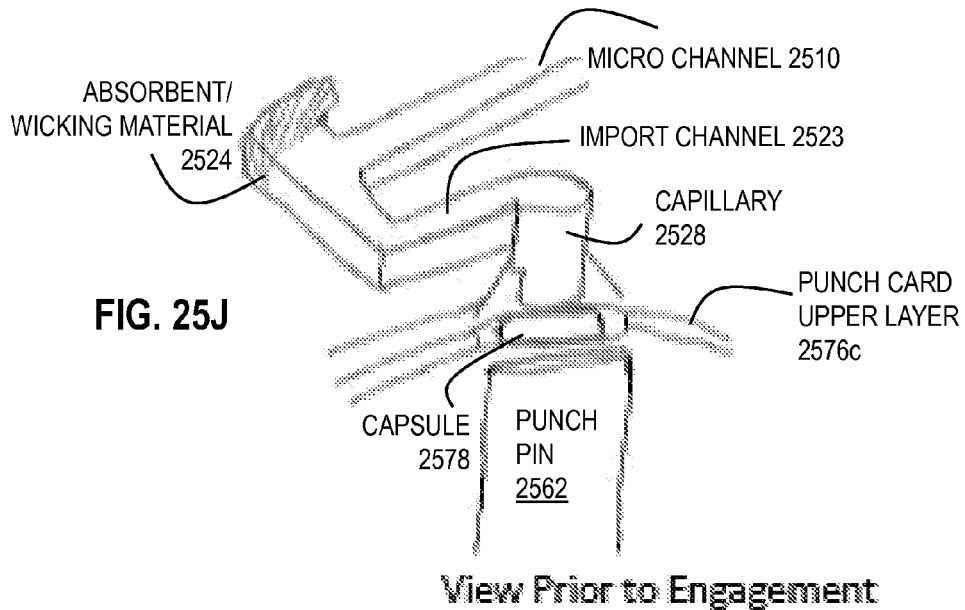
Figure 25K:
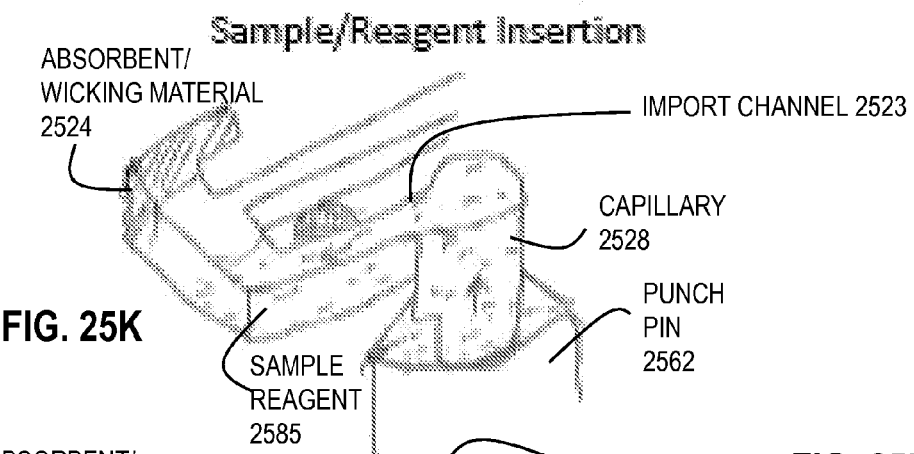
Figure 25L:
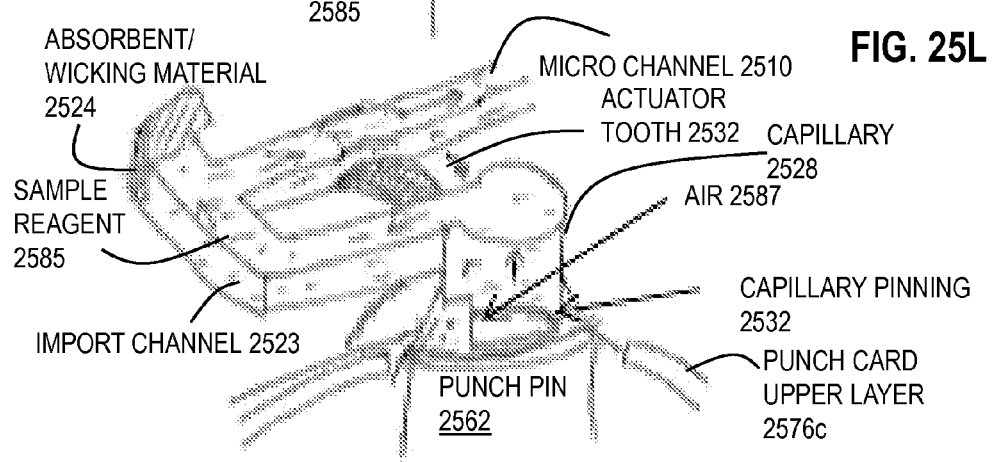

This action is illustrated in perspective detail in the next three figures. FIG. 25J is a block diagram that illustrates an example configuration of the microchannel 2510, import channel 2523, capillary tube 2828, absorbent/wicking material 2524, punch card upper layer 2576c and punch pin 2562 in perspective view before injection of the sample/reagent from the capsule 2578. FIG. 25K is a block diagram that illustrates an example configuration of the import channel 2523, capillary tube 2828, absorbent/wicking material 2524 and punch pin 2562 in perspective view during injection (insertion) of the sample/reagent from the capsule 2578. The capillary tube 2528 has pierced the capsule and the sample/reagent 2585 has moved up the tube and into the import channel 2523 by capillary action. FIG. 25L is a block diagram that illustrates an example configuration of the import channel 2523, capillary tube 2828, absorbent/wicking material 2524 and punch pin 2562 in perspective view after injection (insertion) of the sample/reagent from the capsule 2578. The capillary tube 2528 has pierced the capsule and the sample/reagent 2585 has moved up the tube and into the import channel 2523 by capillary action. The tooth 2532 of actuator 2530 has impinged the microchannel 2510 and moved the sample/reagent along the microchannel 2510. This movement sucks in air 2587 into the capillary but the pinning action of the capillary and absorbent/wicking material 2524 inhibits loss of sample/reagent 2585 down and out through the capillary tube 2528.

Configurations of capsules on the punch card are illustrated in the next four figures. FIG. 25M is a block diagram that illustrates an example configuration of the punch card 2576 in plan view. The locations of actuator lines, actuator code punch features 2572 and capsules 2578 are indicated. FIG. 25N is a block diagram that illustrates a capsule with sample/reagent 2585 enclosed therein. FIG. 25O is a block diagram that illustrates an example configuration of the punch card 2576 in elevation view. The punch card upper layer 2576c is shown with a capsule that comprises a upper soft layer 2578a configured to abut the chip and a lower hard layer configured to abut the punch pin. The soft layer 2578a is configured to be punctured by the capillary tube 2528 and the hard layer 2578b is configured to resist tearing or rupture when compressed by the punch pin 2562. The punch card lower layer 2576d includes one or more actuator code punch features 2572, as described above In some embodiments, the sample or reagent is collected on site and not prepackaged in a capsule. In some of these embodiments, the sample/reagent is collected into one or more open top features, called dimples. In some embodiments an absorbent material is included in the dimple to hold the sample or reagent. FIG. 25P is a block diagram that illustrates an example configuration of the punch card 2576 in plan view. The locations of actuator lines, actuator code punch features 2572 and capsules 2578 are indicated, as in FIG. 25M. In addition, one or more dimples 2579 are included on the punch card 2576. FIG. 25Q is a block diagram that illustrates a dimple 2579 configured to accept sample/reagent therein. FIG. 25R is a block diagram that illustrates an example configuration of the punch card 2576 in elevation view. The punch card upper layer 2576e is shown with a dimple 2579 that comprises a lower hard layer 2579a configured to abut the punch pin. The hard layer 2579a is configured to resist tearing or rupture when compressed by the punch pin 2562. The punch card lower layer 2576d includes one or more actuator code punch features 2572, as described above.

Thus, in these illustrated embodiments, the punch card tape features two layers—one of which being the layer holding the material to be injected into the device; the other being the protocol layer for triggering the material insertion process. The two layers can be separated in the middle to allow for the top layer (carrying the material to be inserted) to interface with the microfluidic chip while the lower layer has punched holes in instances where actuation is desired. The spacing of the punched holes and the material encapsulation is such that it will ensure that there is perfect alignment between the input port, the material to be inserted and the actuator for the insertion.

The material to be inserted is encapsulated in a medium that allows for rupture on the side interfacing with the microchip interface and a firm substrate on the side interfacing with the actuator that will push it against the microchip interface. An example of such a medium is a blister pack that is used in packaging of medical tablets. Some embodiments use aluminum foil (or other materials such as polythene) on one side to allow for easy rupture and a polymer (such as polyvinyl chloride, polychlorotrifluoro ethylene, cyclic olefin copolymers or other firm substrates including metals, paper or plastics) on the other to provide a firm substrate against which the actuator can press. The blisters can be manufactured by a company such as Visipak from Fenton, Mo. Moreover, the encapsulated material in the blister pack (or other holding mechanism) is such that it can be detached from the punch card tape material layer in one embodiment, or stay in place in another implementation for multiple insertion instances. In various embodiments, the location of the encapsulated material is anywhere along the punch card tape to allow for the introduction of the material as desired.

The punch card features the upper layer with the encapsulated material and another lower layer with, for example, punch card holes for actuation purposes used for the system. The presence or absence of holes in this second layer determines when the material is introduced. In this embodiment, the presence of a hole results in the immediate or subsequent introduction of the material into the microchip, Such embodiments provide advantages over current methods that utilize microfluidic techniques, which have to interface chemical supplies to microfluidic chips externally. This requires infrastructure outside the chip to load reagents in and out. With the capacity to load reagents via the same punch tape that loads protocol information, some embodiments omit one or amore or all of the external reservoirs. Such elimination makes the entire platform compact and truly hand-held.

Figure 26:
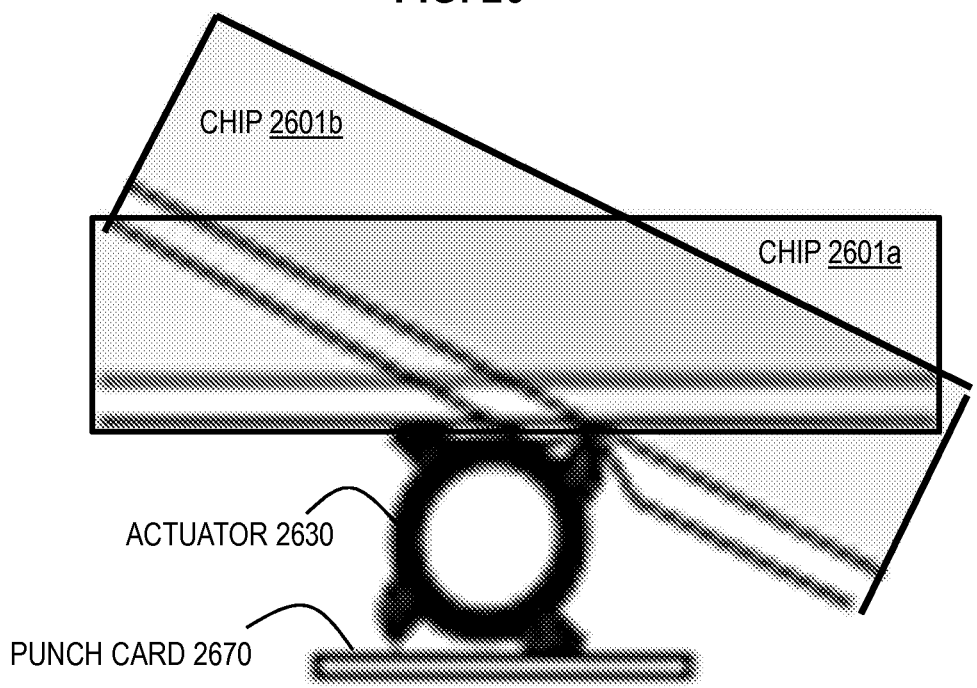
FIG. 26 is a block diagram that illustrates example valve action by tilting a microfluidic chip relative to bank of actuators, according to an embodiment.

FIG. 26 is a block diagram that illustrates example valve action by tilting a microfluidic chip relative to bank of actuators 2630, according to an embodiment. In position 2601a, the actuator 2630 has its usual effect, either no compression when the actuator 2630 is not engaged with a punch feature in the punch card 2670, as illustrated, or compressing the microchannel in the chip to motivate fluid flow. In tilted position 2601b, however, the actuator 2630 has a different effect. When the actuator 2630 is not engaged with a punch feature in the punch card 2670, as illustrated, a tooth of the actuator now compresses the flexible substrate and closes the microchannel, serving as a valve to prevent motion, such as backflow, in the microchannel. Alternatively, an actuator that was engaged with the punch card and compressing a microchannel of the chip, loses compression of the microchannel leading to an end of the squeezing and an end to droplet formation or pipetting flow. Thus, the system is stopped. The tilting of the chip is thus occurring relative not only to the bank of actuators but also relative to the punch card 2670 in the punch card guide. The tilting of the chip depicted in FIG. 26 affects every microchannel in the actuator interaction region of the chip. Thus, the actuation apparatus is made so as to have multiple modes whereby actuation produces an "on" outcome (where for instance, fluids are pumped in positions 2601a), or an "off" outcome (whereby fluid flow is stopped in position 2601b), or a bistable mode whereby depending on when the device is actuated or the code implemented, it can be in an off or on mode (e.g., by tilting between position 2601a and 2601b).

Thus, the microchip that interfaces with the actuators is tilted at an angle that is between zero and ninety degrees. The tilting is such that for a four-toothed actuator, with the channels in the microchip aligned to the actuator, the tooth closest to the microchannel impinges on the microchannel; thereby inducing a valving mechanism. At the neutral/default actuator position (not engaged with a punch feature, as depicted in FIG. 26), the channel is closed when in the tilted position 2610b thereby hindering fluid movement. Thus, in this embodiment, the punch card guide is rotatably connected to the support structure and the support structure is configured to tilt relative to the punch card guide so that microfluidic channels in the chip in the recess of the support structure are closed by teeth of corresponding actuators when no tooth of the corresponding actuator is engaged with a punch feature of the punch card.

Figure 27A:
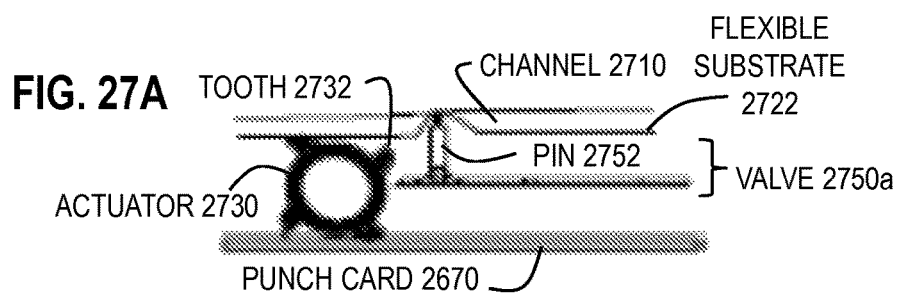
FIG. 27A through FIG. 27D are block diagrams that illustrate a valve controlled by an actuator to act in concert with compression of a channel by the actuator, according to an embodiment.
Figure 27B:
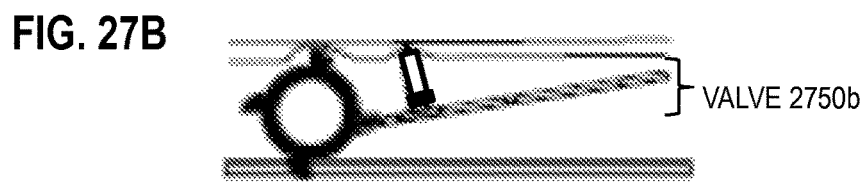
Figure 27C:
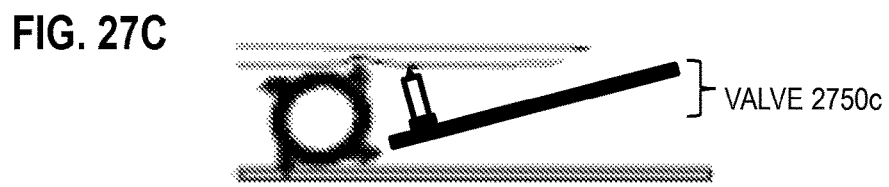
Figure 27D:
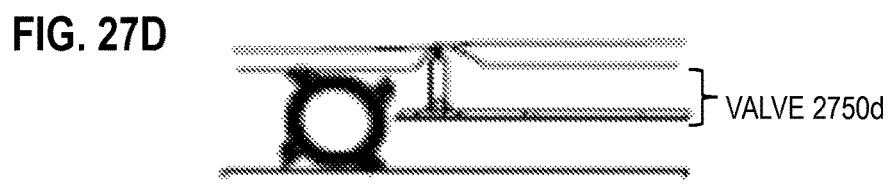

A different approach is used to valve each channel individually. FIG. 27A through FIG. 27D are block diagrams that illustrate a valve 2570 controlled by an actuator 2730 to act in concert with compression of a microchannel 2710 by the actuator 2730, according to an embodiment. The channel 2710 is separated from the actuator 2730 by the flexible substrate 2722, as usual. The valve 2750 includes a pin 2752 on a cantilever. When the actuator 2630 is not engaged with a punch feature in the punch card 2670, as illustrated in FIG. 27A, the valve cantilever is positioned to be out of contact with any teeth of the actuator and to press pin 2752 against the flexible substrate 2722 to close the microchannel 2710. As the actuator 2730 engages the punch card and is rotated as depicted in FIG. 27B, a tooth of the actuator presses against a tip of the cantilever of valve 2750 and pushes the valve to position 2750b. This partially removes the pin 2752 from the channel while another tooth of the actuator compresses the fluid in the channel. The compressed fluid is allowed to pass downstream in the channel 2710. After the pin 2752 is fully withdrawn from the microchannel 2710 as the actuator 2730 completes the sweep of the channel 2710, as depicted in FIG. 27D, the valve in position 2750c loses contact with a tooth of the actuator 2730. The valve 2750 starts a return to its original position 2750d, as shown in FIG. 27D, which matches the configuration of FIG. 27A, closing the microchannel 2710.

Thus, a valve is moveably connected to the support structure. The valve includes a pin configured to extend into the recess sufficiently to close a microfluidic channel in the chip placed in the recess when no tooth of the plurality of teeth on an actuator is in contact with the valve and configured to withdraw from the recess when a tooth of the actuator is in contact with the valve. This valving mechanism uses pin-like projections or pins attached to individual cantilevers. The neutral position is such that the pins are aligned to microchannels and impinge upon them to obstruct flow. Complete closure of the channel with the pin is achieved through this action and, in some embodiments, the introduction of a step elevation in the microchannel at the point where the valving pin makes contact with the channel to reduce the channel height and makes it easier to seal the channel shut. The cantilevers are plucked upon the actuation of the actuator tooth with a punch feature on the punch card. The downward motion of the cantilever upon plucking causes the pin to move down and forward thereby lowering the pin and opening the channel to let out the fluid being pumped. Immediately after this action, the valve goes back to its default position thereby closing the channel.

Figure 28A:
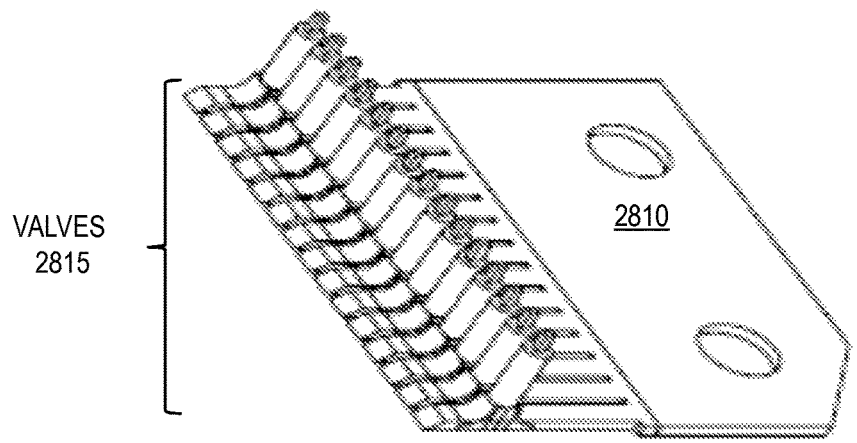
FIG. 28A through FIG. 28C are block diagrams that illustrate a bank of valves to be used in concert with a bank of actuators, according to an embodiment.
Figure 28B:
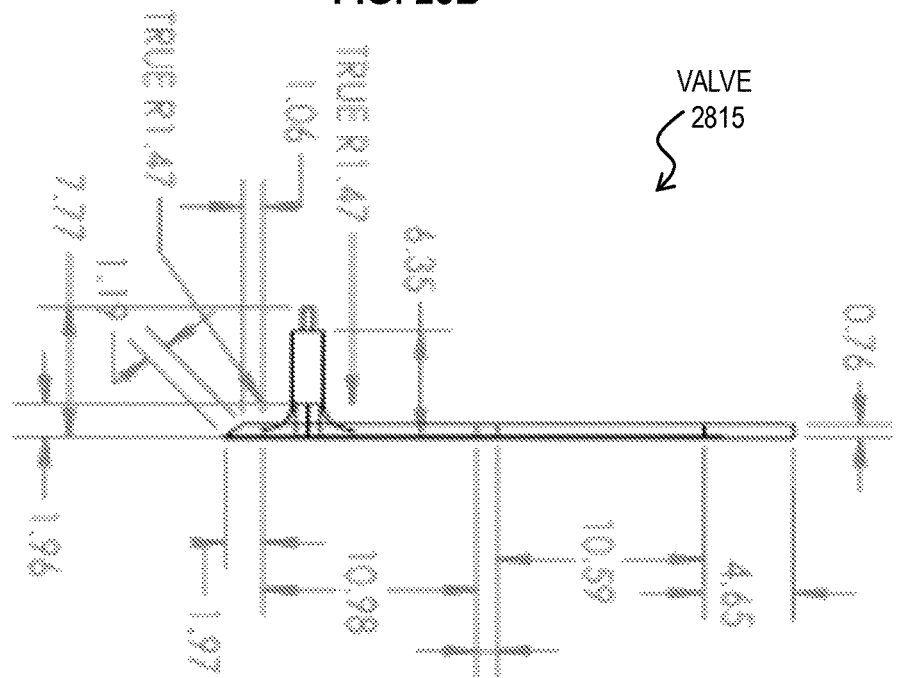
Figure 28C:
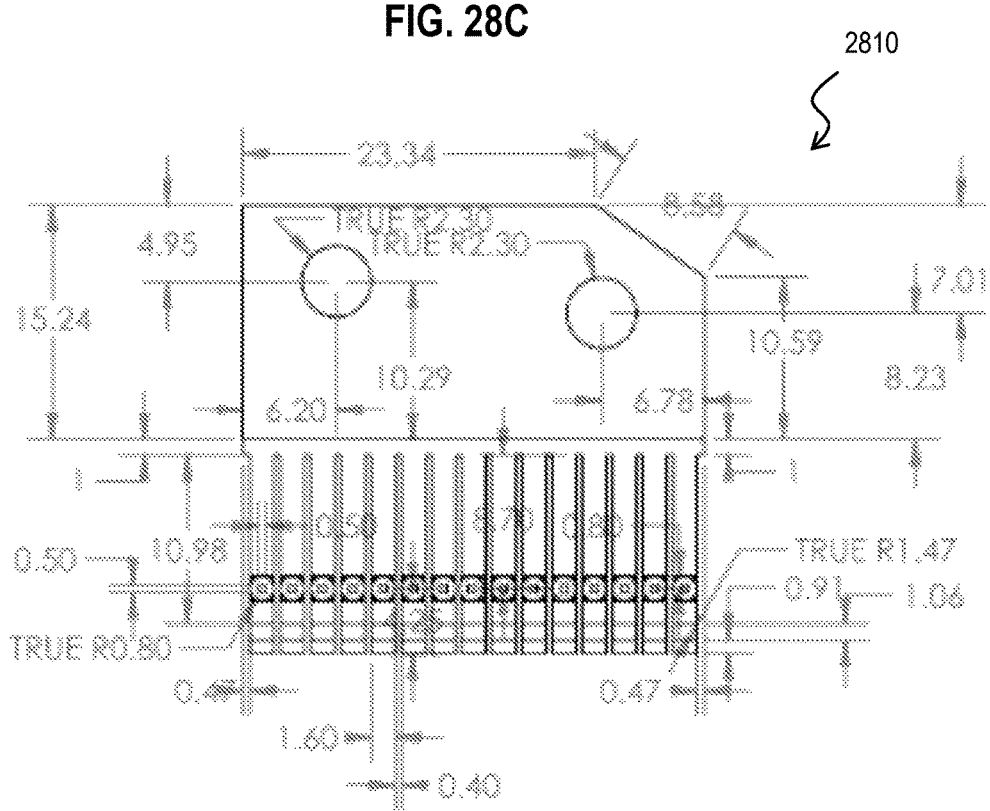

FIG. 28A through FIG. 28C are block diagrams that illustrate a bank of 15 valves to be used in concert with a bank of 15 actuators, according to an embodiment. FIG. 28A give a perspective view, FIG. 28B an elevation view, and FIG. 28C a plan view. Dimensions are given in millimeters. These designs implement valves wherein each is aligned to a single actuator and microchannel and can be operated independently following the code that is programmed for the device.

Figure 29A:
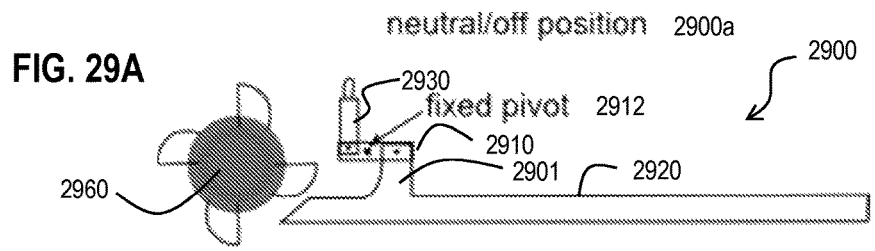
FIG. 29A and FIG. 29B are block diagrams that illustrate a valve that is open in a neutral position, according to an embodiment.
Figure 29B:
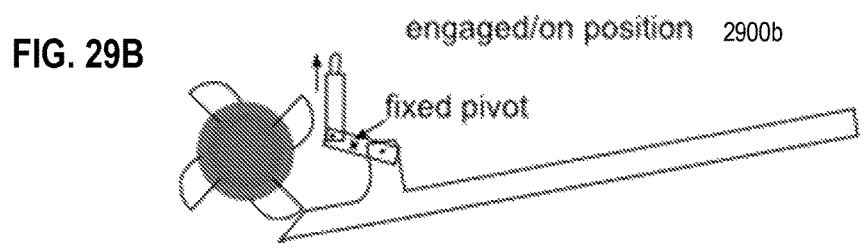

With the above described action, the default is an valve on position leading to the closure of the microchannel. In some embodiments, a valve in the default position is off, e.g., through the use of a pulley mechanism, flexures, or coupling to other valves or structures. FIG. 29A and FIG. 29B are block diagrams that illustrate a valve that is open in a neutral position, according to an embodiment. In this embodiment, the valving mechanism consists of three main sections. The first section is a plank 2901 made of a rigid substrate (such as a metal or any kind, plastics or other rigid polymers), e.g., measuring 1.2 mm by 1.2 mm by 1.2 mm, attached on one end to a tine 2920 of a comb, which tine is plucked by the actuator 2960 when engaged (just as is the case with the "always on" valves described previously) and the other end is attached to another plank 2910 made of a rigid substrate, e.g., measuring 9 mm by 1.2 mm by 1.2 mm, via a pin or hinge that allows for rotation on only one axis. This second/middle plank 2910 also has a hole (e.g., 1.2 mm in diameter) in the middle of its longest axis (e.g., 4.5 mm from each end) through which a cylindrical pin (e.g., 1 mm in diameter) is attached to the sides of the actuator support after running through all the middle sections for which this valving mechanism is implemented, serving as fixed pivot 2912. This middle section 2910 is then attached to a valving pin 2930 (e.g., 6 mm long), having a diameter that is at least the width of the channel that it closes via a hinge that allows for rotation in one axis. When the valve 2900 is not engaged with an actuator 2960, as depicted in FIG. 29A, the pin 2930 is low, keeping the channel open. When engaged with the actuator 2960, as depicted in FIG. 29B, the actuator tooth plucks the comb tine 2920 leading to the downward movement of the first plank 2901. The connection to the middle plank 2910 results in its movement downward on the side attached to the first part 2901 and the upward movement of the side attached to the valving pin 2930 thanks to the fixed pivot 2912. The end result is the upward movement of the valve pin 2930 thereby closing the channel.

In various embodiments, any method may be utilized to fabricate the component parts, such as 3D printing in part or as a single unit, machined, bought and inserted as part of the machining or 3D printed part (e.g. dowel pins from PIC designs based in Middlebury, Conn., or other vendors), ranging in diameter from 1 mm to 3 mm made of either 416 stainless steel, carbon steel or 303 stainless steel (the advantage being corrosion resistance and strength at small diameters) to act as valves 2900 and the fixed pivot 2912 shown in the diagram.

Figure 30:
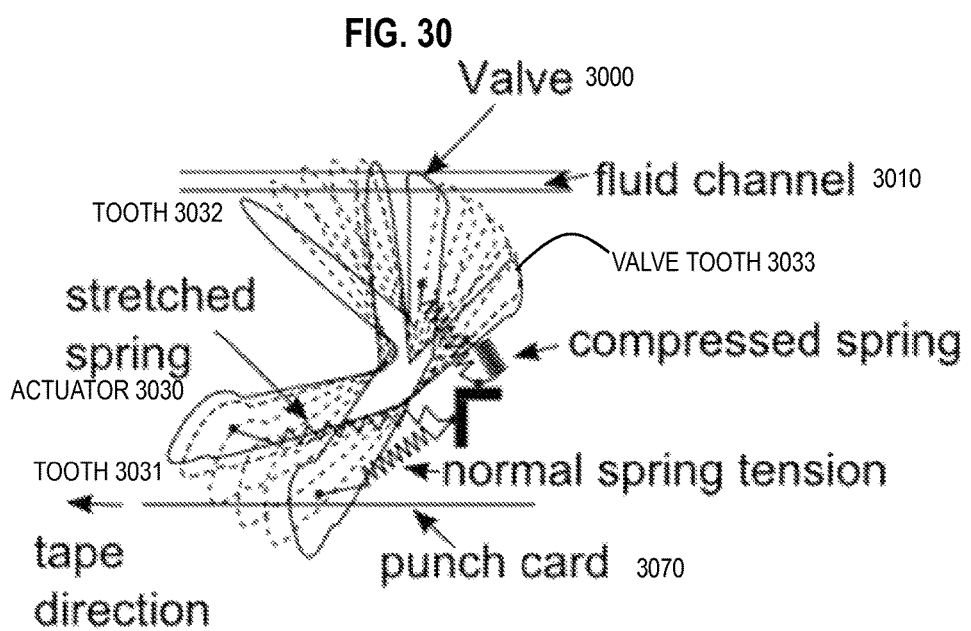
FIG. 30 is a block diagram that illustrates a valve tooth on a rocking actuator, according to an embodiment.

FIG. 30 is a block diagram that illustrates a valve tooth 3033 on a rocking actuator 3030, according to an embodiment. This rocking actuator 3030 with teeth 3031 and 3032 behaves as described above with reference to FIG. 3C for actuator 236, and teeth 234 and 235, respectively. The actuator 3030 in the depicted configurations acts as a valve 3000 by the additions of tooth 3033, which causes the fluid channel 3010 to be open when the actuator tooth 3031 is not engaged with the punch card 3070. When the actuator tooth 3031 is engaged with the punch card 3070, the tooth 3033 impinges on channel 3010 and closes it, As the punch card 3070 advances, the valve tooth 3033 drops away from the channel 3010, as the tooth 3032 pushes the fluid along the channel. Thus the valve closes the channel to prevent backflow until the fluid in the channel is propelled by the tooth 3032 of actuator 3030.

Figure 31A:
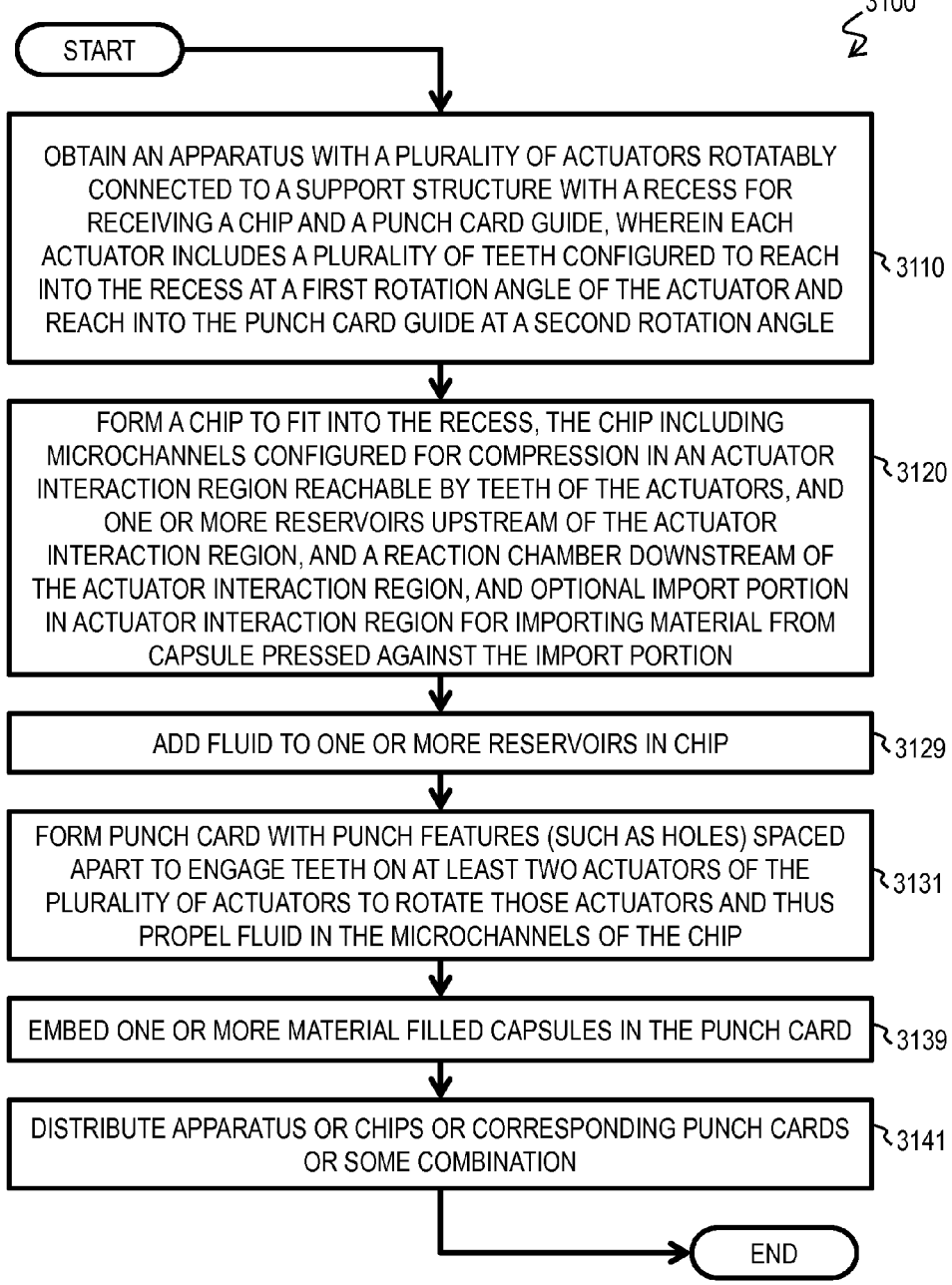
FIG. 31A and FIG. 31B are flow charts that illustrate a method for performing microfluidics, according to an embodiment.
Figure 31B:
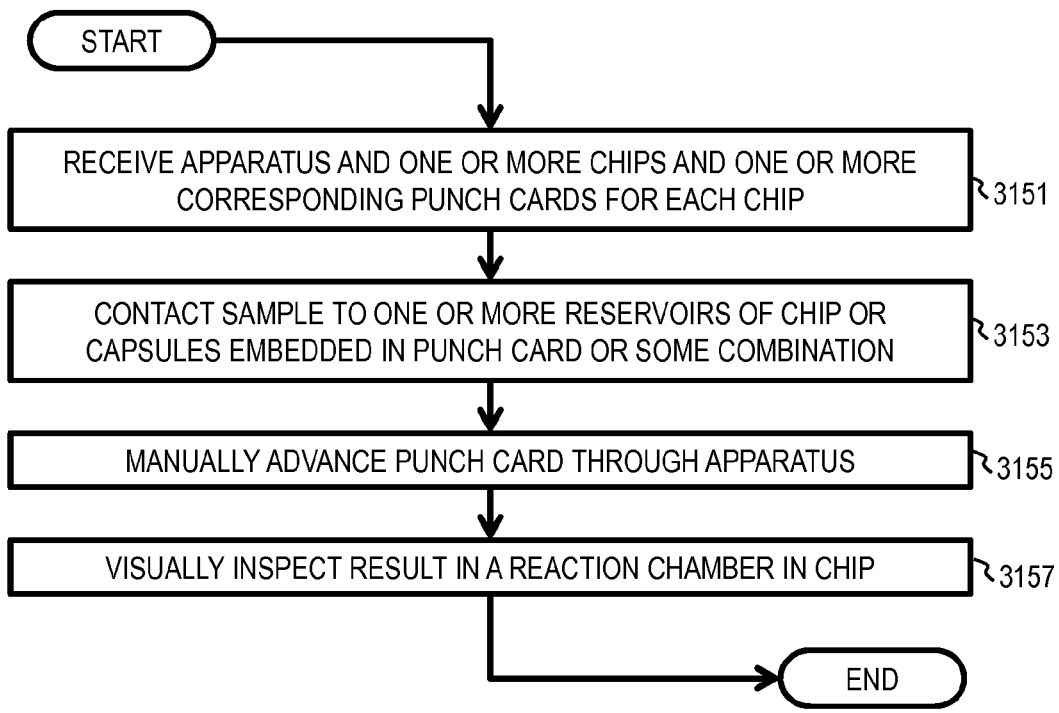

FIG. 31A and FIG. 31B are flow charts that illustrate methods 3100 and 3150 for performing microfluidics, according to an embodiment. Method 3100 is directed to producing the system and method 2850 is directed to using the system. Although steps are shown as integral blocks in a particular order for purposes of illustration, in other embodiments, one or more steps or portions thereof are performed in a different order, or overlapping in time, in series or in parallel, or are omitted, or one or more additional steps are added.

Method 3100 includes steps 3110 through 3141. In step 3110, an apparatus is obtained with a plurality of actuators rotatably connected to a support structure with a recess for receiving a chip and with a punch card guide. Each actuator includes a multiple teeth configured to reach into the recess at a first rotation angle of the actuator and reach into the punch card guide at a second rotation angle. In some embodiments, step 3110 includes fabricating the apparatus.

In step 3120, a chip is formed to fit into the recess. The chip includes microchannels configured for compression in an actuator interaction region reachable by teeth of the actuators, and one or more reservoirs upstream of the actuator interaction region, and a reaction chamber downstream of the actuator interaction region. In some embodiments, the chip includes an optional import portion in the actuator interaction region for importing material from a capsule pressed against the import portion. In some embodiments, step 3120 includes fabricating the chip.

In step 3129, fluid is added to one or more reservoirs in the chip. For example, an oil reservoir is filled with oil and one or more reagent reservoirs are filled with solutions of the corresponding reagents.

In step 3131, a punch card is formed with punch features (such as holes) spaced apart to engage teeth on at least two actuators of the plurality of actuators to rotate those actuators and thus propel fluid in the corresponding microchannels of the chip. In various embodiments, the punch card has multiple coding schemes to correspond to different steps of the process or purposes of the platform. For instance, one code corresponds to the engagement of gears to perform a certain logical operation, another code corresponds to opening and closing one or several valves, and another code corresponds to engaging a single phase in lieu of multiple-phase flow, and still other code corresponds to either the uptake of new material (either from reservoirs and or external sources) or the deposit of processed material/results for storage or additional processing. In some embodiments information is stored either in the form of assay products, color changes, numerical revelations corresponding to particular results, the outputs of a particular stage in the assay or other products. The information is also stored in the form of clinical samples or other samples introduced in the device for additional processing, use, recording keeping or other forms of manipulation.

In step 3139, one or more material filled capsules are embedded in the punch card, such as in an upper layer of the punch card.

In step 3141, the apparatus or chips or corresponding punch cards or some combination are distributed, such as in one or more kits. For example, in some embodiments, a kit includes a chip and a punch card. The chip comprising a plurality of microfluidic channels in an actuator interaction region separated from an outside of the chip by an outer flexible substrate. The punch card comprising a sheet of a first card material on which is formed a plurality of punch features, each punch feature configured to engage a tooth of an actuator of a plurality of actuators in an apparatus, wherein each actuator is configured to compress a corresponding microfluidic channel of the plurality of microfluidic channels in the actuator interaction region.

Method 3150 of FIG. 31B includes steps 3151 through 3157. In step 3151, the apparatus and one or more chips and one or more corresponding punch cards for each chip are received, e.g., in one or more kits. In step 3153, a sample is contacted to one or more reservoirs of chip or to one or more capsules embedded in a punch card or to some combination. In step 3155, a punch card is advanced through apparatus. In some embodiments, this is done manually, such as by turning a crank or by pulling the card through the apparatus. In step 3157, a result in a reaction chamber in the chip is visually inspected. In some embodiments, this includes transferring a fluid product of the reaction to the punch card and visually inspecting or otherwise post-processing the punch card.

Thus, in some embodiments, a method includes obtaining an apparatus comprising an actuator rotatably connected to a support structure, wherein the actuator comprises a plurality of teeth, one tooth on the actuator configured to compress a microfluidic channel in a chip when another tooth on the actuator is engaged in a punch feature in a punch card. The method also includes receiving a chip and a punch card for the chip. The chip includes a microfluidic channel separated from outside the chip by a flexible substrate in an actuator interaction region. The punch card includes a sheet comprising a plurality of punch features configured to engage a tooth of the plurality of teeth of the actuator. The method further includes contacting a sample to at least one of a capsule on the punch card, or a reservoir in fluid communication with the microfluidic channel in the chip. The method also includes advancing the punch card through the apparatus in contact with the actuator to cause a first tooth of the actuator to compress the microfluidic channel when a second tooth of the actuator engages a punch feature on the punch card.

The system is rugged and portable (currently, the actuation apparatus is about the size of an apple), making it possible for one to operate it in extremely low-resource settings yet have the robustness of a laboratory with multiple equipment. In various embodiments, the chip is made of different materials (including rubber and various polymers such as PDMS). In some embodiments, the chip is disposable while in other embodiments the chips are non-disposable or reusable. In some embodiments a single actuation apparatus is used for either disposable or non-disposable chips.

Thus, presented above is a programmable microfluidic system where the program is encoded in a punch card. The punched card also serves as a storage location of both wet and dry reagents and biological samples including patient samples. Some embodiments also employ the same punched card as a way to indicate results and store them temporarily. The punch card therefore serves multiple purposes of programming information in a spatial and temporal fashion, introducing reagents and biological samples, indicating results and storing them. This multiple use of an information register (punch card) to carry both information and materials has never been demonstrated before to the knowledge of the inventors.

Different protocols are run on different lines, in some embodiments. The multiplexing of runs enables the simultaneous processing of multiple experiments on a single sample (e.g. snake venom screens, newborn screening assays for inborn errors of metabolism or genetic mutations, screening various pathogens simultaneously on a single sample) or multiple samples for a single process (e.g. massively parallel diagnosis of diseases or medical conditions for multiple patients), which can be particularly handy in triage conditions following disease outbreaks or other similar conditions where a quick result is needed for multiple patients.

The entire system can be put in an incubator or other controlled environments simplifying processes such as the culturing of pathogens in patients samples or other ways to amplify the signal or as steps in a protocol. Assays such as those for the diagnosis of infectious diseases (that require multiple steps, incubation, etc.) or the determination of minimum inhibitory concentration of an antibiotic, to both determine the resistance of a microbe to the antibiotic or test out new drugs, are some of the potential applications of embodiments of the device. Moreover, the illustrated embodiments can potentially be used for the screening of newborns for multiple disease conditions that are treatable but not evident clinically—which can lead to many lives being saved as such programs are often non-existent in low resource settings. Other applications include the parallel testing of many chemotherapeutic agents against a particular cancer to determine the most effective medication or combination of medications for a particular case; drug discovery; screening pregnant women for common health risk factors; quick determination of the right antivenom for snake bites by parallel processing; and determining the best approach in treating patients with comorbidities, especially those that are immune-compromised, through the parallel processing of biological samples.

A variety of applications also exist outside the biomedical realm. Potential applications outside of medicine include programmable messages or pictorial displays, hydrocarbon sampling tests in oil discovery, testing soils samples for agricultural purposes, parallel processing of water samples for various contaminants in the environment and others. Using various embodiments, a moving display of text, numbers, patterns or various images can be made by punching holes to program the fluid flow on the microfluidic chip. Multiple channels can then be simultaneously controlled in this way. The display can be on the chip itself enabling the transmission of messages as the fluid is driven by hand. By merging or layering the output from multiple device layers complex images, colors and patterns can be displayed. Reagents or other solutions can be introduced arbitrarily either in the tape or via reservoirs located either within the thick substrate of the device or external to it.

In an example embodiment, an assay provides for the parallel staining of cells with different fluorescent markers for disease diagnosis. For instance, parallel chambers are chemically functionalized to have chemical tags such as avidin bound to the surface of the device. A biological fluid sample such as blood or cerebro-spinal fluid is introduced after the surface markers of interest in the cell have been tagged with a molecule such as biotin that attaches the cell to the surface of the device chamber. With the cells immobilized, different stains are introduced in different chambers at the exact sequence required, all in parallel complete with all the rinsing, incubation and staining steps. The cells are then fixed and imaged to identify them. An example of such a protocol is the hematoxylin and eosin stain in which the cells are first rinsed with saline solution and then hematoxylin is introduced for 15 minutes. The excess dye is then rinsed off for 20 minutes followed by a counterstain with eosin for two minutes. After the final rinse, the cells are then fixed with 4% paraformaldehyde before imaging. While this is happening in one chamber, a gram stain is run in another chamber, while yet another chamber has markers specific to certain cells, such as CD45 for hematopoietic cells except red blood cells. Different device inputs carry different solutions, releasing them to the chamber of interest at specific times. Another approach is to have the reagents in droplet form, only merging with the specific cells at the exact instance needed. Through a compilation of the data from the parallel processes, diagnoses are made.

To reiterate and expand, other example embodiments include: (i) assays for the diagnosis of infectious diseases; (ii) assays for the determination of minimum inhibitory concentration of an antibiotic to both determine the resistance of a microbe to the antibiotic or test out new drugs; (iii) assays for the screening of newborns for multiple disease conditions that are treatable but not evident clinically which can lead to many lives being saved as such programs are often non-existent on low resource settings; (iv) the parallel testing of many chemotherapeutic agents against a particular cancer to determine the most effective medication or combination of medications for a particular case; (v) drug discovery protocols; (vi) screening pregnant women for common health risk factors; (vii) quick determination of the right antivenom for snake bites by parallel processing; and (viii) determining the best approach in treating patients with cormobidities especially those that are immune-compromised through the parallel processing of biological samples. Embodiments that are outside of medicine include: (i) programmable messages or pictorial displays; (ii) hydrocarbon sampling tests in oil discovery; (iii) protocols for testing soils samples for agricultural purposes; and (iv) parallel processing of water samples for various contaminants in the environment.

In the foregoing specification, embodiments have been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps.

Furthermore, the indefinite article "a" or "an" is meant to indicate one or more of the item, element or step modified by the article.

What is claimed is:

1. An apparatus comprising:
a support structure including a portion with a recess configured for receiving a chip with a plurality of microfluidic channels;
a plurality of actuators connected to the support structure, wherein the plurality of actuators rotate relative to the support structure and rotate independently of each other, wherein each actuator of the plurality of actuators includes a plurality of teeth protruding outward from a center of each actuator, and wherein each actuator is positioned so that at least in a first angle of rotation of each actuator a first tooth of each actuator extends into the recess sufficiently to compress a microfluidic channel in the chip placed in the recess; and
a punch card guide comprising a surface wherein a space is formed between the surface and the plurality of actuators on a side of the plurality of actuators opposite the recess, and the space is sized to accommodate a punch card with a plurality of punched features, the punch card guide connected to the support structure and configured to guide the punch card so that at least in a second angle of rotation of each actuator at least a portion of a second tooth of each actuator extends into the space,
wherein a width of each tooth of the plurality of teeth of each actuator is in a range from about 10 microns to about 1000 microns.

2. An apparatus as recited in claim 1, wherein a spacing between a pair of actuators of the plurality of actuators along the support structure is in a range from about 20 microns to about 2000 microns.

3. An apparatus as recited in claim 1, wherein a tooth of an actuator of the plurality of actuators has a radial extent in a range from about one micron to about 100 microns.

4. An apparatus as recited in claim 1, wherein each actuator of the plurality of actuators is rotatably connected to a single shaft connected to the support structure.

5. An apparatus as recited in claim 1, wherein no actuator of the plurality of actuators is connected to a powered motor.

6. An apparatus as recited in claim 1, wherein an actuator of the plurality of actuators is configured to be rotated by manually advancing the punch card through the punch card guide when a tooth of the actuator is engaged with a punch feature of the plurality of punched features on the punch card.

7. An apparatus as recited in claim 6, wherein the punch card guide comprises a pair of rollers and a crank, and at least one roller of the pair of rollers is mechanically connected to the crank such that the punch card is advanced when the crank is rotated.

8. An apparatus as recited in claim 7, wherein the crank is rotated manually.

9. An apparatus as recited in claim 1, wherein a first tooth of the plurality of teeth on an actuator of the plurality of actuators is configured to close a microfluidic channel of the plurality of microfluidic channels on the chip to prevent flow of a fluid in the microfluidic channel in a first direction along the microfluidic channel and a second tooth of the plurality of teeth on the actuator is configured to propel the fluid in the microfluidic channel into the first direction along the microfluidic channel.

10. An apparatus as recited in claim 1, wherein the punch card guide is rotatably connected to the support structure and the support structure is configured to tilt relative to the punch card guide so that each microfluidic channel in the chip in the recess of the support structure is closed by a tooth of a corresponding actuator of the plurality of actuators when no tooth of the corresponding actuator is engaged with a punch feature of the punch card.

11. An apparatus as recited in claim 1, further comprising a valve moveably connected to the support structure, the valve comprising a pin configured to extend into the recess sufficiently to close a microfluidic channel in the chip placed in the recess when no tooth of the plurality of teeth on an actuator is in contact with the valve and to withdraw from the recess when a tooth of the actuator is in contact with the valve.

12. An apparatus as recited in claim 1, wherein the punch card guide further comprises a separator configured to separate an upper layer of the punch card, if present, from a lower layer of the punch card and pass the upper layer of the punch card between the plurality of actuators and a chip disposed in the recess.

13. An apparatus as recited in claim 1, wherein the recess is configured for removably receiving the chip with the plurality of microfluidic channels.

14. An apparatus as recited in claim 1, wherein the apparatus includes a number of actuators in a range from about 8 to about 32.

15. An apparatus as recited in claim 1, further comprising the chip with the plurality of microfluidic channels, wherein the chip is fixed within the recess.

16. An apparatus as recited in claim 1, wherein the surface comprises a curved surface of a roller rotatably connected to the support structure.

17. An apparatus as recited in claim 1, wherein the surface comprises a flat surface of a plate connected to the support structure.

* * * * *